(12) United States Patent
Kono et al.

(10) Patent No.: US 8,411,559 B2
(45) Date of Patent: Apr. 2, 2013

(54) DOUBLE RING NETWORK SYSTEM AND COMMUNICATION CONTROL METHOD THEREOF, AND TRANSMISSION STATION, AND PROGRAM FOR TRANSMISSION STATIONS

(75) Inventors: Shinya Kono, Hachioji (JP); Yasuhisa Shiobara, Nishitokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 942 days.

(21) Appl. No.: 12/515,322

(22) PCT Filed: Mar. 15, 2007

(86) PCT No.: PCT/JP2007/055292
§ 371 (c)(1),
(2), (4) Date: May 18, 2009

(87) PCT Pub. No.: WO2008/059621
PCT Pub. Date: May 22, 2008

(65) Prior Publication Data
US 2010/0067408 A1  Mar. 18, 2010

(30) Foreign Application Priority Data
Nov. 17, 2006 (JP) .................................. 2006-311274

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)

(52) U.S. Cl. .................. 370/217; 370/241; 370/258

(58) Field of Classification Search .................. None
See application file for complete search history.

(56) References Cited

U.S. PATENT DOCUMENTS
(Continued)

FOREIGN PATENT DOCUMENTS
JP  59-138151  8/1984
JP  5 289968  11/1993
(Continued)

OTHER PUBLICATIONS

Japanese Office Action issued Jan. 17, 2012, in Patent Application No. 2006-311274 (with English-language translation).

(Continued)

*Primary Examiner* — Xavier Szewai Wong
(74) *Attorney, Agent, or Firm* — Oblon, Spivak, McClelland, Maier & Neustadt, L.L.P.

(57) ABSTRACT

A double ring network system configured with two or more transmission stations each including a pair of bi-directionally communicative communication ports, including any adjacent two transmission stations as terminal stations, and any transmission station as a base, as mutually connected in a ring form by communication ports through a transmission line, for intercommunications between transmission stations, in which the transmission stations are each adapted to determine whether or not frame signals are received from adjacent transmission stations, transmit route identifying frame signals for identification of routes to adjacent transmission stations, when having failed in reception, and set own station as a terminal station substituting for a current terminal station, when having received no responses to the route identifying frames from adjacent transmission stations, so they are kept from arriving at ring-like connected subsequent transmission stations.

11 Claims, 29 Drawing Sheets

U.S. PATENT DOCUMENTS

| | | | |
|---|---|---|---|
| 5,487,062 A | | 1/1996 | Yanagi et al. |
| 5,537,411 A * | | 7/1996 | Plas ............................ 370/397 |
| 5,604,729 A | | 2/1997 | Aoki et al. |
| 5,657,321 A | | 8/1997 | Yanagi et al. |
| 5,680,235 A | | 10/1997 | Johansson |
| 5,740,158 A | | 4/1998 | Aoki et al. |
| 6,920,508 B1 | | 7/2005 | Müller |
| 7,606,144 B2 * | | 10/2009 | Chen et al. ................... 370/222 |
| 2003/0021251 A1 * | | 1/2003 | Moshiri-Tafreshi et al. . 370/338 |
| 2005/0030961 A1 * | | 2/2005 | Lee et al. ...................... 370/404 |

FOREIGN PATENT DOCUMENTS

| | | |
|---|---|---|
| JP | 6 303248 | 10/1994 |
| JP | 11 503584 | 3/1999 |
| JP | 11-503584 | 3/1999 |
| JP | 2002-524916 | 8/2002 |
| JP | 2003 218894 | 7/2003 |
| JP | 3461954 | 10/2003 |

OTHER PUBLICATIONS

Office Action issued Sep. 10, 2010, in Russia Patent Application No. 2009122995, filed Mar. 15, 2007 (with English-language Translation).

Office Action issued Oct. 11, 2011, in Japanese Patent Application No. 2006-311274 (with English-language translation).

Office Action issued on Sep. 16, 2011 in the corresponding Korean Application No. 10-2009-7012461 (with English Translation).

* cited by examiner

FIG. 3
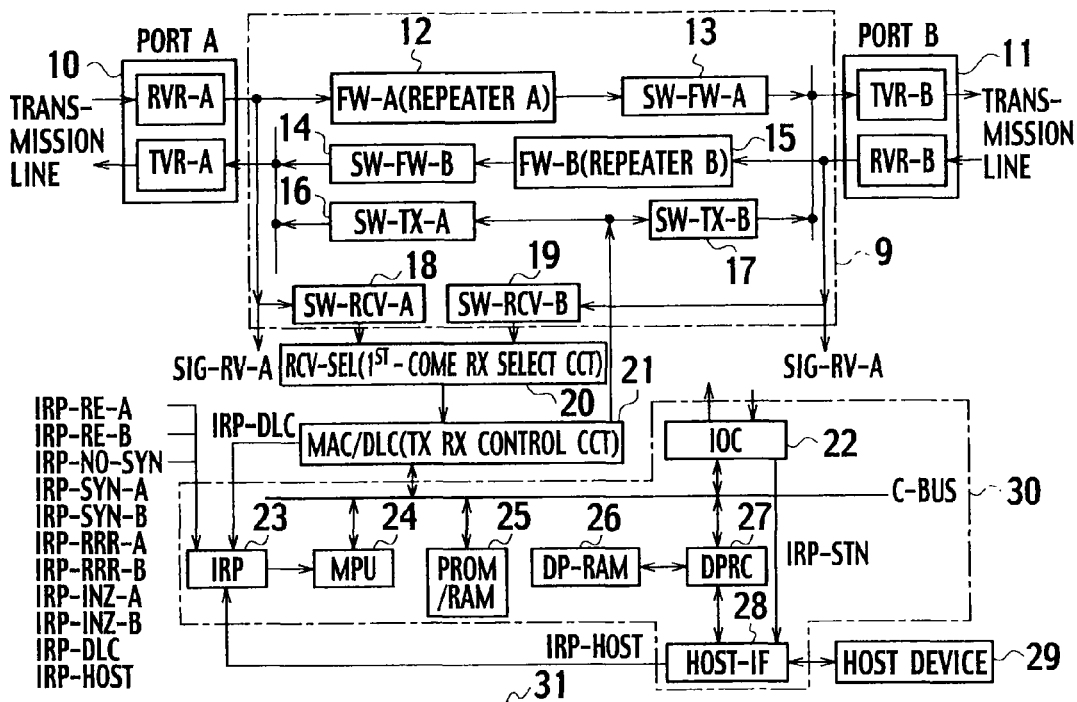
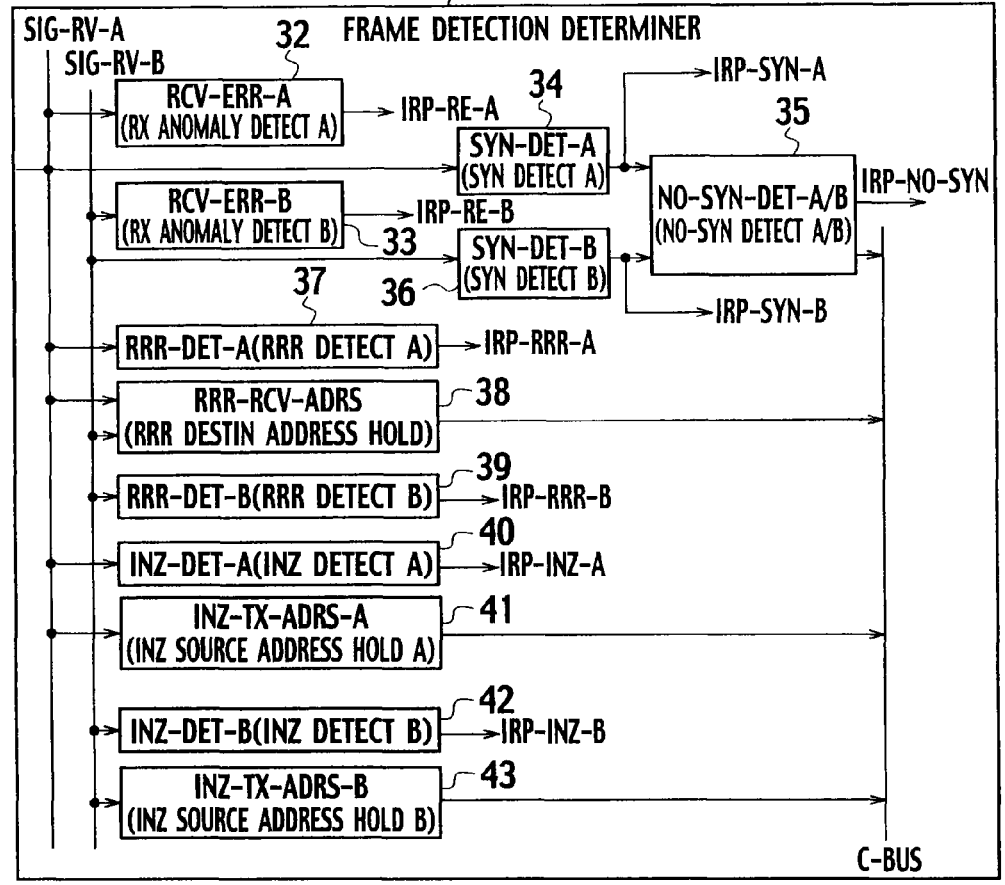

```
SW-FW-A:OFF
SW-FW-B:OFF
SW-TX-A:ON
SW-TX-B:ON
SW-RCV-A:OFF
SW-RCV-B:OFF

MS PORT : UNDEFINED
STATION MODE : UNDEFINED
```

ST-T-L::T-L-MO MODE

REPEAT PERMIT SWITCH
 SW-FW-A: ON
 SW-FW-B: OFF
TRANSMISSION PERMIT SWITCH
 SW-TX-A: ON
 SW-TX-B: ON
RECEPTION PERMIT SWITCH
 SW-RCV-A: ON
 SW-RCV-B: OFF
MODE CONTROL
 MS PORT: A
 STATION MODE: ST-T-L (b)

ST-T-R::T-R-MO MODE

REPEAT PERMIT SWITCH
 SW-FW-A: OFF
 SW-FW-B: ON
TRANSMISSION PERMIT SWITCH
 SW-TX-A: ON
 SW-TX-B: ON
RECEPTION PERMIT SWITCH
 SW-RCV-A: OFF
 SW-RCV-B: ON
MODE CONTROL
 MS PORT: B
 STATION MODE: ST-T-R (c)

ST-Normal::N-MO MODE

REPEAT PERMIT SWITCH
 SW-FW-A: ON
 SW-FW-B: ON
TRANSMISSION PERMIT SWITCH
 SW-TX-A: ON
 SW-TX-B: ON
RECEPTION PERMIT SWITCH
 SW-RCV-A: ON
 SW-RCV-B: ON
MODE CONTROL
 MS PORT: A OR B
 STATION MODE: Normal

NOTES:
SWITCH STATUS
ON: PERMIT
OFF: PROHIBIT

S0:
S01::if(INZ FRAME RECEPTION) && (RECEPTION PORT A = Blocked STATE) && ((MS PORT = B) = false) && (not TERMINAL STATION = false)
   then MS STATION ADDRESS := SOURCE ADDRESS, HOLD RECEPTION PORT := A
        MS PORT := A, SW-FW-A : ON, SW-RCV-A : ON
        SW-TX-B: OFF, SEND INZ FRAME (DESTINATION = MS STATION) FROM MS PORT = A,
        SW-TX-B : ON, STATION MODE : not TERMINAL STATION
   endif
S02::if(INZ FRAME RECEPTION) && (RECEPTION PORT B = Blocked STATE) && ((MS PORT = A) = false) && (not TERMINAL STATION)
   then MS STATION ADDRESS := SOURCE ADDRESS, HOLD RECEPTION PORT := B
        MS PORT := B, SW-FW-B : ON, SW-RCV-B : ON
        SW-TX-A: OFF,
        SEND INZ FRAME (DESTINATION = MS STATION) FROM MS PORT =,
        SW-TX-A : ON, STATION MODE : not TERMINAL STATION
   endif
S03::if(INZ FRAME RECEPTION) && (RECEPTION PORT B = Blocked STATE) && ((MS PORT = A) && (not TERMINAL STATION)
   then STATION MODE := TERMINAL STATION ST-T-L, INZ-comp = true ---- NORMAL TERMINAL, GO TO SENDING INZ-COMP FRAME
   endif
S04::if(INZ FRAME RECEPTION) && (RECEPTION PORT A = Blocked STATE) && ((MS PORT = B) && (not TERMINAL STATION)
   then STATION MODE := TERMINAL STATION ST-T-R, INZ-comp = true ---- NORMAL TERMINAL, GO TO SENDING INZ-COMP FRAME ACKNOWLEDGE
   endif

S102

S1:
S11::if(INZ FRAME RECEPTION) && (STATION MODE = not TERMINAL STATION) && (INZ-comp = false) && (RECEPTION PORT = A || B)
   then START ST TIMER
   endif (1)

FIG. 23

| PREAMBLE (PRE) | SFD | DA (DESTINATION) | SA (SOURCE) | LEN/TYPE | Inf (INFORMATION) | FCS (ERROR-DETECTING CODE) |

DOUBLE RING NETWORK SYSTEM AND COMMUNICATION CONTROL METHOD THEREOF, AND TRANSMISSION STATION, AND PROGRAM FOR TRANSMISSION STATIONS

TECHNICAL FIELD

The present invention relates to a double ring network system including a plurality of transmission stations mutually connected in the form of a ring through communication lines adapted for bi-directional communications, the transmission stations normally each sending transmission frames in both directions of the ring simultaneously, the transmission frames being received and repeated by respective transmission stations, permitting intercommunications to be thereby implemented with all transmission stations in the ring.

In particular, it addresses a control system including a pair of adjacent transmission stations adapted as terminal stations for prohibiting bi-directionally repeating transmission frames to keep sent transmission frames from continuing circulation along the ring, for configuration of a double ring network being a ring form but equivalent to a bus type.

Still more, it addresses a redundant control system adapted, with an event of one-point trouble in the double ring network, to have transmission stations paired at new locations, out of transmission stations with maintained sound functions, alter into terminal stations, in order to avoid an entire shutdown.

Yet more, it addresses a control of configuration for double ring networks having data frames and interfaces compliant with the ISO/IEC8802-3 Ethernet® standard, to be employed in applications or transmission frames being transmitted among the transmission stations and associated with the control systems, and adapted as a physical layer in terms of an OSI (ISO/IEC7498-1) physical layer to be free from restrictions to the data link layer as an upper layer, in particular to media access control systems (MAC) implementing an access control of common transmission line to avoid collision between transmission frames on a common transmission line.

BACKGROUND ART

Generally, for a plurality of transmission stations mutually connected in turn in the form of a ring through communication lines capable of bi-directional communications to constitute a network system, the transmission stations are each adapted to send transmission frames in both directions.

Those transmission stations are each adapted for one of preset transmission stations to work as a control station, so that transmission frames sent from respective transmission stations are kept from continuing circulation in the ring.

As a conventional example of this system cutting a transmission frame flow at a transmission station, we have Japanese Patent Publication No. 3,461,954 (patent document 1).

In this Patent document 1, if a trouble happens at any single location while running, this transmission station operates as a central control station for interactions with transmission stations in a network, mainly in particular with those transmission stations which have detected the trouble, to cut off a part in trouble.

Or, having a trouble determined from a break in a steady intercommunication by transmission frame, it cuts off a part in trouble, and implements a bi-directional repeating of transmission frame that it has cut till then as a control station, which is done as a system to avoid an entire shutdown of network system due to one-point trouble.

There is also an IEEE 802.5 token ring system network, as a similar system.

On the other hand, there is an ANSI X3T 9.5 FDDI as a ring form network, in which transmission stations are normally each adapted to send transmission frames in a direction on a ring, and a respective transmission station is adapted to repeat transmission frames sent from other transmission stations, and any transmission frame that has come around through the ring is dropped at the station where it has been sent, thereby keeping the transmission frame from continuing circulation in the ring.

This type of network has communication lines mutually permitting a bi-directional communication, and normally employs a communication line for one direction, with a communication line for the other direction held in a waiting state.

If a trouble happens at any single location while running, transmission frames are to be blocked there, whereto a predetermined central transmission station interacts mainly with transmission devices adjacent to the location of trouble, to have a communication line fold back at the adjacent paired transmission stations with a troubled part in between, so a reverse directional communication line that has been in a waiting state till then revives to constitute a new ring network, while having a communication line doubled in length. It is thereby avoided to undergo an entire shutdown of network due to one-point trouble.

Like this, it is typical for examples in the past to block a transmission flow at a stationary single point in a ring form network.

The point to be blocked is at a central control station fixedly determined in advance, or such a transmission station that is temporarily given a transmission right to send transmission frames on a common transmission line, as it can stand as a control station to control the transmission line, while holding the transmission right.

Further, there is disclosure (patent document 2) of a data transmission processing system in which an application program for a respective data transmission device is sent from a single point, and respective transmission devices are remote-controlled for maintenance from the single point, allowing for an improved maintenance work efficiency and work saving.

Patent document 1: Japanese Patent Publication No. 3,461,954
Patent document 2: Japanese Patent Application Laid-Open Publication No. 5-289968

DISCLOSURE OF INVENTION

Problem to be Solved by the Invention

However, in those network systems, if a trouble happens at one location, a procedure (for a transmission line control system specific to either network is followed, for a control station and transmission stations adjacent to the trouble location to determine the timing of communications in between, or for synchronization, to fold back within the control station where it has been cut in the former case, or at two points with the trouble location in between in the latter case, to avoid an entire shutdown, keeping transmission frames from continuing circulation.

Either system depends on the transmission line control system, and undergoes issues including, among others, a limited versatility, and a required time for control to recover from trouble even if it is applied.

Therefore, it has been difficult to provide a bus type transmission line independently of the transmission control system, as a universal system to one-point trouble, as an issue.

Further, the patent document 1 is a measure to fold back for occurrence of a disconnection between a node (transmission station) and a transmission station. Instead, disconnection does not always occur at one point, there may be two points of disconnection. To this point, the patent document 1 presumes one-point disconnection, and for two points of disconnection, lacking facile measures, it needs a worker to go the sites to determine terminal stations.

Further, a recovery from disconnection at one point may be followed by disconnection at another point. In such a case, it is desirable for terminal stations to automatically switch.

Therefore, it has been a desideratum to provide a double ring network system of a bus type in which terminal stations can be automatically set to stop circulation of transmission frame, irrespective of the number.

Further, the patent document 2 provides an updating method for application programs, where programs are updatable from a data transmission device of a single point connected to a transmission line, whereas for update of firmware, the transmission device needs new firmware to be installed before a restart, which requires labor work to bring the device once in a state of shutdown to restart as hardware. However, this operation may be impracticable, and update of firmware may be disabled. Therefore, for a new terminal station to be set, firmware has to be updated, with a cost.

The present invention has been devised in view of such issues, and it is an objective to provide a double ring network system including a plurality of (odd or even) transmission stations connected through a transmission line, as a double ring network system of a bus type, not a cycloid, that has right-handed terminal station and left-handed terminal station automatically determined.

BRIEF DESCRIPTION OF DRAWINGS

FIG. 3 is diagram of a hardware configuration constituting an embodiment example (the $1^{st}$) of a configuration of transmission station for double ring network systems.

FIG. 7 is a diagram describing conditions of actions at normal stations and both terminal stations after initialization.

FIG. 10 is a flowchart describing an initializing process (the $1^{st}$) at a #STj transmission station.

FIG. 23 is a diagram describing a format of ISO/IEC 8802-3 Ethernet® transmission frame.

Figure 1:
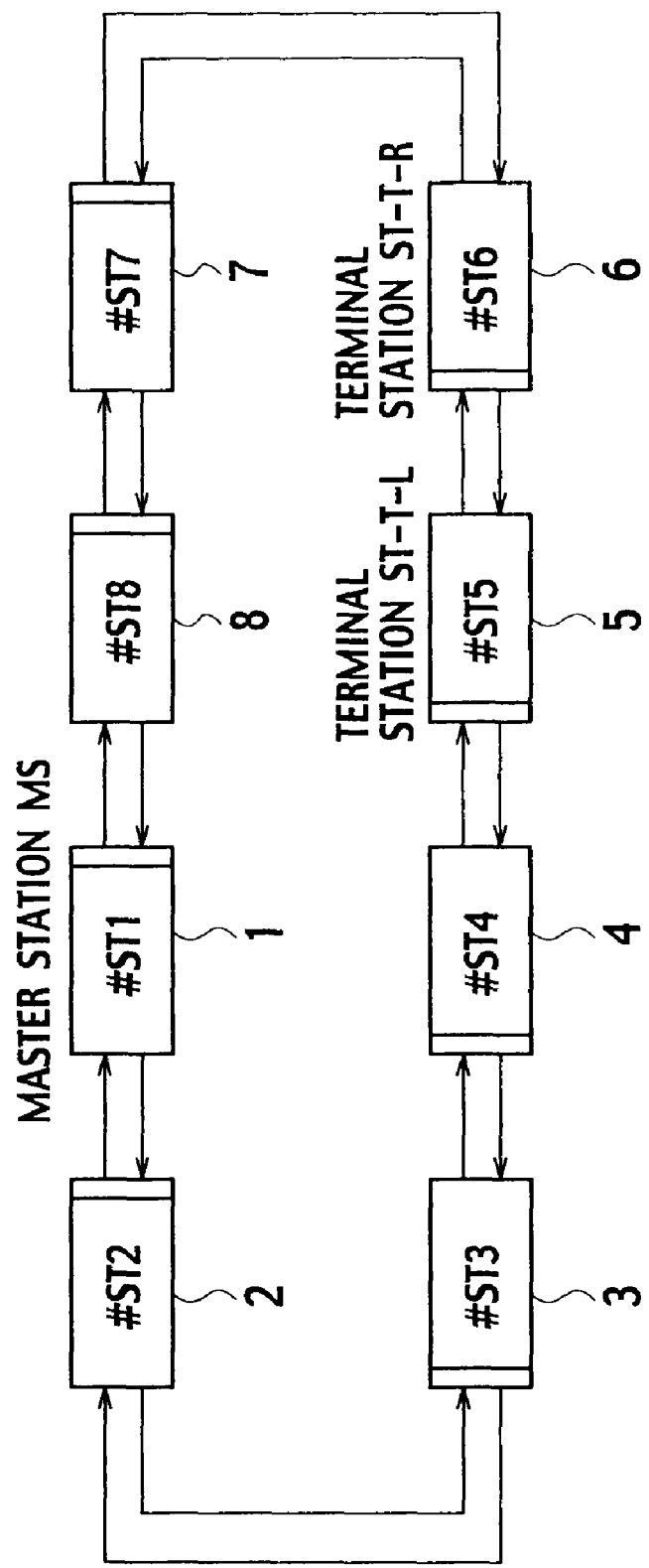
FIG. 1 is diagram describing positional relation between a master station and both terminal stations in a double ring network system after initialization.

DESCRIPTION OF REFERENCE CHARACTERS 1 transmission station (# ST1)
2 transmission station (# ST2)
3 transmission station (# ST3)
4 transmission station (# ST4)
5 transmission station (# ST5)
6 transmission station (# ST6)
7 transmission station (# ST7)
8 transmission station (# ST8)
10 communication port section
11 communication port section
12 repeater A (FW-A)
18 reception permitting switch (SW-RVC-A)
31 frame detecting determiner
32 reception anomaly detecting circuit (RCV-ERR-A)
34 SYN frame detecting circuit (SYN-DET-A)
37 RRR frame reception detecting circuit (RRR-DET-A)
38 RRR frame destination address holding circuit (RRR-RCV-ASDRS)

BEST MODE FOR CARRYING OUT THE INVENTION

First Embodiment

Claim 1

This is a control method for double ring networks including a set of two or more transmission stations each respectively configured with a pair of communication ports for communications to be implemented bi-directionally, and mutually connected by said pairs of communication ports thereof in a ring form through a transmission line to implement intercommunications between transmission stations, characterized
for the respective transmission station, by:
a step of simultaneously sending transmission frames containing information at a time from paired communication ports of said transmission station;
a step of detecting a transmission frame sent from another said transmission station received at one of said paired communication ports; and
a step of sending above-noted said transmission frame as repeatable to another communication port being the other with respect to the one communication port, from said other communication port, and
for a respective one of adjacent paired said transmission stations out of said set of two or more transmission stations mutually connected in the ring form, by: a step of having the transmission frame sent from one said transmission station's communication port; and
a step of performing, for a transmission frame received at the other said transmission station's communication port as it is connected through the transmission line, a detection at this station, and
in that said transmission frame to be responded in accordance with information contained in said transmission frame is kept from being sent, through a repeating from said receiving communication port to the other communication port, from said other communication port,
whereby said received transmission frame is kept from arriving at ring-form connected and subsequent transmission stations in a repeating direction thereof, and above-noted transmission frames sent from said transmission station are kept from circulating in a network configured in the ring form.

Second Embodiment

Claim 2

This is the control method for double-ring networks according to the embodiment 1 (claim 1), characterized
for the set of transmission stations, by:
having, at a respective one of adjacent paired said transmission stations out of said set of two or more transmission stations mutually connected in the ring form in positions determined relative to one said transmission station as a base in accordance with a total number of said transmission stations constituting the network of the ring form and a total length of the transmission line connecting said transmission stations with each other, the transmission frame sent from one said transmission station's communication port.

Third Embodiment

Claim 3

This is the control method for double-ring networks according to the embodiment 1 (claim 1) or the embodiment 2 (claim 2), wherein
as for a format of said transmission frame to be sent and received through said communication ports, and a transmission line interface of said communication ports, it complies with the ISO/IEC8802-3 standard.

Fourth Embodiment

Claim 4

This is an initializing method for double ring networks including a set of two or more transmission stations each respectively configured with a pair of communication ports for communications to be implemented bi-directionally, and mutually connected by said pairs of communication ports thereof in a ring form through a transmission line to implement intercommunications between transmission stations, comprising:
for a base transmission station being one said transmission station as a base out of said set of two or more transmission stations mutually connected in the ring form,
a step of sending periodically initialization-instructing transmission frames (INZ frames) in both directions;
for a respective transmission station receiving and detecting this,
a step of turning repeat of transmission frame from a communication port on this as-having-received side to a communication port on the other side, from a prohibiting state to a permitting state; and
a step of permitting reception and take-in of transmission frame thereafter at the communication port on the as-having-received side, and sending an INZ frame as a responding acknowledgment (a responding acknowledgment INZ frame) at the as-having-received communication port side, as a response for reception acknowledgment; further a step of responding to reception and detection, as following the sending the INZ frame, of a said above-noted responding acknowledgment INZ frame from a one-adjacent transmission station in a repeating direction from said above-noted communication port having first received an INZ frame to the other communication port, by turning repeat of transmission frame from a communication port on this as-having-received side to a communication port on the other side, from a prohibiting state to a permitting state; and
a step of permitting reception and take-in of transmission frame thereafter at the communication port on that as-having-received side, whereby at this transmission station thereafter reception and take-in of transmission frames to be received at communications ports on bi-directional sides and repeat thereof to the other sides are enabled; further
for a respective one of a transmission station in a position to receive above-noted INZ frames at communication ports on both sides, and a transmission station in a position adjacent to that transmission station through a transmission line, as they are determined in accordance with a total number of said transmission stations constituting the network in the ring form, and a total length of the transmission line connecting said transmission stations with each other,
a step of having a transmission frame sent from one said transmission station's communication port and received at said other transmission station's opposing communication port, detected at this transmission station; and
for said transmission frame to be responded in accordance with information contained therein, setting repeat from said as-having-received communication port to the other communication port to a permitting state, wherein
they are configured as terminal stations also for reception and take-in to be prohibited, whereby at a respective one of these terminal stations no transmission frame received from the other terminal station is repeated to send to ring-form connected and subsequent transmission stations in a repeating direction thereof, and transmission frames sent from respective said transmission stations are kept from circulating in a network configured in the ring form.

Fifth Embodiment

Claim 5

This is the initializing method for double-ring networks according to the embodiment 4 (claim 4), comprising:

for said transmission station being one said transmission station as a base out of said set of two or more transmission stations mutually connected in the ring form, a step of sending initialization-instructing transmission frames (INZ frames) in both directions;

for a transmission station one-adjacent to said transmission station having received and detected this, a step of turning repeat of transmission frame from a communication port on this as-having-received side to a communication port on the other side, from a prohibiting state to a permitting state; and a step of permitting reception and take-in of transmission frame thereafter at the communication port on the as-having-received side; and a step of sending INZ frames as a responding acknowledgment (responding acknowledgment INZ frames) addressing a source address of said received INZ frame as a destination, in both directions, as a response for reception acknowledgment; further a step of responding to reception and detection, as following the sending the INZ frame, of a said above-noted responding acknowledgment INZ frame of a one-adjacent transmission station addressing own station, from said one-adjacent transmission station in a repeating direction from said above-noted communication port having first received an INZ frame to the other communication port, by turning repeat of transmission frame from a communication port on this as-having-received side to a communication port on the other side, from a prohibiting state to a permitting state, wherein reception and take-in of transmission frame are permitted thereafter at the communication port on that as-having-received side, whereby at this transmission station thereafter reception and take-in of transmission frames to be received at communications ports on both sides and repeat thereof to the other sides are enabled, and beginning from said above-noted transmission station as a base having sent INZ frames in both directions, sequentially on respective transmission stations in positions in both directions of the ring form, reception of an INZ frame is responded by again sending INZ frames at communications ports on both sides, a step of thereby determining in accordance with a total number of said transmission stations constituting the network in the ring form, and a total length of the transmission line connecting said transmission stations with each other, a transmission station in a position to receive INZ frames at communication ports on both sides, and a transmission station in a position adjacent to that transmission station through a transmission line; for a respective one of which a step of having a transmission frame sent from one said transmission station's communication port and received at said other transmission station's opposing communication port, detected at this transmission station, and for said transmission frame to be responded in accordance with information contained therein, setting repeat from said as-having-received communication port to the other communication port to a permitting state, wherein they are configured as terminal stations also for reception and take-in to be prohibited, whereby at a respective one of these terminal stations no transmission frame received from the other terminal station is repeated to send to ring-form connected and subsequent transmission stations in a repeating direction thereof, and transmission frames sent from respective said transmission stations are kept from circulating in a network configured in the ring form.

Embodiment 6

Claim 6

This is the initializing method for double-ring networks according to the embodiment 5 (claim 5), comprising:

for a respective transmission station, a step of responding to an INZ frame it has first received in an initializing interval by holding, as an address of an adjacent transmission station opposing on this as-having-received communication port (an MS port) side, a source address in said received INZ frame together with an identifier of said reception port; and a step of successively sending INZ frames addressing the address of said adjacent transmission station as a destination in both directions, wherein following said sending, within a prescribed time, if an INZ frame addressing own station as a destination is received at a communication port on an opposite side to the MS port, then as being an above-noted responding acknowledgment INZ frame from an adjacent transmission station opposing this communication port side, a source address in this INZ frame is held together with an identifier of this reception port, whereby addresses of the respective transmission stations adjacent on both sides of this transmission station can be acquired.

Embodiment 7

Claim 7

This is the initializing method for double-ring networks according to the embodiment 4 (claim 4), the embodiment 5 (claim 5), or the embodiment 6 (claim 6), wherein at a time when above-noted said two terminal stations are adjacently configured in positions determined in accordance with a total number of said transmission stations constituting the network in the ring form, and a total length of the transmission line connecting said transmission stations with each other, with said one transmission station as a base, or at a time when they are set as terminal stations by absence of reception of responding acknowledgment INZ frames from adjacent transmission station of own station in way of initialization, a respective one of the two terminal stations of the double ring network sends an INZ-COMP frame containing an indication of completion of initialization, and terminal station information including a terminal station address and a terminal station mode, or said INZ-COMP frame is received and detected at said one transmission station as a base, whereby a completion of initialization of the double ring network can be verified.

Embodiment 8

Claim 8

This is a transmission station for double-ring networks including a set of two or more transmission stations each respectively configured with a pair of communication ports for communications to be implemented bi-directionally, and mutually connected by said pairs of communication ports thereof in a ring form through a transmission line to implement intercommunications between transmission stations, characterized in a complete state of initialization, for each of one or more said transmission stations, by: means for periodically sending one or more transmission frames each respectively containing specific information;

for the respective transmission station configured to receive transmission frames through said pair of communication ports being A and B respectively (these two communication ports (are referred herein to communications ports A, and -B. And, means, functions, etc relating to sending and receiving a transmission frame through the communication port A shall be referred to by adding suffix-A, and likewise, what is to the communication port B, by suffix-B), by: "SYN frame detecting means A, and -B" for detecting, out of said periodically sent transmission frames, SYN frames having specific information meeting set conditions (referred herein to a SYN frame each), respectively;

"no-SYN detecting means A, and -B" for detecting no reception of said SYN frames over a preset interval, from output signals of said SYN frame detecting means A, and -B, respectively;

"SYN absence detecting means" for detecting, under a condition of periodic SYN frame arrivals through one communication port being consecutively continued, absence of periodic arrivals through the other communication port consecutive over a preset interval; and "reception anomaly detecting means A, and -B" for detecting anomalies in states of reception signals of transmission frames received through the communication ports, respectively, and means for having a transmission frame as received through either communication port-A or -B as having detected a no-SYN detecting state by the no-SYN detecting means A or -B, detected and verified, and responded in accordance with information contained in said transmission frame, and changing either as-having-received communication port (as the communication port A) to "a blocked state" for said transmission frame to be kept from being repeated to the other communication port (the communication port B) to send from the other communication port (the communication port B) (On the other hand, as used herein, "an unblocked state" refers to a state of communication port adapted for a transmission frame to be repeated from an as-having-received communication port to the other communication port to send from the other communication port); and changing the communication port A or -B as having detected a reception anomaly detecting state by the reception anomaly detecting means A or -B, to a blocked state, thereby holding communication ports of a plurality of transmission stations unblocked, on a way from a detection of failure occurrence to a network function recovery by a recovery procedure, and in that:

the above-noted functions of said terminal station are fulfilled at the plurality of transmission stations.

Embodiment 9

Claim 9

This is a reconfiguration method in anomaly occurrence for double ring networks including a set of two or more transmission stations each respectively configured with a pair of communication ports for communications to be implemented bi-directionally, and mutually connected by said pairs of communication ports thereof in a ring form through a transmission line to implement intercommunications between transmission stations, characterized in a state of configuration for transmission frames to be kept from continuing circulation in the network of the ring form, by two adjacent terminal stations, with the initialization completed, under a condition that one or more said transmission stations are compliant with a specifically undefined transmission line control system for avoiding collisions between transmission frames on double ring networks (MAC), to send specific information-containing one or more transmission frames to be periodically sent and, among others, above-noted said SYNN frames, and transmission frames to be sporadically sent, wherein the respective transmission station comprises:

"RRR frame reception detecting means A, and -B" for detecting reception of transmission frames containing specific control information (referred herein to an RRR frame each), respectively;

"own address setting" means for setting information for identification of own station;

"adjacent station address setting means A, and -B" for setting information for identification of transmission stations adjacent to communication ports A, and -B, respectively;

"address match detecting means" for detecting a match by comparison between identification information of own station and destination information in a received RRR frame from a reception output of either RRR frame reception detecting means;

"blocked port resetting means" for responding to a match output of the address match detecting means by changing a communication port having received said RRR frame (referred herein to an RRR reception port) to an unblocked state;

"RRR reception responding means" for responding to a mismatch output of the address match detecting means by reading identification information of an adjacent transmission station corresponding to the RRR reception port from either adjacent station address setting means, to have as a destination to be addressed, and sending an RRR frame generated with the destination, through the RRR reception port, immediately in time for completion of reception of the RRR frame; and "RRR responding acknowledgment means" for detecting by checking for reception of an RRR frame addressing own station as a destination, within a preset time, following said sending said RRR frame, as an anomaly has occurred in a transmission line or at a transmission station on a route from a transmission station for sending SYN frames (referred herein to a synchronizing station), this transmission station being inclusive, with terminal stations inclusive, for a respective transmission station on ways from a location of occurrence of anomaly to the terminal stations, by a step of detecting an anomalous state by said no-SYN detecting means and said reception anomaly detecting means in response to the occurrence of anomaly, and for a respective transmission station adjacent to the location of occurrence of anomaly on routes from the location of occurrence of anomaly to the synchronizing station, by a step of detecting an anomalous state by the reception anomaly detecting means, wherein as-having-detected communication ports have their status turned to blocked states, respectively, and between said terminal stations being two, for one terminal station in a subsequent position on a route from the synchronizing station to the location of occurrence of anomaly, by a step of determining at this terminal station (referred herein to a SYN absence detecting terminal station) an anomaly as having occurred on the route to the synchronizing station, from a detection output of the anomalous state by said SYN absence detecting means and a no-SYN detection output of the SYN absence detecting means, and for the other terminal station (referred herein to a SYN normal terminal station), which continuous receiving SYN frames normally, by a step of determining a route from this SYN normal terminal station to the synchronizing station as having a maintained normal communication function, for the SYN absence detecting terminal station, by a step of responding to a detection of occurrence of anomaly of a state of SYN absence from the SYN absence detecting and no-SYN detecting means, by immediately sending RRR frames addressing the SYN normal terminal station as a destination, through the communication port A, and -B, and a step of waiting, at the RRR responding acknowledgment means, for a response from a transmission station adjacent on an opposite side to the SYN normal terminal station, for the SYN normal terminal station, by a step of responding to reception of an RRR frame from the SYN absence detecting terminal station, as own station is a destination, by changing an RRR reception port that has been in a blocked state as a terminal station, to an unblocked state by said blocked port resetting means, as the terminal station status is cancelled, for a respective transmission station functioning normally on a way from the SYN absence detecting terminal station to the location of occurrence of anomaly, by a step of responding to reception of an RRR frame from the SYN absence detecting terminal station, as being not a destination, by sending an RRR frame having as a destination an adjacent transmission station on the way to the SYN absence detecting terminal station, by said RRR reception responding means, through an RRR reception port, immediately after a completion of reception of the RRR frame.

for the SYN absence detecting terminal station, by a step of responding to reception in time of an RRR frame addressing own station from an adjacent station on the way to the synchronizing station, by the RRR responding acknowledgment means, by changing a communication port that has been in a blocked state since the time of anomaly detection, to an unblocked state, and a step of following this changing to change, after lapse of a time the RRR responding acknowledgment means has preset, also the other communication port that has been blocked since before as a terminal station, to an unblocked state, thereby canceling the terminal station status, for the respective transmission station functioning normally on the way from the SYN absence detecting terminal station to the location of occurrence of anomaly, by a step of responding to acknowledgment of reception of an RRR frame addressing own station from the adjacent station on the way to the synchronizing station, by the RRR responding acknowledgment means, by changing a communication port that has been in a blocked state since the time of anomaly detection, to an unblocked state, for a respective transmission station adjacent to the location of occurrence of anomaly on ways to SYN absence detecting terminal stations, by a step of following absence of reception of an RRR frame addressing own station over lapse of a preset time, by the RRR responding acknowledgment means, to hold a communication port as it is blocked, to function as a new terminal station, and for occurrence of anomaly at a location adjacent to a SYN absence detecting terminal station, likewise followed by absence of reception of an RRR frame addressing own station over lapse of a preset time, by the RRR responding acknowledgment means, by a step of holding a communication port that has been in a blocked state since the time of anomaly detection, as it is blocked, and in that the other communication port that has been in a blocked state since before as a terminal station is changed to an unblocked state, and as new terminal stations, a terminal station on a way from the anomaly occurrence location to the synchronizing station, and a terminal station on an opposite way from the anomaly occurrence location are changed to be new double ring network's terminal stations, whereby a network of the ring form is re-configured upon occurrence of communication anomaly.

Embodiment 10

Claim 10

This is the reconfiguration method in anomaly occurrence for double-ring networks according to the embodiment 9 (claim 9), characterized in a state of configuration for transmission frames to be kept from continuing circulation in the network of the ring form, by two adjacent terminal stations, with the above-noted said initialization completed, under a condition that one or more said transmission stations are compliant with a specifically undefined transmission line control system for avoiding collisions between transmission frames on double ring networks, to send specific information-containing one or more transmission frames to be periodically sent and, among others, above-noted said SYNN frames, and transmission frames to be sporadically sent, wherein respective transmission station comprises "own address setting" means for setting information for identification of own station, and "adjacent station address setting means A, and -B" for setting information for identification of transmission stations adjacent to communication ports A, and -B, respectively, as an anomaly has occurred in a transmission line or at a transmission station on a route from a transmission station for sending SYN frames (referred herein to a synchronizing station), this transmission station being inclusive, with terminal stations inclusive, for a respective transmission station on ways from a location of occurrence of anomaly to the terminal stations, by means for detecting an anomalous state by said no-SYN detecting means and said reception anomaly detecting means in response to the occurrence of anomaly, and for a respective transmission station adjacent to the location of occurrence of anomaly on routes from the location of occurrence of anomaly to the synchronizing station, by means for detecting an anomalous state by the reception anomaly detecting means, wherein as-having-detected communication ports have their status turned to blocked states, respectively, and between said terminal stations being two, for one terminal station in a subsequent position on a route from the synchronizing station to the location of occurrence of anomaly, by means for determining at this terminal station (referred herein to a SYN absence detecting terminal station) an anomaly as having occurred on the route to the synchronizing station, from a detection output of the anomalous state by said SYN absence detecting means and a no-SYN detection output of the SYN absence detecting means, and for the other terminal station (referred herein to a SYN normal terminal station), which continuous receiving SYN frames normally, by means for determining a route from this SYN normal terminal station to the synchronizing station as having a maintained normal communication function, for the SYN absence detecting terminal station, by means for monitoring a sequence of transmission frames received from the SYN normal terminal station, sending specific control information-containing transmission frames (referred herein to an RRR frame each) addressing the SYN normal terminal station as a destination, at sending timings of transmission frames assigned to own station in compliance with a transmission line control system for avoiding collisions between transmission frames on double ring networks, through the communication port A, and -B, and waiting for reception of an RRR frame addressing own station as a destination from an adjacent station on the way to the synchronizing station, for the SYN normal terminal station, by means for responding to reception of an RRR frame from the SYN absence detecting terminal station, by comparing own station identification information with destination information in the received RRR frame, and for a result of this comparison that own station is the destination, by means for changing a communication port having received said RRR frame (referred herein to an RRR reception port) that has been in a blocked state since before as a terminal station, to an unblocked state, canceling the terminal station status, for a respective transmission station functioning normally on a way from the SYN absence detecting terminal station to the location of occurrence of anomaly, by means for responding to reception of an RRR frame from the SYN absence detecting terminal station, by comparing own station identification information with destination information in the received RRR frame, and for a result of this comparison as being not the destination, by means for sending an RRR frame having as a destination an adjacent transmission station on the way to the SYN absence detecting terminal station, by said RRR reception responding means, through an RRR reception port, immediately after a completion of reception of the RRR frame, for the SYN absence detecting terminal station, by means for responding to reception within a preset time of an RRR frame addressing own station from an adjacent station on the way to the synchronizing station, by changing a communication port that has been in a blocked state since the time of anomaly detection, to an unblocked state, and means for following this to change, after lapse of a time the RRR responding acknowledgment means has preset, also the other communication port that has been blocked since before as a terminal station, to an unblocked state, canceling the terminal station status, for the respective transmission station functioning normally on the way from the SYN absence detecting terminal station to the location of occurrence of anomaly, by means for responding to acknowledgment of reception within a preset time of an RRR frame addressing own station from the adjacent station on the way to the synchronizing station, by changing a communication port that has been in a blocked state since the time of anomaly detection, to an unblocked state, for a respective transmission station adjacent to the location of occurrence of anomaly on ways to SYN absence detecting terminal stations, by means for following absence of reception of an RRR frame addressing own station over lapse of a preset time, by the RRR responding acknowledgment means, to hold a communication port as it is blocked, to function as a new terminal station, and for occurrence of anomaly at a location adjacent to a SYN absence detecting terminal station, likewise followed by absence of reception of an RRR frame addressing own station over lapse of a preset time, by means for holding a communication port that has been in a blocked state since the time of anomaly detection, as it is blocked, and in that the other communication port that has been in a blocked state as a terminal station is changed to an unblocked state, and as new terminal stations, a terminal station on a way from the anomaly occurrence location to the synchronizing station, and a terminal station on an opposite way from the anomaly occurrence location are changed to be new double ring network's terminal stations, whereby a network of the ring form is re-configured upon occurrence of communication anomaly.

Embodiment 11

Claim 11

The reconfiguration method in anomaly occurrence for double-ring networks according to according to the embodiment 9 (claim 9) and the embodiment 10 (claim 10), wherein, as for a format of said transmission frame to be sent and received through said communication ports, and a transmission line interface of said communication ports, it complies with the ISO/IEC8802-3 standard.

This is. The embodiments will be described.

Figure 2:
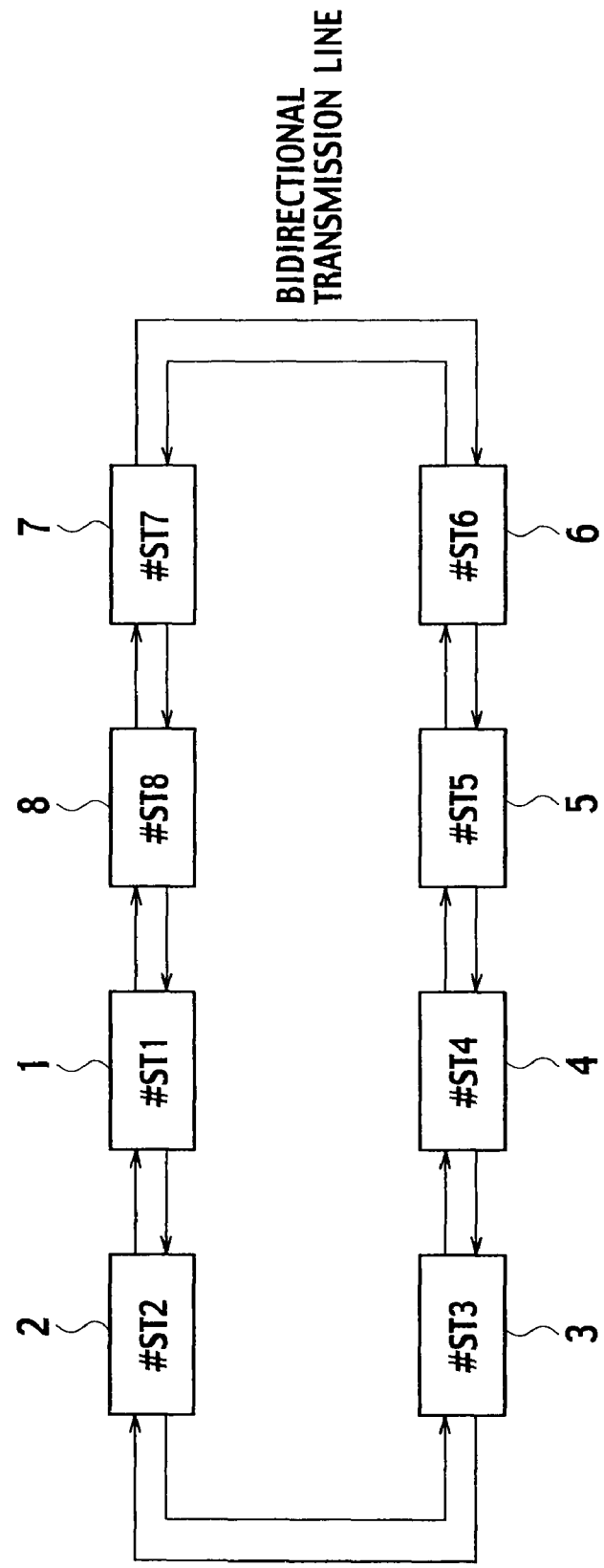
FIG. 2 is diagram describing a set of transmission stations mutually connected by a bi-directional transmission line in a double ring network system.

FIG. 2 is a schematic diagram of configuration of a double ring network system (referred herein sometimes simply to a double ring network) to which the present invention is applicable.

FIG. 2 includes eight transmission stations (transmission stations 1 to 8), which are mutually connected through a bi-directional transmission line to constitute a ring form network, as illustrated in FIG. 2. In FIG. 2, transmission station 1 is labeled as #ST1, transmission station 2, as #ST2, transmission station 3, as #ST3, transmission station 4, as #ST4, transmission station 5, as #ST5, transmission station 6, as #ST6, transmission station 7, as #ST7, and transmission station 8, as #ST8, to indicate their station addresses on the network.

To the embodiment 1 (claim 1), FIG. 1 gives an example of so-called double ring network system in the invention. In the example of FIG. 1, transmission station 1 (#ST1) serves as a master station (MS), and transmission station 5 (#ST5) as well as transmission station 6 (#ST6) stands as a terminal station. That one which is first powered on to start serves as the master station.

In FIG. 1, transmission stations being eight in total are mutually connected like the double ring network system in FIG. 2, while in the double ring network system according to this invention, each transmission station has an own station automatic terminal station function as described, which is not given in the double ring network system in FIG. 2.

The own station automatic terminal station function allows for a transmission frame sent from one transmission station's communication port and received at the other transmission station's communication port connected thereto through a transmission line to be detected at the transmission station, and responded in accordance with information contained in the transmission frame, while it is kept from being repeated from the communication port where it is received to the other communication port.

Therefore, as a terminal station given a function not to send the transmission frame from the other communication port, the transmission station 5 (#ST5) constituting a terminal station ST-T-L, and the transmission station 6 (#ST6) constituting a terminal station ST-T-R are incorporated in the configuration as a pair.

It therefore is possible for transmission frames sent from transmission stations to be kept from being circulated in the network system configured in a ring form.

It is noted that in FIG. 1 #ST5 and #ST6 are labeled with terminal station ST-T-L and terminal station ST-T-R, respectively, which is in no way restrictive in the network configuration of FIG. 1.

That is, FIG. 1 is a double ring network system including a set of two or more transmission stations each configured with a pair of communication ports for communications to be implemented bi-directionally, and mutually connected by their pairs of communication ports in a ring form through a transmission line to implement intercommunications between transmission stations.

The transmission stations are each adapted to simultaneously send transmission frames containing information at a time from two communication ports to adjacent transmission stations.

Further, they are each adapted to detect a transmission frame sent from another transmission station and received at one of two communication ports, repeat it to the other communication port, and send the transmission frame from the other communication port.

A respective one of adjacent two transmission stations out of the set of two or more transmission stations mutually connected in the ring form is adapted to detect, at the transmission station, a transmission frame sent from one transmission station's communication port under a later-described specific condition and received at the other transmission station's communication port as it is connected through the transmission line, while the transmission frame is responded in accordance with information contained in the transmission frame, it is kept from being repeated from the communication port where it is received to the other communication port.

That is, whether odd or even in number, if the specific condition is met, the transmission frame is kept from being sent from the other communication port, whereby it is kept from arriving at ring-form connected and subsequent transmission stations in a repeating direction thereof, so transmission frames sent from transmission stations can be kept from circulating in a network configured in the ring form.

For the embodiment 2 (claim 2), providing #ST1 shown in FIG. 1 as a master station, relative to the #ST1 as a base, #ST5 and #ST6 are uniquely determined as terminal stations depending on the number of transmission stations (eight in this case) and the length of transmission line through the transmission stations.

Although specific determination procedures may vary depending on claim 4, claim 5, and embodiment examples thereof, the position of terminal station to be set is a respective one of adjacent transmission stations on the opposite side of the ring in view of a transmission station selected as the master station, and located about a count number of half the total transmission station number as it is counted from the master station.

That is, by configuration of terminal stations in positions determined relative to the master station, transmission frames sent from transmission stations can be kept from circulating in a network configured in a ring form.

That is, like FIG. 1, there is a plurality of transmission stations each respectively provided with a pair of communication ports and mutually connected in a ring form to constitute a double ring network system. Again, at a respective transmission station, transmission frames are simultaneously sent at a time from the paired communication ports, and a transmission frame from another transmission station is received at one communication port, where it is detected, and repeated to the other communication port, and sent from the other communication port.

And, there are terminal stations set as adjacent paired transmission stations out of a set of two or more transmission stations mutually connected in a ring form, in positions (odd umber or even number inclusive) determined relative to one transmission station as a base, in accordance with a total number of transmission stations constituting the network of the ring form and a total length of the transmission line connecting the transmission stations with each other, of which a respective transmission station is adapted to detect, at the transmission station, reception of a transmission frame sent from one transmission station's communication port and received at the other transmission station's communication port as it is connected through the transmission line. Further, the transmission stations set as terminal stations are each adapted to provide a response in accordance with information contained in the transmission frame, but not for any repeat from the communication port where it is received to the other communication port.

Therefore, at the respective transmission station set as a terminal station, the transmission frame is kept from being sent from the other communication port, whereby it is kept from arriving at ring-form connected and subsequent transmission stations in a repeating direction thereof, so transmission frames sent from transmission stations can be kept from circulating in the network configured in the ring form.

The embodiment 3 (claim 3) allows for dominances in, among others, convenient utilization or incorporation such as of network components, accessories, or media converters, or interfacing devices, or test testing devices, such as in or for transmitter or receiver IC's, data transmission reception LSI's or circuit components remarkable in performance enhancement and price decline, as well as in consistency and practical profit such as those with or by communication protocol extension procedures, protocol processing firmware or middleware, or general-purpose IT application software programs, or test testing procedures being developed on the Ethernet®.

There will be described examples of device configuration of a transmission station for double ring network systems according to the present invention, before entering specific description of embodiment examples and procedures of the embodiment 4 (claim 4) et seq.

Figure 4:
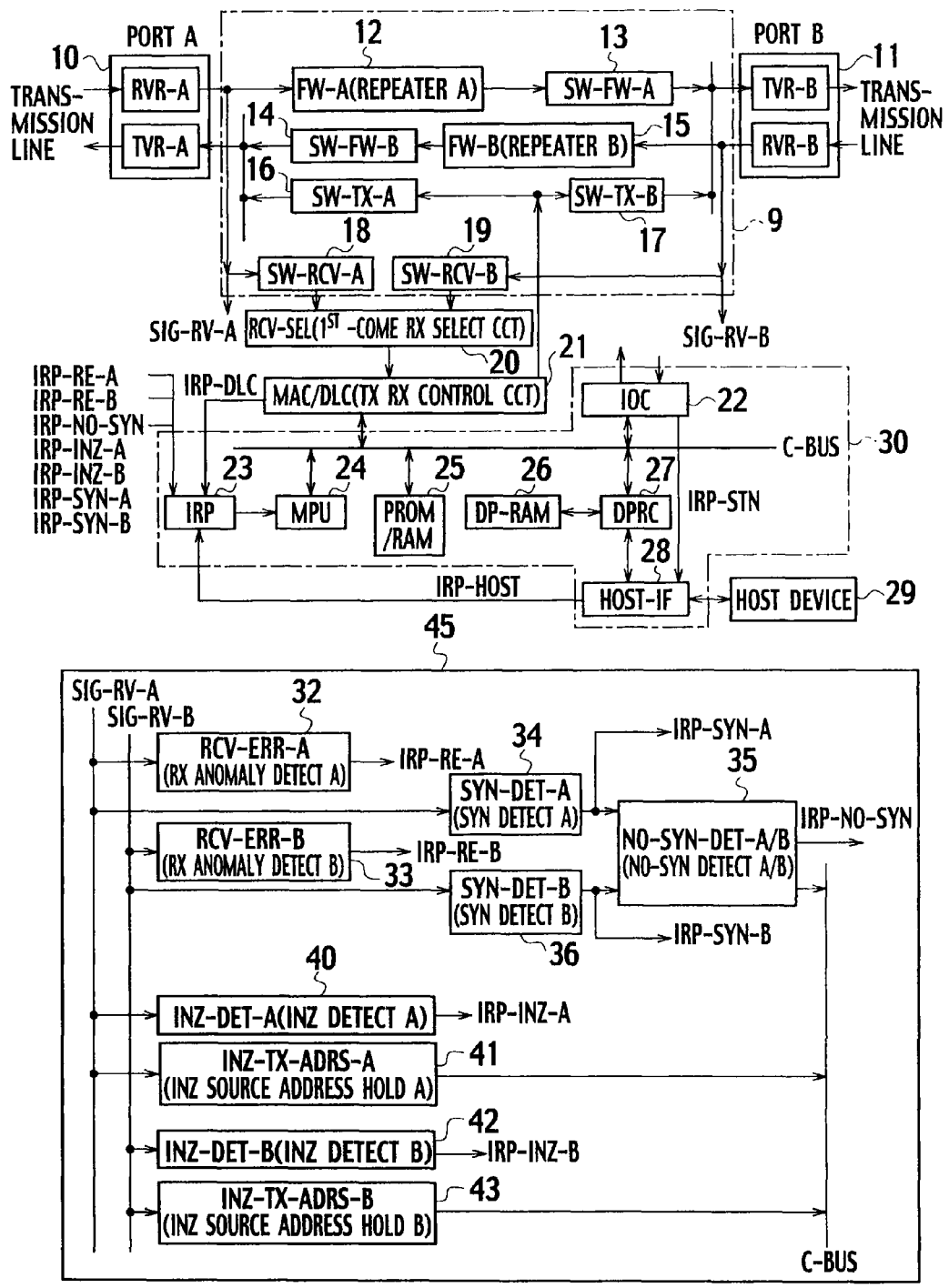
FIG. 4 is diagram of a hardware configuration constituting an embodiment example (the $2^{nd}$) of a configuration of transmission station for double ring network systems.

FIG. 3 and FIG. 4 show configurations of hardware constituting embodiments (the $1^{st}$) and (the $2^{nd}$) of transmission stations of a double ring network system according to the present invention.

The configurations of hardware in FIG. 3 and FIG. 4 are different from each other, particularly in that the hardware configuration FIG. 3 includes an INZ frame reception detecting circuit 40 (RRR-DET-A), an INZ frame reception detecting circuit 39 (RRR-DET-B), and an RRR frame destination address holding circuit 38 (RRR-RCV-ADRS), which are omitted from an arrangement in FIG. 4, which is referred to a frame detecting section 45 in FIG. 4 to tell it from FIG. 3.

As a communication port section 10 on one hand, a port A is configured with a receiver (RVR-A) and a transmitter (TVR-A) to implement bi-directional communications with an adjacent station. And, as a communication port section 11 on the other hand, a port B is configured with a receiver (RVR-B) and a transmitter (TVR-B) to implement bi-directional communications with an adjacent station.

Upon a reception at the port A, as an output of the RVR-A, a reception signal (SIG-RV-A) from the port A is lead to a repeater A (FW-A) designated at 12, and a reception permitting switch 18 (SW-RVC-A), and inside a frame detection determiner 31, where it is lead to a reception anomaly detecting circuit 32 (RCV-ERR-A), a SYN frame detecting circuit 34 (SYN-DET-A), the RRR frame reception detecting circuit 37 (RRR-DET-A), the RRR frame destination address holding circuit 38 (RRR-RCV-ADRS), an INZ frame reception detecting circuit 40 (INZ-DET-A), and an INZ frame source address holding circuit 41 (INZ-TX-ADRS-A).

Likewise, upon a reception at the port B being another communication port section 11, as an output of the RVR-B, a reception signal (SIG-RV-B) from the port B is lead to a repeater B (FW-B) designated at 15, a reception permitting switch 19 (SW-RCV-B), a reception anomaly detecting circuit 33 (RCV-ERR-B), a SYN frame detecting circuit 36 (SYN-DET-B), the RRR frame reception detecting circuit 39 (RRR-DET-B), the RRR frame destination address holding circuit 38 (RRR-RCV-ADRS), an INZ frame reception detecting circuit 42 (INZ-DET-B), and an INZ frame source address holding circuit 43 (INZ-TX-ADRS-B).

A transmission reception control circuit 21 (MAC/DLC), adapted to control transmission and reception of transmission frames compliant with Ethernet® protocol, has a transmission output, which is lead to a transmission permitting switch 16 (SW-TX-A) and a transmission permitting switch 17 (SW-TX-B). A transmission output signal from the transmission reception control circuit 21 (MAC/DLC) is sent, when the transmission permitting switch 16 (SW-TX-A) is in a permitting ON state, to the TVR-A of the port A as the communication port section 10 at one hand, and when the transmission permitting switch 17 (SW-TX-B) is in an ON state, to the TVR-B of the communication port section 11 at the other hand.

When in a switch state OFF, the switch cuts transmission output signals of the transmission reception control circuit 21 (MAC/DLC: referred sometimes to a transmission line controller), with a result that no transmission frame is sent out from a corresponding communication port.

Upon reception of a transmission frame at the port A, it is to be lead via an output of the repeater 12 (FW-A) and a repeat permitting switch 13 (SW-FW-A), to the TVR-B of the port B. If the repeat permitting switch 14 (SW-FW-A) is on, the transmission frame received at the port A is repeated, and as a result, it is sent out from the port B.

If off, it is cut by the repeat permitting switch 13 (SW-FW-A), and kept from being repeated to send out. Likewise, upon reception of a transmission frame at the port B, it is to be lead via an output of the repeater 15 (FW-B) and a repeat permitting switch 14 (SW-FW-B), to the TVR-A of the port A.

If the repeat permitting switch 14 (SW-FW-B) is on, the transmission frame received at the port B is repeated, and as a result, it is sent out from the communication port 10 (referred sometimes simply to a port A). If off, it is cut by the repeat permitting switch 14 (SW-FW-b), and kept from being repeated to send out.

Upon reception of a transmission frame at the port A, it is to be lead via the reception permitting switch 18 (SW-RCV-A), to a first-come reception selecting circuit 20 (RCV-SEL). Likewise, upon reception of a transmission frame at the port B (referred sometimes simply to a port B), it is to be lead via the reception permitting switch 19 (SW-RCV-B) designated at 19, to the first-come reception selecting circuit 20 (RCV-SEL).

The first-come reception selecting circuit 20 (RCV-SEL) checks for an overlap between reception signals from port A and port B, and if it is found, makes a selection for a reception to be completed with a priority to a transmission signal received at the first-come port side. The determination of first-come will be described later on.

An RCV-SEL output from the first-come reception selecting circuit 20 (RCV-SEL) is lead to the transmission reception control circuit 21 (MAC/DLC) as a transmission line controller, where it is processed for reception. According to the present invention, a double ring network system is configured in a ring form, nonetheless, to be equivalent to a bus type network, while working in a sound state, and at transmission stations except for terminal stations, a transmission frame is received temporarily at either port, depending on positional relations between own station and transmission frame sending stations.

And, at the terminal stations, being connected in a ring form where transmission frames to be received come up to both ports, normally at a blocked port side the reception permitting switch is turned off, allowing a reception input at an unblocked port side.

In this invention, such the reception permitting switches, transmission permitting switches, and repeat permitting switches are controlled to switch on and off status thereof.

An MPU 24, which is configured as a core microprocessor, follows procedures of programs stored in (a PROM among) program memories (employing the PROM, a working RAM memory, and a RAM), reading set values as necessary, and writing necessary data, temporarily holding or reading, to implement processes of, among others, Ethernet® transmission protocol and sequence procedures at transmission stations according to this invention.

An IOC 22 is configured as an input output control circuit for receiving written data from the MPU 24 to output control signals to requiring circuits, or for receiving status inputs of respective circuits for the MPU 24 to read.

A DP-RAM 26 is configured as a dual-port memory circuit for storage of data on transmission frames received or to be transmitted at the MAC/DLC, and as a host linking interface circuit 28 for an external host device 29 linked with the transmission station (as a memory circuit for exchange of condition status, and control commands, as well as for data to be transmitted or received through the HOST-IF). The DP RAM 26 is accessed from the MPU 24, HOST-IF 28, and MAC-DLC 21, and a DPRAM controller has reading and writing timings controlled by the DPRC 27.

The reception anomaly detecting circuit 32 (RCV-ERR-A) and the reception anomaly detecting circuit 33 (RCV-ERR-B) are circuits for detecting reception anomalies corresponding to the port A and the port B, respectively.

The reception anomaly may be reception of preamble patterns as reception clock synchronizing signals typical to Ethernet®, greater in number than specified, having dividable carrier signals of arrived frames.

To the contrary, there may be an occurrence of detection anomaly determined by detection of consecutive reception errors greater in number than specified, such as errors greater in number than specified as consecutively detected by checks to an error detection code (FCS) of transmission frame provided for Ethernet® transmission frames, or failures in detection of a required preamble pattern, while for detection circuits the range excludes FCS check means provided for the DLC/MAC and a static processing of results thereof by the MPU 24.

The SYN frame detecting circuit 34 (SYN-DET-A) and the SYN frame detecting circuit 36 (SYN-DET-B) are circuit for detecting arrivals of SYN frames corresponding to the port A and the port B, respectively.

On the other hand, the SYN absence detecting circuit 35 (NO-SYN-DET-A/B) is a circuit for detecting an occurrence of a long duration of a SYN-free silent state.

The RRR frame reception detecting circuit 37 (RRR-DET-A) and the RRR frame reception detecting circuit 39 (RRR-DET-B) are circuits for detecting reception of RRR frames corresponding to the port A and the port B, respectively.

The RRR frame destination address holding circuit 38 (RRR-RCV-ADRS) is a circuit for taking in, to hold, a filed of destination address (DA) in a received RRR frame. The RRR-RCV-ADRS has a circuit configuration adapted to take in signals received at both sides.

The INZ frame reception detecting circuit 37 (INZ-DET-A) and the INZ frame reception detecting circuit 38 (INZ-DET-B) are circuits for detecting reception of INZ frames corresponding to the port A and the port B, respectively.

The INZ frame source address holding circuit 41 (INZ-TX-ADRS-A) and the INZ frame source address holding circuit 41 (INZ-TX-ADRS-B) are circuits for holding fields of source addresses (SA) in received INZ frames, corresponding to the port A and the port B, respectively.

An interrupt signal detecting circuit 23 (IRP) is configured as a circuit for detecting interrupt signals as signals interrupting to inform the MPU 24 of occurrences of events detected in circuitry of transmission station.

Enumerative as interrupt signals are those of: reception anomaly occurrence detection (IRP-RE-A, -B), SYN absence detection (IRP-NO-SYN), SYN frame reception detection (IRP-SYN-A, -B), RRR frame reception detection (IRP-RRR-A, -B), INZ frame reception detection (IRP-INZ-A, -B), MAC/DLC transmission or reception completion detection (IRP-DLC), processing requests to MPU (IRP-HOST), processing requests from MPU to host device (IRP-STN), etc.

A C-bus constitutes a common data bus connected to the MPU 24, and through the C-bus, the MPU 24 is adapted to read, among others, detected status in particular of the NO-SYN-DET-A/B, pieces of RRR frame destination address information held in the RRR-RCV-ADRS, and pieces of INZ frame source address information held in the INZ-TX-ADRS-A, -B.

The present invention presuppose, as the embodiment 11 (claim 11), employing a transmission frame in compliance with the ISO/IEC 8802-3 Ethernet® standard.

It is noted that an ISO/IEC 8802-3 Ethernet® standard-compliant transmission frame is illustrated in FIG. 23.

In FIG. 23, designated at PRE is a preamble pattern, 7-byte length, for reception signal synchronization, SFD is a frame starting pattern, 1-byte length, DA is a destination address, SA is a source address, LEN/TYPE is a type code number indicating a protocol type of transmission frame, and Inf is an information field of transmission frame.

The RRR frame destination holding circuit 41 (RRR-RCV-ADRS) is adapted as a circuit for exclusively taking in, to hold, the DA field, and the INZ frame source address holding circuit 41 (INZ-TX-ADRS-A) as well as the INZ frame source address holding circuit 43 (INZ-TX-ADRS-B), the SA field.

For embodiment examples according to the embodiment 11 (claim 11), transmission frames employable as SYN, RRR, INZ, or INZ-COMP in this control system are not limited to any specific Ethernet® frame format.

The may well be an embodiment example of format in which those control frames are identifiable. Practically, there is a method of taking LEN/TYPE number, whereas this requires permission of a registration office administrating Ethernet® protocol Type numbers.

Further, there is a method of putting a piece of identifying information in a field of information to be defined by a protocol Type number that has been already given. One may implement, among others, a method of putting a piece of identifying information in a fixed data field position of a TCP data field or an extended field of a TCP header defined in the TCP/IP protocol that is general in the Ethernet®, or employ an exclusive format according to the UDP protocol.

For the embodiment 4 (claim 4) through the embodiment 10 (claim 10), transmission stations described have a configuration including a repeat permitting switch 13 (SW-FW-A), a repeat permitting switch 14 (SW-FW-B), a transmission permitting switch 16 (SW-TX-A), a transmission permitting switch 17 (SW-TX-B), a reception permitting switch 18 (SW-REC-A), and a reception permitting switch 19 (SW-REC-B), of which a respective one has a controlled switch status according to a protocol to be implemented, as a point.

Figure 6:
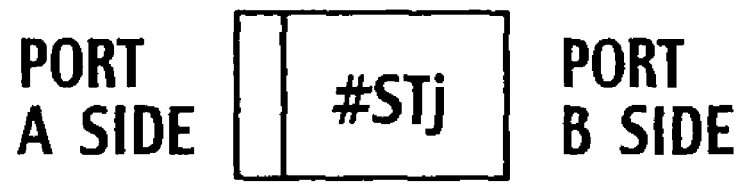
FIG. 6 shows status of switches and modes at a respective station at a time of startup of initialization.

For instance, the transmission stations have an initial state as illustrated in FIG. 6, where the CPU of the computer section 30 is operated for a setting to turn the repeat permitting switch 13 (SW-FW-A) off, the repeat permitting switch 14 (SW-FW-B) off, the transmission permitting switch 16 (SW-TX-A) on, the transmission permitting switch 17 (SW-TX-B) on, the reception permitting switch 18 (SW-RCV-A) off, and the reception permitting switch 19 (SW-RCV-B) off, and have an MS port undefined, and a station mode undefined. In other words, the transmission stations are set to a condition fundamentally identical to the condition they have when powered on.

With the setting illustrated in FIG. 6, the MPU 24 of the computer section 30 makes the transmission reception control circuit 21 (MAC/DLC) output a transmission output signal to the transmission permitting switches 16 (SW-TX-A) . . . .

By that, it is sent from the TVR-A of the communication port A to a transmission line, and through the transmission permitting switch 17 (SW-TX-B), from the TVR-B of the communication port B to a transmission line, as a frame to be transmitted.

For double ring networks and network systems making use of a control system thereof according to the present invention, there is supposed an initial condition of what is referred herein to a double ring network, as a first media portion.

FIG. 6 is an illustration of switch status and station mode of a respective station at a time of initialization start, with respect to the embodiment 4 (claim 4), embodiment 5 (claim 5), embodiment 6 (claim 6), and embodiment 7 (claim 7). It represents a condition fundamentally identical to that the transmission station has when powered on. There will be an INZ frame first received and detected at one of two communication ports being the port A and the port B, which will be referred to as an MS port.

For a transmission station according to the present invention, the configuration is symmetric in hardware structure between a transmission system and a reception system, so it is unnecessary to uniquely limit the communication port A or the communication port B to either communication port. In other words, there is no problem with the port A or B, whichever is selected to implement the claimed procedure.

However, in the following specific examples of embodiments, for a convenient purpose of comprehensible description with reduced complexity, each transmission station is assumed, in accordance with hardware configuration examples illustrated in FIG. 3 and FIG. 4, to have on the observers' left a communication port as a port A, and on the observers' right a communication port as a port B, which will be uniformly referred to.

Figure 8:
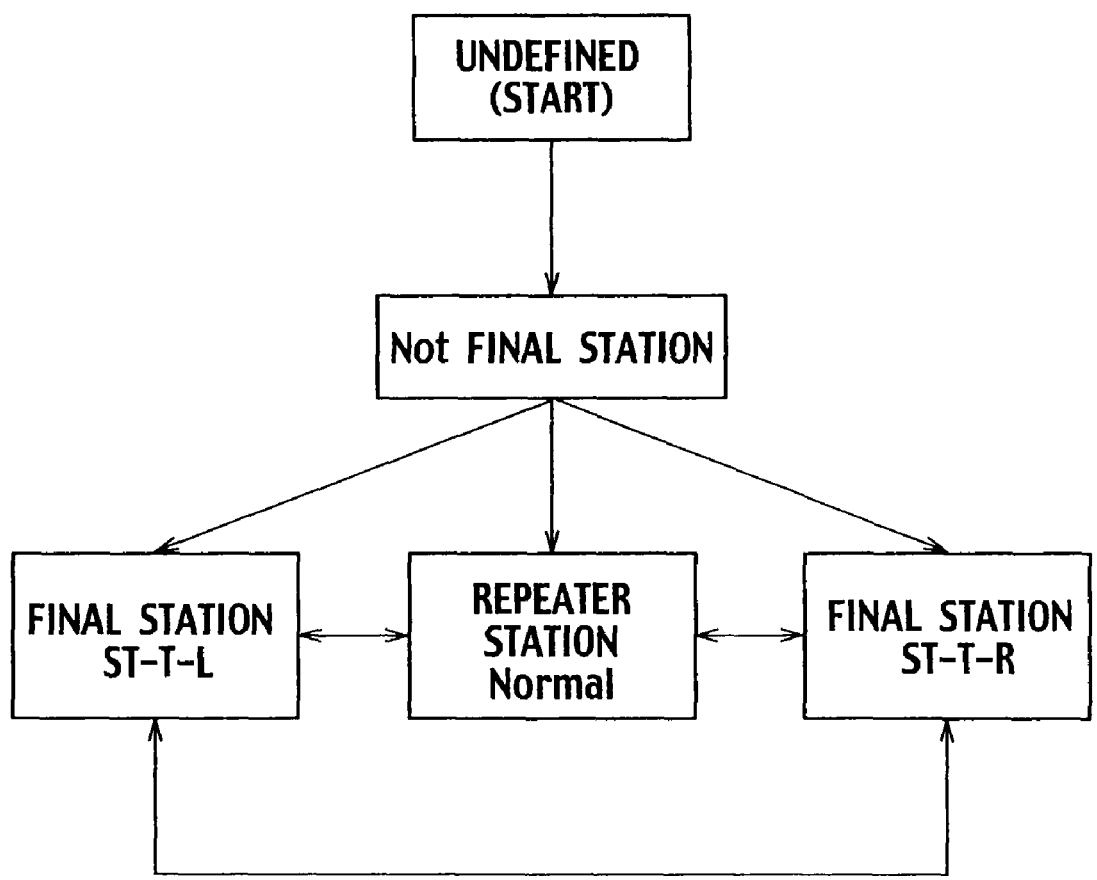
FIG. 8 is a diagram describing transition of station modes from a start of initialization.

As will be described later on in correspondence to respective claims, the station mode transits, as illustrated in FIG. 8, from the "undefined" status (start) identical to a status it has when powered on, through an intermediate mode "Not terminal station", to any status of terminal station "ST-T-L", repeater station "Normal", and terminal station "ST-T-R".

It is noted that in accordance with as-assumed limitation of correspondence to the port A and the port B in hardware configuration of transmission station described, the terminal station ST-T-L represents a transmission station blocked at the port B side, and the terminal station ST-T-R represents a transmission station blocked at the port A side, which will be uniformly referred to.

Figure 9:
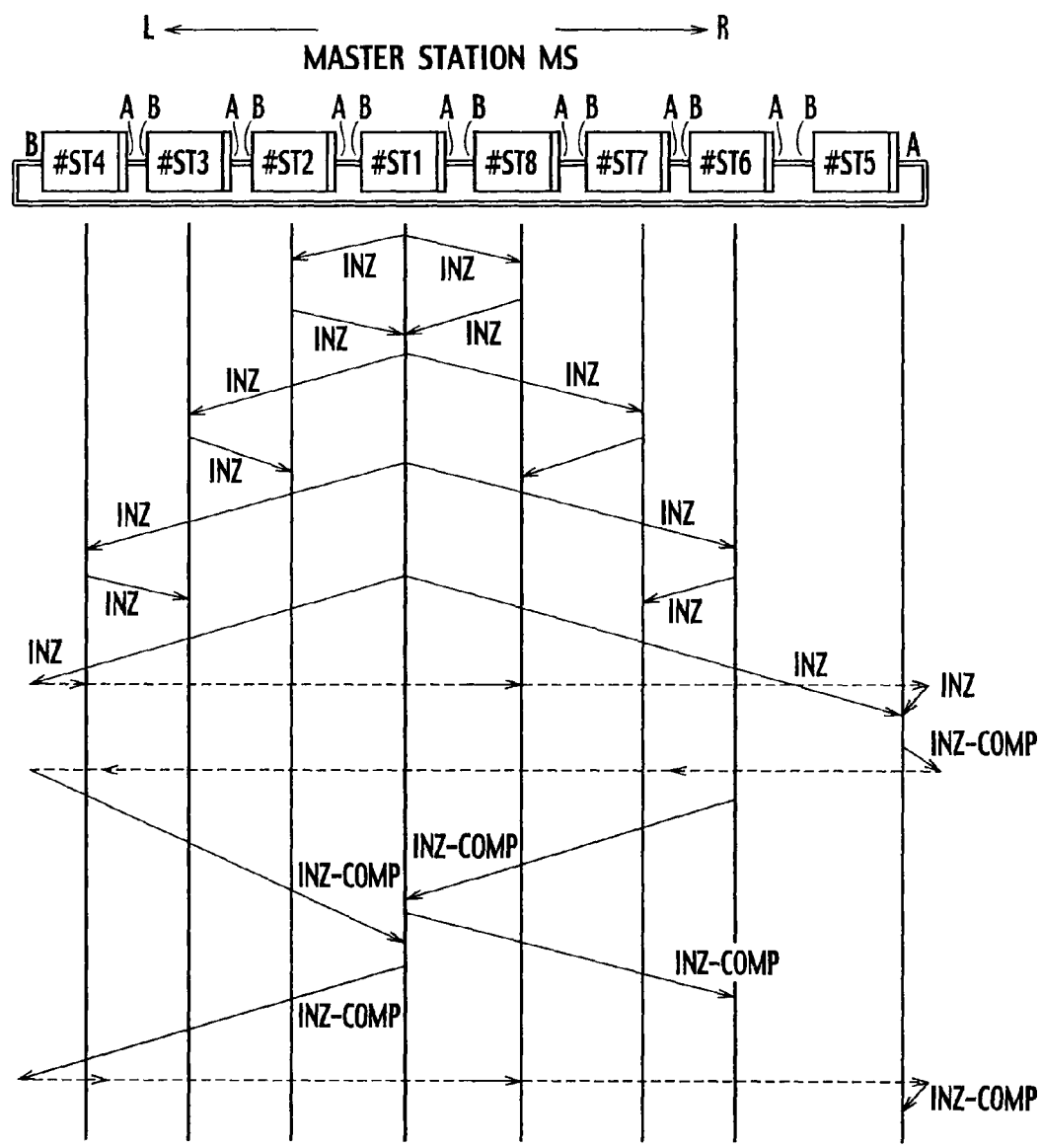
FIG. 9 is a sequence chart of an embodiment example (the $1^{st}$) of INZ frame intercommunications between transmission stations at a time of initialization.

For the embodiment 4 (claim 4), FIG. 9 illustrates sequences of INZ frames to be transmitted for intercommunications between transmission stations. Those initializing sequences will be detailed later on.

In the sequence chart of FIG. 9, a master station MS transmits INZ frames from transmission station #ST1 to . . . transmission station #ST4 and transmission station #ST8 transmission station #ST5. Having received INZ frames from transmission station #ST1 to . . . transmission station #ST4 and transmission station #ST8 . . . transmission station #ST5 return INZ frames to adjacent transmission stations of younger addresses.

With such an initialization completed, if an INZ frame sent to a certain transmission station fails to come back from the transmission station, it is assumed that a route to the transmission station has an anomaly (disconnection).

It is noted that for an INZ frame to be returned to an adjacent transmission station of a younger address in the description above, a transmission station that have received the INZ frame may not return the INZ frame.

Figure 11:
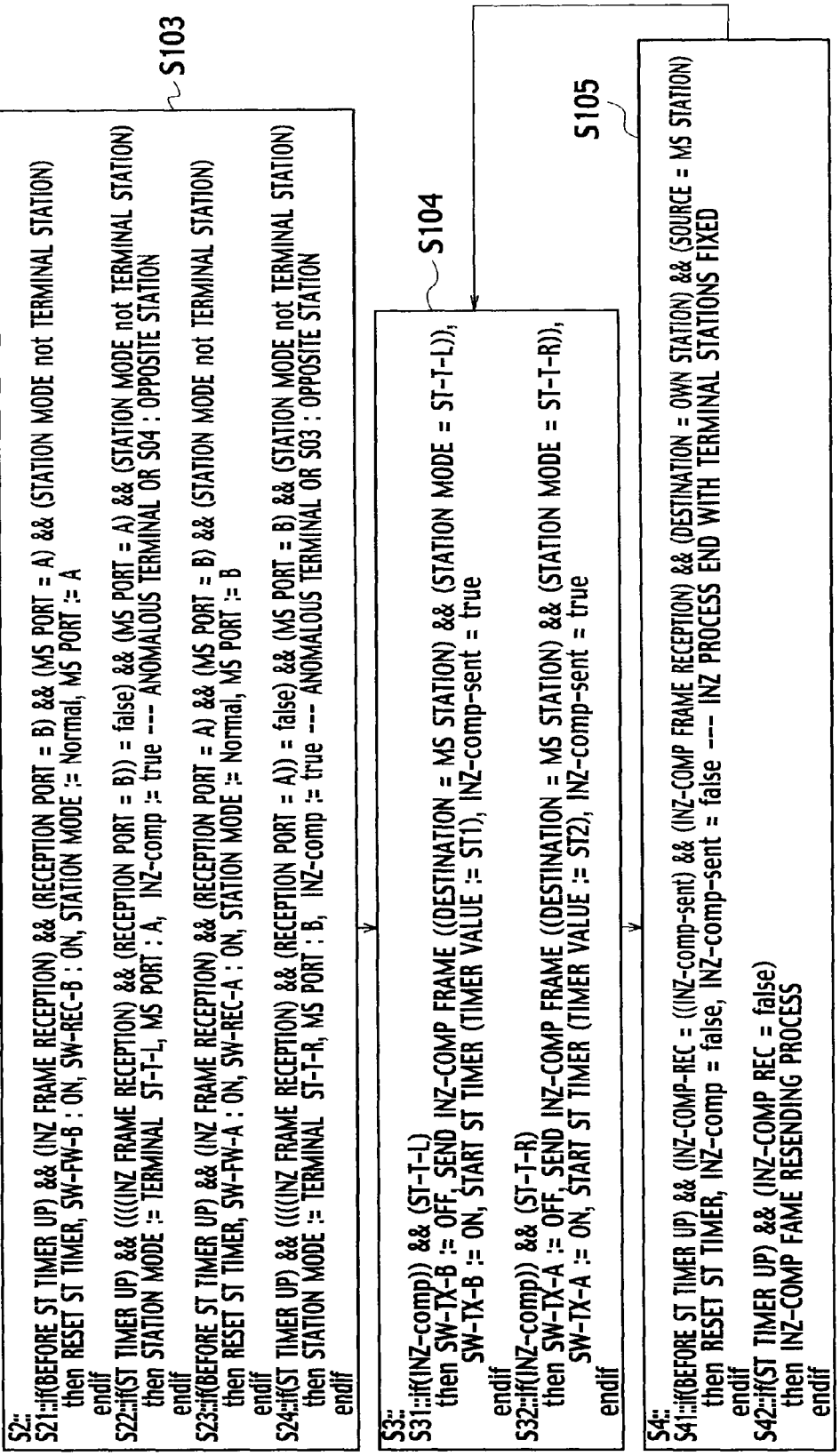
FIG. 11 is a flowchart describing the initializing process (the $1^{st}$) at the #STj transmission station.

Further, FIG. 10 and FIG. 11 show a flowchart describing an initializing process at a respective transmission station, excepting the master (MS) station, wherein it has undefined status and sends INZ frames from a pair of communications ports, to determine adjacent stations and whether or not it is a terminal station. This flowchart will be described later on.

Figure 12:
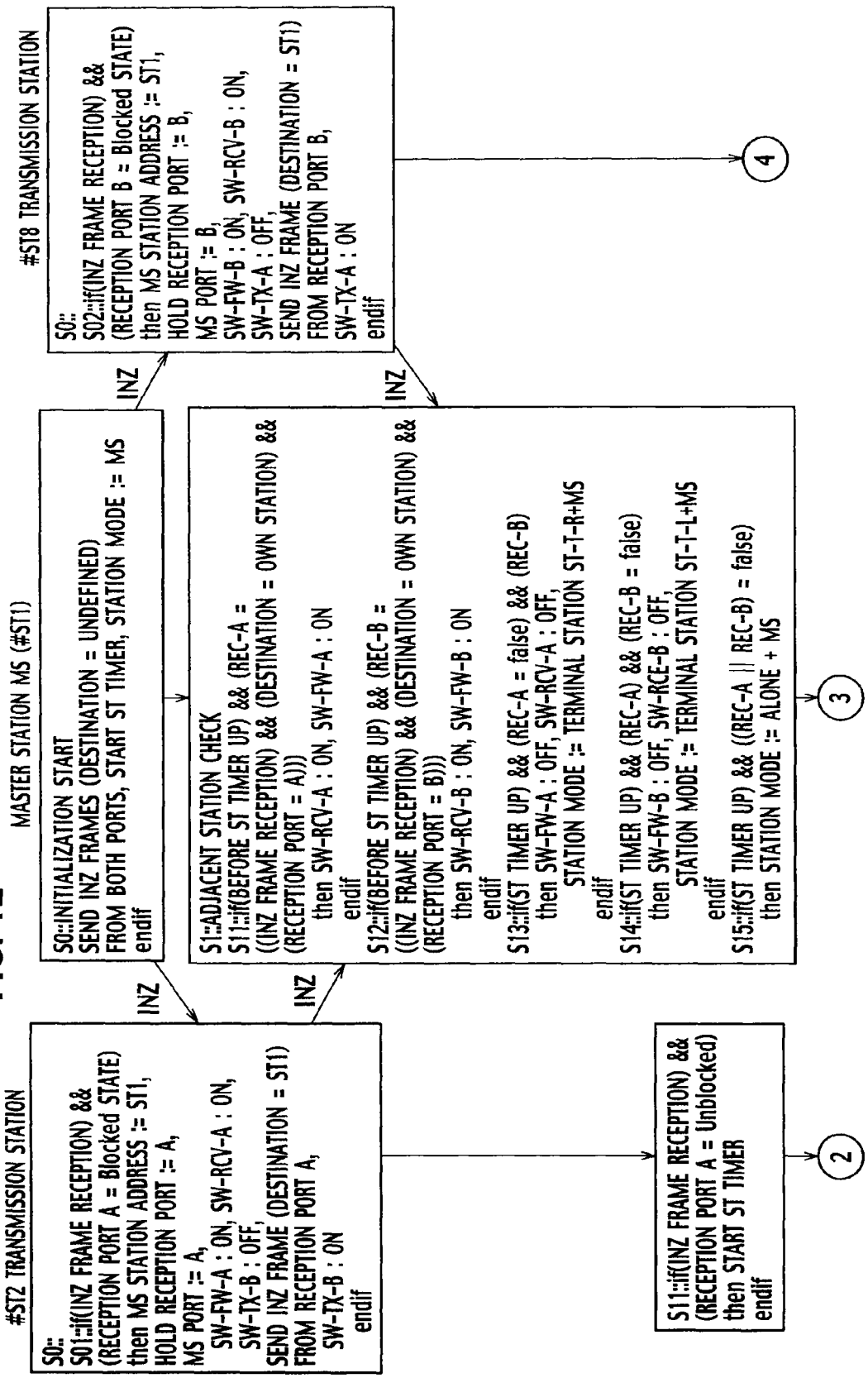
FIG. 12 is a sequence chart of an example (the $1^{st}$) of intercommunications between transmission stations at a time of initialization (for transmission stations ST1, ST2, and ST8).
Figure 13:
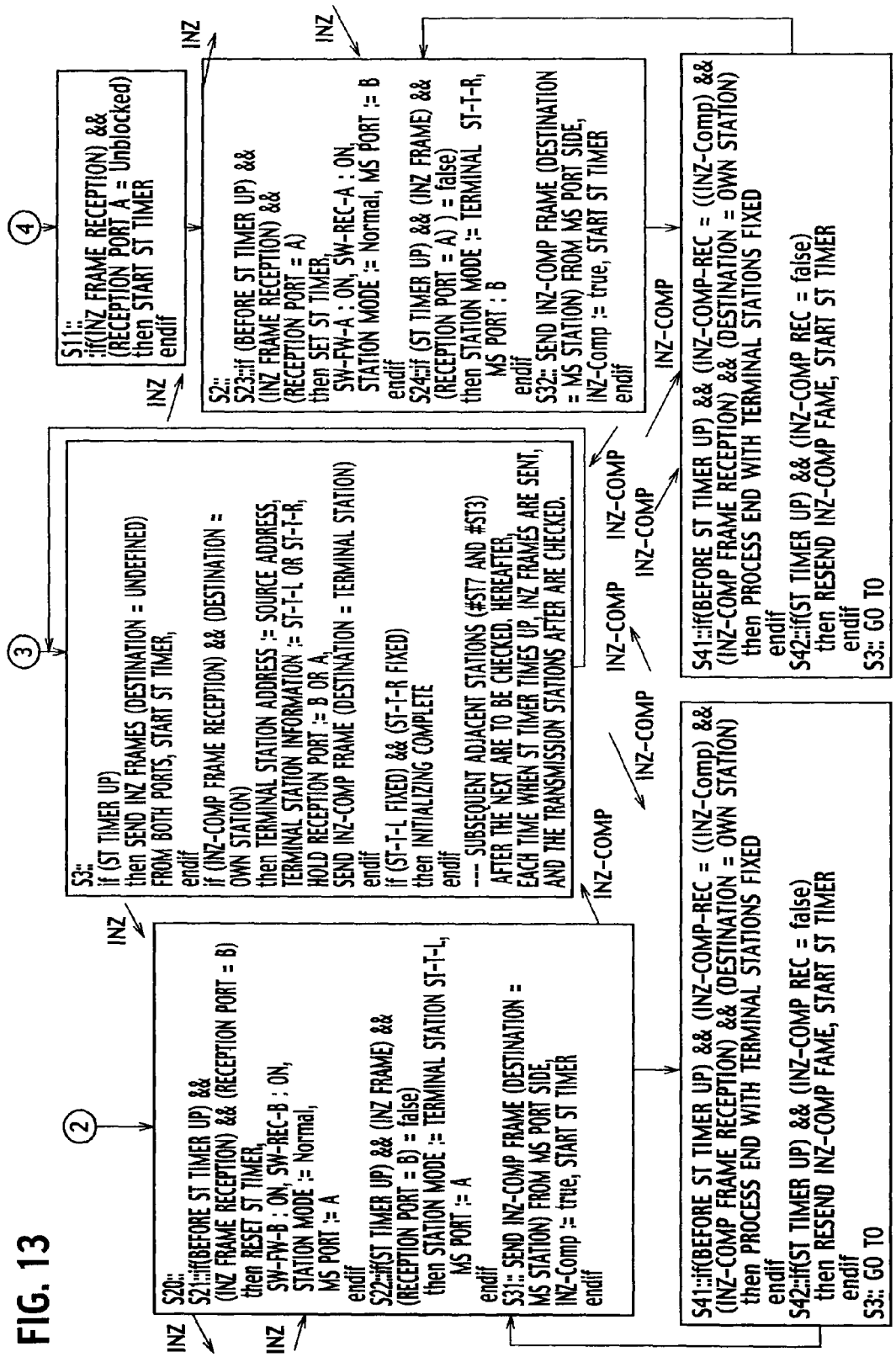
FIG. 13 is a sequence chart of the example (the 1) of intercommunications between transmission stations at a time of initialization (for transmission stations ST1, ST2, and ST8).

FIG. 12 and FIG. 13 show a flowchart including an initializing process of the MS station ST1, particularly encompassing flows of interactive actions at transmission stations ST2 and ST8 as adjacent stations of the MS station, in accordance with the initializing process at the respective station shown in FIG. 10 and FIG. 11.

It is noted that the example of configuration of double ring network system illustrated in FIG. 9 is associated with the example in FIG. 1, without restrictions such as to the total number of transmission stations, and the numbering for identification of transmission stations #ST1 to #ST9. Further, for claim 4, the embodiment examples of hardware configuration shown in FIG. 3 FIG. 4 are applicable.

As a transmission station to be a base, if #ST1 is set an MS station, then as illustrated in FIG. 9 the MS station enters an initialization, starting a ST timer software-controlled by the MPU 24 as shown at a step S0 in FIG. 12-FIG. 13.

Further, at a step S1, it implements checks of adjacent stations, while in this case ST2 and ST8 perform checks of corresponding adjacent stations for a terminal station. Then, the MPU 24 generates by software control initialization-instructing INZ frames periodically, each time when the ST timer times up, till the end of a step S3 where the initialization becomes complete. And the MP 24 drives the transmission reception control circuit 21 (MAC/DLC) to hold the transmission permitting switch 16 (SW-TX-A) and the transmission permitting switch 17 (SW-TX-B) in their on states, and send INZ frames from both port A and port B.

Transmission stations have an initial state, where the switches are set as shown in FIG. 6 to a condition in which both ports are blocked, and reception-prohibited, and therefore at processing steps shown in FIG. 12-FIG. 13, an arrival of INZ frame is checked for by the INZ frame reception detecting circuit 40 (INZ-DET-A) or the INZ frame reception detecting circuit 42 (INZ-DET-B).

By that, if an INZ frame is detected at the communication port A by the INZ frame reception detecting circuit 40 (INZ-DET-A), an INZ frame detecting signal (IRP-INZ-A) is sent out. By the INZ frame reception detecting circuit 42 (INZ-DET-B), an INZ frame detecting signal (IRP-INZ-B) is sent out.

And, by an interrupt of the signal to be INZ frame detecting signal (IRP-INZ-A) or INZ frame detecting signal (IRP-INZ-B), the MPU 24 processing it on software catches the reception of an INZ frame, and checks which port is the reception port where it is received.

For SIG-RV-A reception signals, i.e., frames received (L-handed) at port A, there are detections and determinations to be performed, which are implemented by the frame detecting determiner 31. For such detections and determinations, the frame detecting determiner 31 includes:

the reception anomaly detecting circuit 32 (RCV-ERR-A) adapted, when it has detected anomaly in reception of SIG-RV-A, to output an IRP-RE-A signal (referred sometimes to a reception signal A anomaly detecting signal) to the computer section 30.

The SYN frame detecting circuit 34 (SYN-DET-A) is adapted, as the SIG-RV-A reception signal from the communication port 10 is a SYN frame, to output an IRP-SYN-A signal (referred sometimes to a SYN frame detecting signal A) to the computer section 30 and the SYN absence detecting circuit 35 (NO-SYN-DET-A/B).

The RRR frame detecting circuit 37 (RRR-DET-A) is adapted, when it has detected an SIG-RV-A reception signal from TVR-A of the communication port 10 (port A) as an RRR frame, to output an IRP-RRR-A signal (an RRR frame reception detecting signal A) to the computer section 30.

The INZ frame detecting circuit 40 (INZ-DET-A) is adapted, when it has detected an INZ frame of an SIG-RV-A signal received at the communication port 10 (communication port A), to output an IRP-INZ-A signal (an INZ frame reception detecting signal A) to the computer section 30.

The INZ frame source address holding circuit 41 (INZ-TX-ADRS-A) is adapted to hold a source address (SA) field of an INZ frame in an SIG-RV-A signal received at the port A.

Further, the reception anomaly detecting circuit 33 (RCV-ERR-B) is adapted, when it has detected anomaly in reception of SIG-RV-B from the communication port 11 (port B), to output an IRP-RE-B signal (referred to a reception signal anomaly detecting signal) to the computer section 30.

The SYN frame detecting circuit 36 (SYN-DET-B) is adapted, as the SIG-RV-B reception signal from the communication port 11 is a SYN frame, to output an IRP-SYN-B signal (referred sometimes to a SYN frame detecting signal B) to the computer section 30 and the SYN absence detecting circuit 35 (NO-SYN-DET-A/B).

On the other hand, the SYN absence detecting circuit 35 (NO-SYN-DET-A/B) is adapted to output an IRP-NO-SYN signal (a SYN absence detecting signal) to the computer section 30, if it has not received any IRP-SYN-A signal (SYN frame reception detecting signal A) from the SYN frame detecting circuit 34 (SYN-DET-A) or any IRP-SYN-B signal (SYN frame reception detecting signal B) from the SYN frame detecting circuit 36 (SYN-DET-B).

The RRR frame detecting circuit 39 (RRR-DET-B) is adapted to detect an RRR frame in an SIG-RV-B from RVR-B of the communication port 11 (port B), and upon a detection, to output an IRP-RRR-B signal (an RRR frame reception detecting signal B) to the computer section 30.

The RRR frame destination address holding circuit 38 (RRR-RCV-ADRS) is adapted for taking in, to hold, a destination address (DA) field of an RRR frame in an SIG-RV-B signal received at the communication port 11 (port B).

The RRR destination address holding circuit 38 (RRR-RCV-ADRS) is adapted for taking in reception signals at both sides in time to take in the destination address fields.

The INZ frame source address holding circuit 43 (INZ-TX-ADRS-B) is adapted to hold a source address (SA) field of an INZ frame in an SIG-RV-B as a reception signal received at the port B.

More specifically, there are initialization-instructing INZ frames sent in both directions (communication ports A and B), followed by waits for arrivals of INZ frames (responding acknowledgement frames (INZ-COMP)) from adjacent stations (refer to FIG. 12).

For the INZ frames to be sent, the computer section 30 employs the transmission reception control circuit 21 (MAC/DLC) for setting up, as shown in FIG. 6, blocked states and reception-prohibited states (with the SW-TX-A and the SW-TX-B turned on) for the transmission in both directions.

And, if an arrival of an INZ frame is detected by the INZ frame reception detecting circuit 42 (INZ-DET-B) or the INZ frame reception detecting circuit 40 (INZ-DET-A) with respect to a reception signal, SIG-RV-B at the communication port B, or that at the communication port A or A, then the computer section 30 turns on the reception permitting switch 19 (SW-RCV-B) or the reception permitting switch 18 (SW-RCV-A), to take it in.

The first-come reception selecting circuit 20 (RCV-SEL) checks the reception permitting switch 18 (SW-RCV-A) and the reception permitting switch 19 (SW-RCV-B), determining which is the communication port where the reception has occurred, and informs the transmission reception control circuit 21 (MAC/DLC) of the result. A reception port that has first received is set as an MS port.

By this, that port which has received a first INZ frame for initialization is set as the MS port.

Next, at a step S01 or S02 in FIG. 12-FIG. 13, if an INZ frame from the master station MS is received by an adjacent station (#ST2 or #ST8), then the blocked state from that reception port to the other communication port is changed to an unblocked state, by turning on the repeat permitting switch 13 (SW-FW-A) or the repeat permitting switch 14 (SW-FW-B), whichever corresponds thereto.

Likewise, the reception permitting switch 18 (SW-RCV-A) or the reception permitting switch 19 (SW-RCV-B), whichever corresponds to that reception port, is turned on, thereby permitting transmission frames received thereafter at the reception port to be taken in.

Further, the adjacent station has the transmission permitting switch 16 (SW-TX-A) or the transmission permitting switch 17 (SW-TX-B), whichever corresponds to that reception port, held on temporarily alone, to send an INZ frame as a responding acknowledgment from the reception port, and has a station mode "not terminal". After that, at an S11, it receives and detects a subsequent INZ frame from the master station, when it starts the ST timer, waiting for an event of step S2.

Next, still at the S11 following S01 or S02 having sent an INZ frame to the master station, it checks for an arrival of a subsequent INZ frame, and under this condition, it enters a step S21 or S23, where if it receives and detects an INZ frame as a responding acknowledgment sent from an adjacent station on the opposite side to the MS port side, then the blocked state from that reception port to the other communication port is changed to an unblocked state, permitting incoming transmission frames to be received and taken in. As a result, this station is operative as a repeater station permitting transmission frames to be received at communication ports on both sides, and received signals to be taken in and repeated to the opposite sides, and has a station mode "normal". In the example illustrated in FIG. 9, ST2, ST3, and ST4 as well as ST8 and ST7 are set to the normal mode.

On the other hand, at steps S11 and S12 in FIG. 12-FIG. 13, if the master station MS receives INZ frames as responding acknowledgments from adjacent stations ST2 and ST8, then it has a normal mode. The INZ-DET-A and -B are configured as means for an ensured detection of INZ's as responding acknowledgements simultaneously arriving at from both directions.

This system is adapted to have an increasing number of normal stations incremented one by one in both directions from the MS station, so there appear transmission stations receiving INZ frames sent from the MS station, at communications ports on both sides, simultaneously or with a time lag, as they are determined in dependence on a total number of transmission stations constituting the ring form network and a total length of transmission line connecting the transmission stations with each other.

At a step S03 or S04 in FIG. 10, under a condition that an MS port is established, if an INZ frame is received at a blocked port, then a terminal station ST-T-R as well as ST-T-L is temporarily determined in dependence on that reception port. For instance, if #ST5 has received an INZ left-handed after a reception at a port A where it received an INZ frame from the master (MS), then #ST5 stands as an ST-T-R For a transmission station (#ST6, for instance) to be another terminal station as it has been kept from sending an INZ frame as a responding acknowledgment from a reception port at the step S03 or S04, there is a step S24 corresponding to the S03 or S22 corresponding to the S04, where if it fails to receive, within a prescribed interval of time for the ST timer to time up, an INZ frame as a responding acknowledge from the other terminal station that has been already established, then it has a terminal mode ST-T-L or ST-T-R as an opposing terminal station. For the ST-T-L, refer to description of FIG. 29.

Further it is noted that although FIG. 9 illustrates a case in which ST5 and ST6 stand as terminal stations as a result of the above-noted normal procedure, if it is failed at the step S22 or S24 in FIG. 11 to receive an INZ frame as a responding acknowledgment from an adjacent station at an expected reception port side, the terminal station ST-T-L or ST-T-R is determined at that point of time in accordance with the expected reception port side.

Likewise, for the MS station also, there is a step S13 or S14 in FIG. 12 to have a station mode determined as ST-T-R or ST-T-L, for an anomaly found in functions for communications including transmission routes down to adjacent stations, adjacent station communication functions, and transmission routes from adjacent stations to own station.

It is noted that step numbers of procedures for #ST2 and #ST8 in FIG. 12-FIG. 13 correspond to step numbers in FIG. 10-FIG. 11.

By the foregoing, it is possible to implement an initialization so that transmission frames sent from transmission stations constituting a double ring network system are kept from circulating in the network configured in a ring form.

Figure 5:
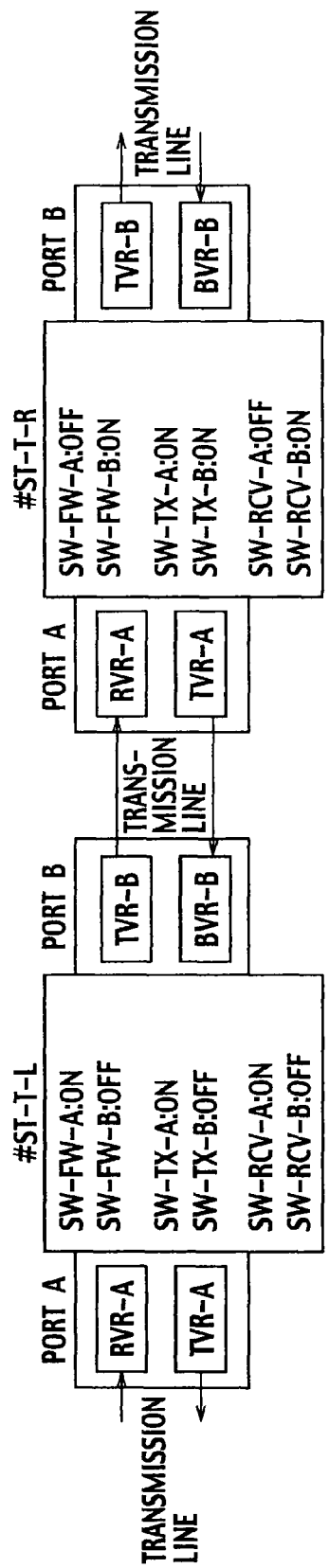
FIG. 5 is a diagram describing status of switches at both terminal stations after initialization.

It is noted that FIG. 5 illustrates switch status for ST-T-L and ST-T-R set as terminal stations in initialization. And, FIG. 7 additionally illustrates switch status at normal stations.

That is, for a ST-TL-L to be set, the computer section 30 turns the repeat permitting switch 13 (SW-FW-A) on, the repeat permitting switch 14 (SW-FW-B) off, the transmission permitting switch 16 (SW-TX-A) on, the transmission permitting switch 17 (SW-TX-B) off, the reception permitting switch 18 (SW-RCV-A) on, and the reception permitting switch 19 (SW-RCV-B) off. Accordingly, if disconnection occurs between ST-T-L and ST-T-R, reception signals are taken in at the port A, and frames are returned simply at the port A.

Further, for a ST-T-R to be set, the computer section 30 turns the repeat permitting switch 13 (SW-FW-A) off, the repeat permitting switch 14 (SW-FW-B) on, the transmission permitting switch 16 (SW-TX-A) on, the transmission permitting switch 17 (SW-TX-B) on, the reception permitting switch 18 (SW-RCV-A) off, and the reception permitting switch 19 (SW-RCV-B) on.

Accordingly, reception signals are taken in at the port B, and frames are returned simply at the port B.

Figure 14:
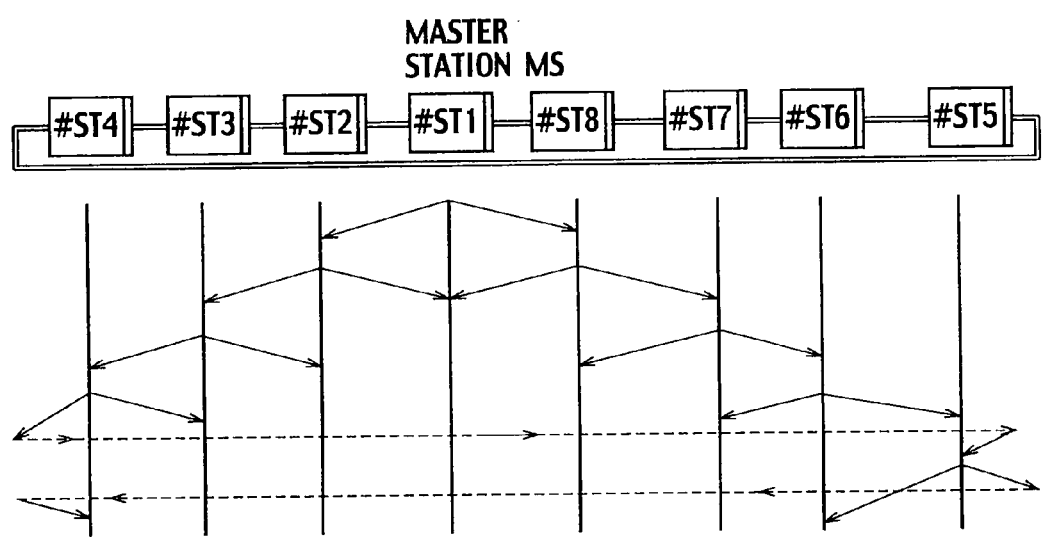
FIG. 14 is a sequence chart of an embodiment example (the $2^{nd}$) of INZ frame intercommunications between transmission stations at a time of initialization.
Figure 15:
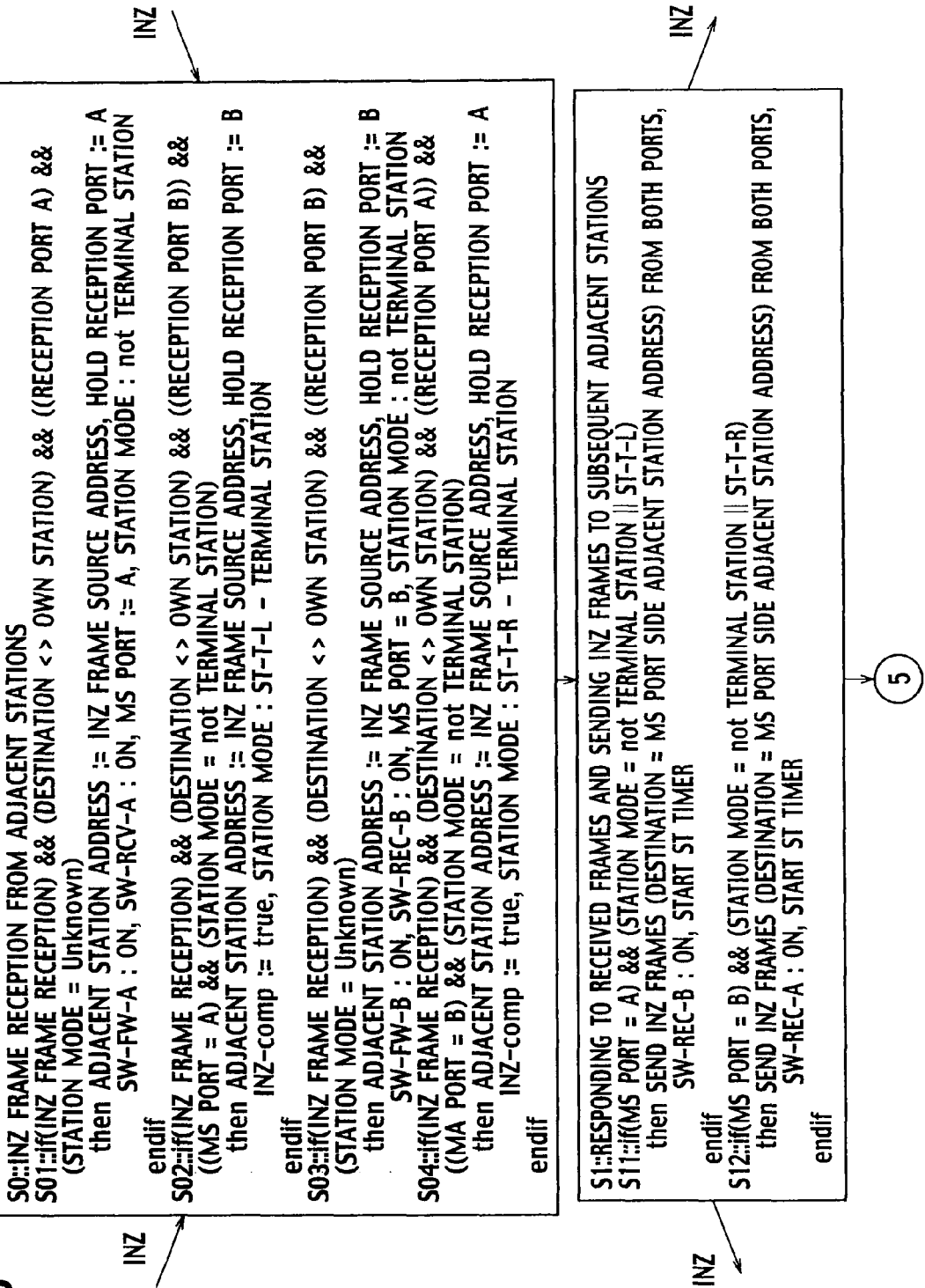
FIG. 15 is a sequence chart of an initializing process (the $2^{nd}$) at a #STj transmission station.
Figure 16:
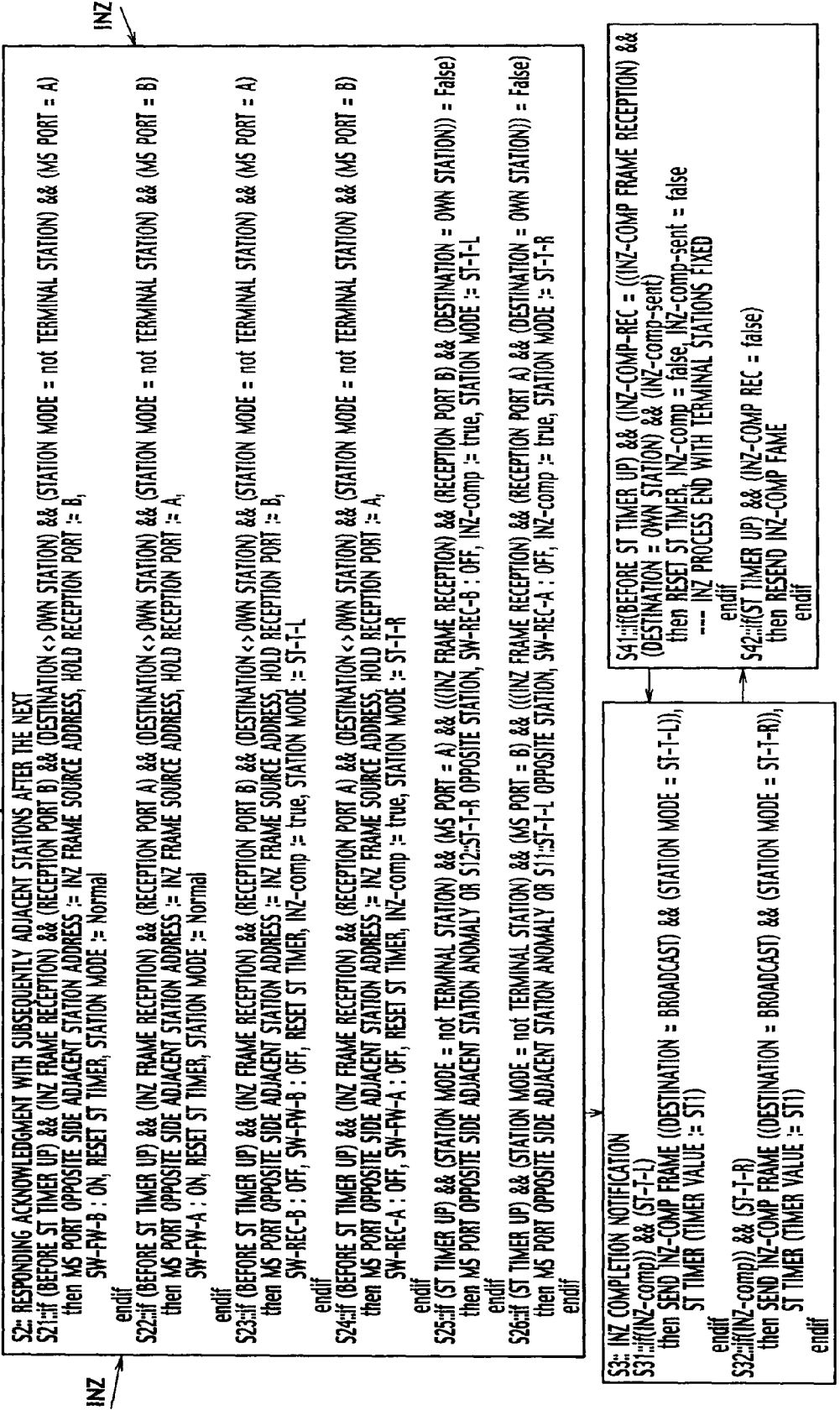
FIG. 16 is a sequence chart of the initializing process (the $2^{nd}$) at the #STj transmission station.

With respect to the embodiment 5 (claim 5), FIG. 14 illustrates sequences of INZ frames to be transmitted between transmission stations, which will be described. There is an initializing process to be implemented at respective stations excepting a master (MS) station, which is illustrated in FIG. 15-FIG. 16.

Figure 17:
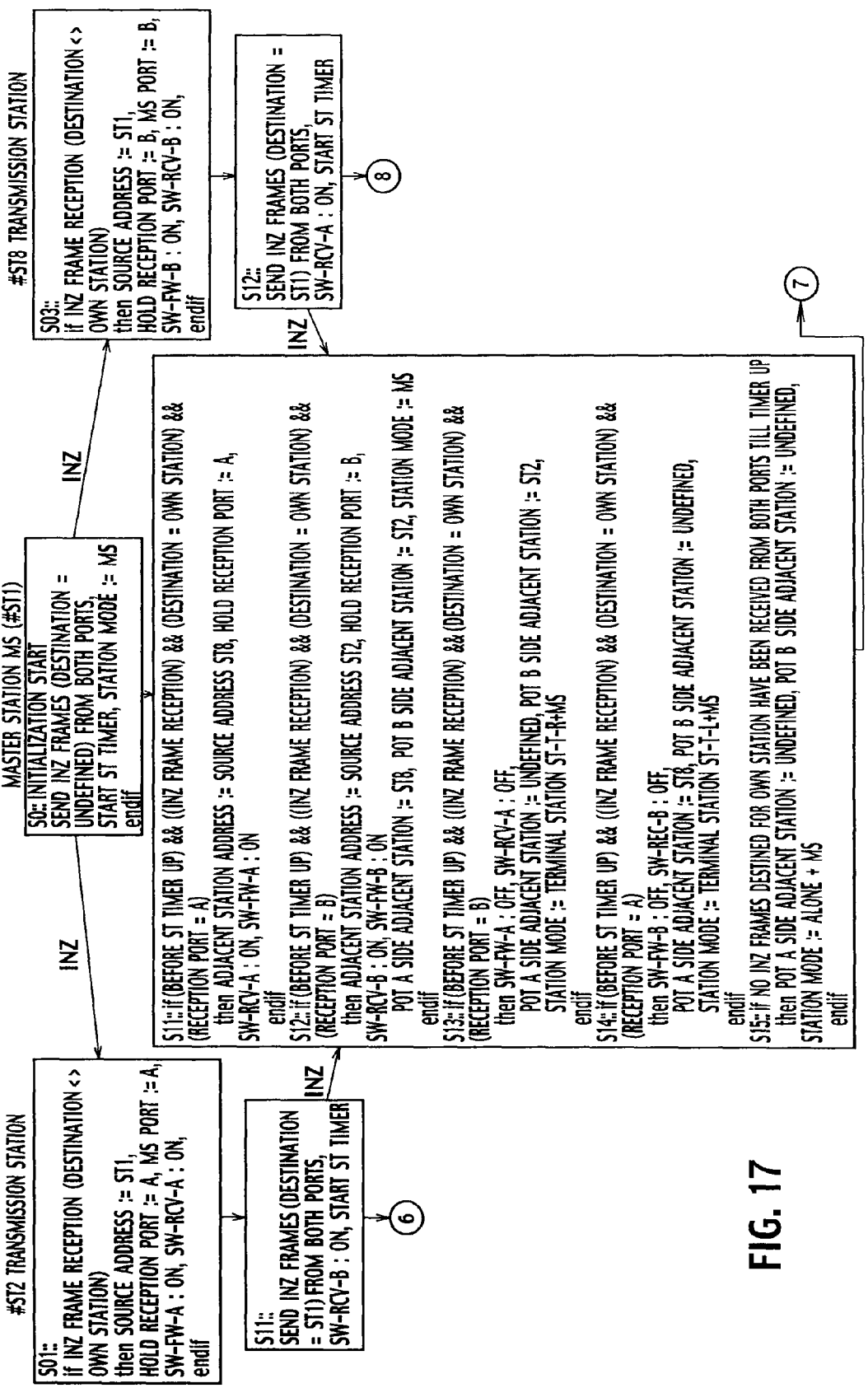
FIG. 17 is a sequence chart of an example (the $2^{nd}$) of intercommunications between transmission stations at a time of initialization (for transmission stations—ST1, ST2, and ST8).
Figure 18:
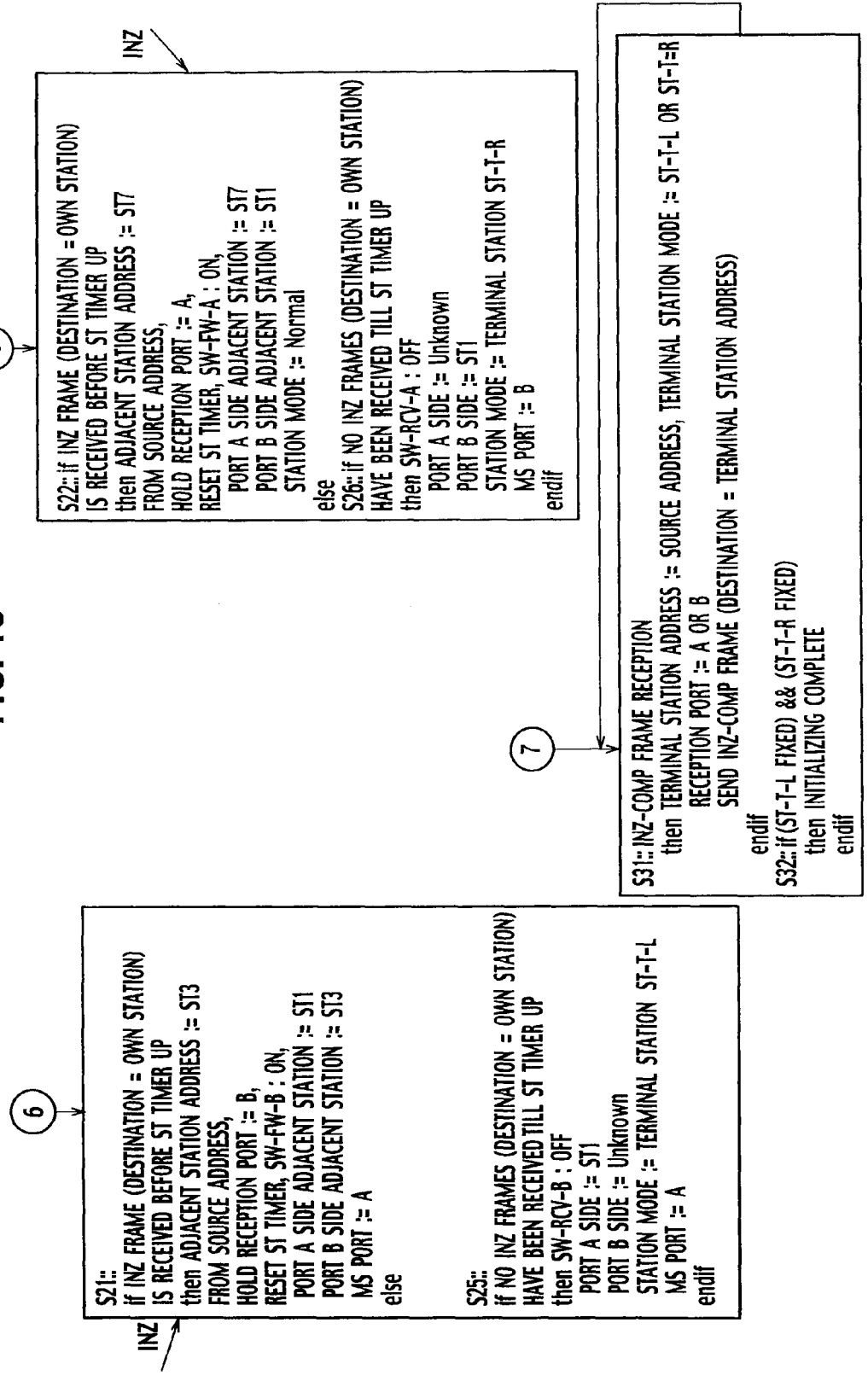
FIG. 18 is a sequence chart of the example (the $2^{nd}$) of intercommunications between transmission stations at a time of initialization (for transmission stations—ST1, ST2, and ST8).

Shown in FIG. 17-FIG. 18 is a flowchart involving an initializing process for the MS station ST1. Further, it specifically involves actions in processes for intercommunications at transmission stations ST2 and ST8 as adjacent stations of the MS station, as they comply with protocols for the initializing process at respective transmission stations illustrated in FIG. 14.

It is noted that the example of configuration of double ring network system illustrated in FIG. 14 is fit to the example of FIG. 1, without restrictions to, among others, the total number of transmission stations, and the numbering for identification of transmission stations #ST1 to #ST9.

Further, for the embodiment 5 (claim 5), hardware configurations of the embodiment examples illustrated in FIG. 3 and FIG. 4 are adaptive.

As a transmission station to be a base, if #ST1 is set as an MS station, then the MS station sends initialisation instructing INZ frames in both directions, starting an ST timer, as illustrated in FIG. 14 and as shown at a step S0 in FIG. 17-FIG. 18. And, at a step S1 in FIG. 17, it waits for INZ frames (INZ-COMP) as responding acknowledgements as responses from adjacent stations, #ST2 and #ST8 in this case.

Respective transmission stations have a switch status in an initial phase, where both ports are blocked and reception-prohibited, as illustrated in FIG. 6, and #ST2 and #ST8 go to a step S01 or S03 shown in FIG. 17-FIG. 18, where the INZ frame reception detecting circuit 40 (INZ-DET-A) or the INZ frame reception detecting circuit 42 (INZ-DET-B) detects an arrival of INZ frame.

And, by an interruption of an INZ frame reception detecting signal (IRP-INZ-A) or an INZ frame reception detecting signal (IRP-INZ-B), as it is followed by software processes at the MPU 24, a reception of INZ frame is confirmed, and a reception port to be either port where the reception has occurred is confirmed (refer to S11 to S15 in FIG. 17).

That is, it is determined whether or not the INZ frame reception detecting circuit 40 (INZ-DET-A) has output an INZ frame reception detecting signal (IRP-INZ-A) or whether or not the INZ frame reception detecting circuit 42 (INZ-DET-B) has output an INZ frame reception detecting signal (IRP-INZ-B). If any INZ frame reception detecting signal (IRP-INZ-A) is output, then the transmission permitting switch 17 (SW-TX-A) and the reception permitting switch 19 (SW-TX-A) are turned on. If any IRP-INZ-B is output, then the SW-TX-B and the SW-RCV-B are turned on.

The first-come reception selecting circuit 20 (RCV-SEL) determines which communication port has first received a signal, and outputs a result of this determination to the transmission reception control circuit 21 (MAC/DLC).

By doing so, that port which has received a first INZ frame in the initialization is set as an MS port.

Upon reception of an INZ frame from the master MS station at a step S01 or S03 in FIG. 15-FIG. 16, the MPU 24 changes the blocked state from that reception port (MS port) to the other communication port to an unblocked state, by turning on the repeat permitting switch 13 (SW-FW-A) or the repeat permitting switch 14 (SW-FW-B), whichever corresponds to the MS port.

Likewise, the reception permitting switch 18 (SW-RCV-A) or the reception permitting switch 19 (SW-RCV-B), whichever corresponds to the MS port, is turned on, thereby permitting transmission frames received thereafter at the reception port to be taken in.

Further, source address information in the received and detected INZ frame is read from the INZ frame source address holding circuit 41 (INZ-TX-ADRS-A) or the INZ frame source address holding circuit 42 (INZ-TX-ADRS-B), whichever corresponds to the reception port, and held as an adjacent station address on the MS port side. Further, the station has a station mode "not terminal station".

Still further, at a step S11 or S12, whichever corresponds to the MS port, it sends acknowledging INZ frames in which adjacent station addresses held in advance are set as destinations, from both ports, permitting a transmission frame to be received and taken in at a port on the opposite side to the MS port, and starts the ST timer, waiting for an event of step S2.

If the S11 or S12 having sent an INZ frame in which an address of an adjacent station on the MS port side is set as a destination is followed by an INZ frame as a responding acknowledgment sent from an adjacent station on the opposite side to the MS port side, addressing own station, and received and detected at a step S21 or S22, then the blocked state from that reception port to the other communication port is changed to an unblocked state, permitting incoming transmission frames to be received and taken in.

As a result, this transmission station has a station mode "normal", as a repeater station permitting transmission frames to be received and taken in at communication ports on both sides, and repeated to the other sides.

In the example illustrated in FIG. 14, ST2, ST3, and ST4 as well as ST8 and ST7 are set to a normal mode.

On the other hand, at steps S11 and S12 in FIG. 12-FIG. 13, if the master station MS receives INZ frames as responding acknowledgments from adjacent stations ST2 and ST8, then it has a normal mode. The INZ frame reception detecting circuit 40 (INZ-DET-A) and the INZ frame reception detecting circuit 42 (INZ-DET-B) are configured as means for an ensured detection of INZ's as responding acknowledgements simultaneously arriving at from both directions.

This system is adapted to have an increasing number of normal stations incremented one by one in both directions from the MS station, so there appear transmission stations receiving INZ frames sent from the MS station, at communications ports on both sides, simultaneously or with a time lag, as they are determined in dependence on a total number of transmission stations constituting the ring form network and a total length of transmission line connecting the transmission stations with each other.

At a step S02 or S04 in FIG. 15-FIG. 16, under a condition that an MS port is established, if an INZ frame is received at a port on the opposite side, then a terminal station ST-T-L or ST-T-R is determined in dependence on the MS port.

Further, the station having been set as a terminal goes to a step S11 or S12, where it sends an INZ frame as a responding acknowledgment addressing an adjacent station on the MS port side. On the other hand, in opposition to a transmission station A determined as an ST-T-L or ST-T-R, there is a transmission station B as a terminal station on the other side, which is to receive and detect an INZ frame not addressing own station as a destination, before the ST timer times up, in the process of waiting an INZ frame as a responding acknowledgment addressing own station that the transmission station A is expected to send in response to an INZ frame the transmission station B has sent.

If it has received and detected at a reception port opposing an MS port an INZ frame not addressing own station as a destination, it goes to a step S23 or S24, where it stands as a terminal station ST-T-L or ST-T-R opposing the transmission station A.

Further it is noted that although FIG. 14 illustrates a case in which ST5 and ST6 stand as terminal stations as a result of the above-noted normal procedure, if it is failed at the step S25 or S26 in FIG. 15-FIG. 16 to receive an INZ frame as a responding acknowledgment addressing own station as a destination from an adjacent station at an expected reception port side, the terminal station ST-T-L or ST-T-R is determined at that point of time in accordance with the expected reception port side.

Likewise, for the MS station also, there is a step S13 or S14 in FIG. 12 to have a station mode determined as ST-T-R or ST-T-L, for an anomaly found in functions for communications including transmission routes down to adjacent stations, adjacent station communication functions, and transmission routes from adjacent stations to own station.

It is noted that step numbers of procedures for #ST2 and #ST8 in FIG. 17-FIG. 18 correspond to step numbers in FIG. 15-FIG. 16. By the foregoing, it is possible to implement an initialization so that transmission frames sent from transmission stations constituting a double ring network system are kept from circulating in the network configured in a ring form.

Further, FIG. 5 illustrates switch status for ST-T-L and ST-T-R set as terminal stations in initialization as described. And, FIG. 7 additionally illustrates switch status at normal stations.

With respect to the embodiment 6 (claim 6), FIG. 14 illustrates sequences of INZ frames to be transmitted, FIG. 15 and FIG. 16 show an initialization process for transmission stations excepting an MS station, and FIG. 17 and FIG. 18 show that of the MS station. Further, FIG. 3 and FIG. 4 illustrate examples of configuration of transmission stations.

Transmission frames include a destination address representing a destination, and a source address representing a source. FIG. 23 illustrates a transmission frame compliant with ISO/IEC8802-3 Ethernet®, where they correspond to DA and SA as field information at specified locations in the transmission frame.

In embodiment example corresponding to the embodiment 5 (claim 5), a respective transmission station excepting the MS station is adapted, when it has first received an INZ frame in the initializing period, to set the reception port as an MS port, take out a source address (DA) in the received INZ frame, and hold it as an address of an adjacent transmission station on the MS port side.

Further, in a row, it sends in both directions INZ frames as a responding acknowledgment addressing as a destination the held address of the adjacent station on the MS port side. Although the adjacent station on the MS port side is to receive an INZ frame addressing own station as a destination at a port on the opposite side to an MS port, its source address is an address of a transmission station subsequent to own station in view from the MS station, i.e., adjacent to the port on the opposite side to the MS port.

For a respective transmission station excepting the master station MS, it is possible to acquire and hold pieces of address information of transmission stations adjacent on an MS port side or to a port on the opposite side, at steps S11 and S12 for the master station MS in FIG. 17, or in the process of transition to a normal mode by a sequence of steps including step S01 or S03 and S11 or S12 in FIG. 15-FIG. 16 and S21 or S22 in FIG. 18, in the process of transition to an ST-T-L or ST-T-R mode by steps including step S02 or S04 and S11 or S12 and S23 or S24 (refer to FIG. 17 and FIG. 18).

Further, in this initializing method, in the process of incorporating transmission stations one by one from a master station MS into a ring network system, if, at a respective transmission station, soundness of a reception system on the MS port side, a transmission line to an adjacent station on the opposite side to the MS port, functions for transmission and reception at the adjacent station, and a transmission line returning from the adjacent station to own station and an associated reception system of own station are free of anomalies, it necessarily receives and detects an INZ frame as a responding acknowledgment from the adjacent station, whereby the mutually adjacent stations can act together to ensure the soundness of a bi-directional communication line in between, permitting acquisition and storage of addresses of transmission stations adjacent on the MS port side or to a port on the opposite side.

With respect to the embodiment 7 (claim 7), it is possible for a respective terminal station to inform an MS station and transmission stations of a completion of the initialization of double ring network, by sending an INZ-COMP frame as an indication of initialization completion containing a terminal station address and terminal station mode, at the time when two mutually adjacent terminal stations ST-T-L and ST-T-R are configured at positions determined in dependence on a total number of transmission stations constituting a network system of a ring form, and a total length of a transmission line connecting the transmission stations with each other, or at the time when a determination to stand as a terminal station is made on the way of initialization by absence of reception of an INZ frame as a responding acknowledgment from a station adjacent to own station, in examples of initialization described with respect to the embodiment 4 (claim 4) or the embodiment 5 (claim 5), that is, after determination of ST-T-L and ST-T-R at step S03 or S04, or S22 or S24 in FIG.-FIG. 11 in the initializing method according to the embodiment 4 (claim 4), or at step S02 or S04, S23 or S24, or S25 or S26 in FIG. 15-FIG. 16 in the initializing method according to the embodiment 5 (claim 5).

At a respective transmission station where the initialization is completed, transmission frames can be sent, received and taken in at both ports, as software control of the MPU permits INZ-COMP frames to be generated and transmission-controlled by MAC/DLC to send from both ports, as well as incoming and received INZ-COMP frames to be reception-controlled by MAC/DLC to take in, for detection, determination, and processing by software control of the MPU.

However, as the completion of initialization provides a functional configuration of bus-type network, if both terminal stations substantially simultaneously send INZ-COMP frames, then a respective transmission station may have an opportunity of overlap in reception.

In that case, the first-come reception selecting circuit 50 (RCV-SEL) permits one INZ-COMP frame that has first come to be reception-controlled by MAC/DLC, to take in.

To this point, as an embodiment example of an initializing method according to the embodiment 4 (claim 4), there are steps S3 and S4 shown in FIG. 10-FIG. 11, as a transmission procedure of INZ-COMP frames addressing an MS station.

That is, a responding acknowledgement sequence with the MS station permits an ensured reception of INZ-COMP frame at the MS station. This is an embodiment example in which a resending process is continued till reception of an INZ-COMP frame as a responding acknowledgment addressing own station as a destination, and a waiting period for resending is set to be mutually different as ST1 and ST2 in accordance with station modes ST-T-L and ST-T-R, to avoid consecutive overlaps of INZ-COMP frames at the MS station.

At the step S3 in FIG. 12-FIG. 13, it is allowed at the MS station side to detect a completion of initialization, and stop sending periodical INZ frames.

Further, as an embodiment example of an initializing method according to the embodiment 5 (claim 5), there are steps S3 and S4 shown in FIG. 15-FIG. 16, as a transmission procedure of INZ-COMP frames addressing a broadcast address as the destination.

If the master station MS receives an INZ-COMP frame addressing a broadcast address, then it sends an INZ-COMP frame as a responding acknowledgment to an address of the source, allowing for an ensured reception of INZ-COMP frame at the master station MS by a responding acknowledgment sequence with the master MS.

This is an embodiment example in which a resending process is continued till reception of an INZ-COMP frame as a responding acknowledgment from the master station MS addressing a terminal station as a destination, and a waiting period for resending is set to be mutually different as ST1 and ST2 in accordance with station modes ST-T-L and ST-T-R, to avoid consecutive overlaps of INZ-COMP frames at the MS station.

At the step S3 in FIG. 17-FIG. 18, it is allowed at the MS station side to detect a completion of initialization. It is noted that INZ-COMP's to be sent from terminal stations may address a broadcast address as the destination, so that whole transmission stations can detect a completion of initialization.

Figure 19:
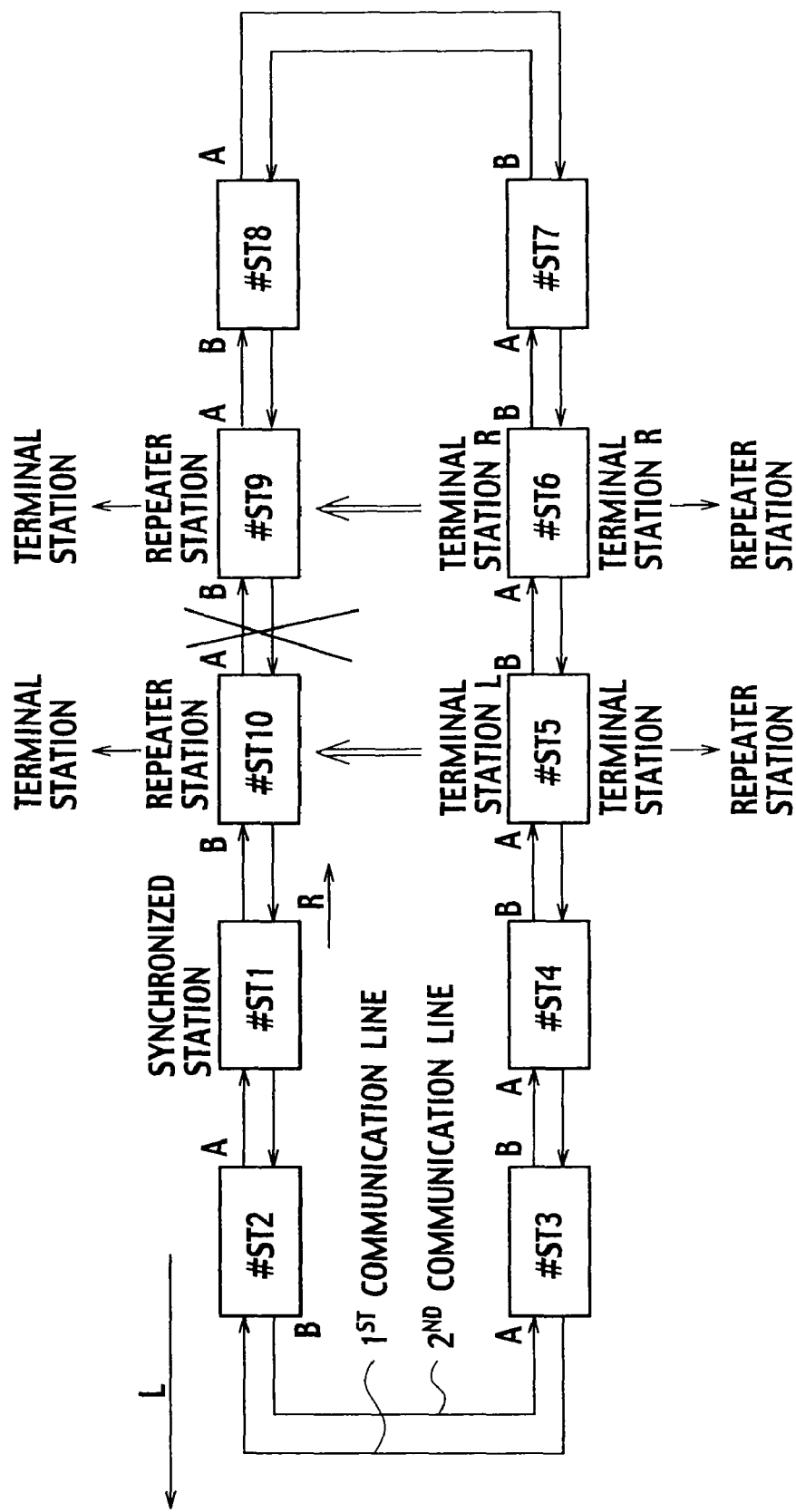
FIG. 19 is a diagram describing an exemplary occurrence of transmission anomaly between #ST10 and #ST9.

With respect to the embodiment 8 (claim 8), FIG. 3 and FIG. 4 illustrate examples of configuration of transmission stations. FIG. 19 illustrates a situation of a double ring network system configured with #ST5 and #ST6 as opposing terminal stations, in which during a normal service, an anomaly has occurred in communication lines interconnecting #ST10 and #ST9.

There are no restrictions to, among others, the number of transmission stations or locations of occurrence, or relation with positions of terminal stations or synchronizing station.

Figure 20:
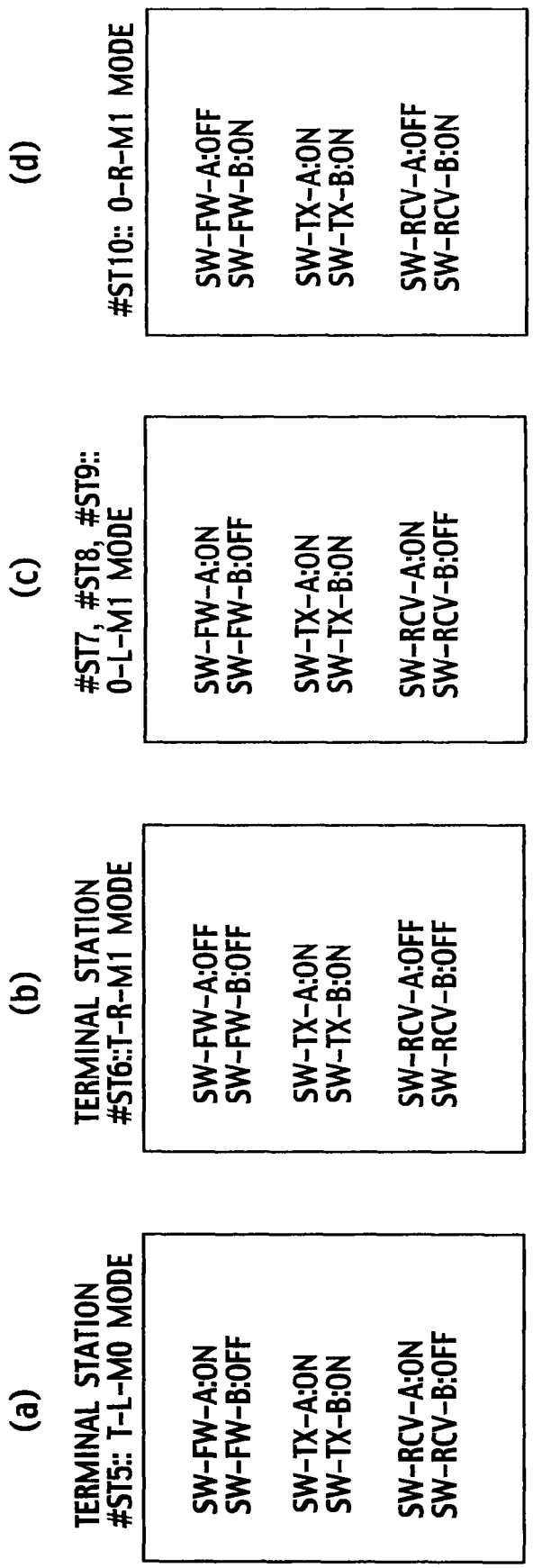
FIG. 20 is a diagram describing status of switches at respective stations by reception anomaly detection and no-SYN detection after the occurrence of transmission anomaly between #ST10 and #ST9.

FIG. 20 illustrates status of switches at respective transmission stations after occurrence of transmission anomaly in communication lines interconnecting #ST10 and #ST9.

Under a condition that the initialisation is completed, a double ring network system in a typical situation where it has thereon one or more transmission stations sending one or more transmission frames, enters such a situation that a SYN frame containing specific information meeting a preset condition, whereby its arrival can be discriminated, is periodically sent from any transmission station (synchronizing station), where an arrival of SYN frame is discriminated and detected by the SYN frame detecting circuit 34 (SYN-DET-A) or the SYN frame detecting circuit 36 (SYN-DET-B), and output as an IRP-SYN-A or -B.

Further, absence of SYN frame reception over a preset period is discriminated and detected at the SYN absence detecting circuit 35 (NO-SYN-DET-A/B) for each communication port, from a failed periodic continuation of SYN frame reception detecting signal (IRP-SYN-A) or SYN frame reception detecting signal (IRP-SYN-B).

Accordingly, the SYN absence detecting circuit 35 (NO-SYN-DET-A/B) is adapted, under a condition that a periodic arrival of SYN frame is continued in succession through one communication port, to detect also that, through the other communication port, no continued periodic arrival is found over a preset period, from IRP-SYN-A and -B signals, so the MPU can read through the C-bus which communication port is absent of periodic succession of SYN frame, at the time of status change interrupt of IRP-NO-SYN as a SYN-absent state detecting output signal. Further, transmission frames received through communication ports A, -B are checked for anomaly of received signal status by the reception anomaly detecting circuit 32 (RCV-ERR-A) and the reception anomaly detecting circuit 33 (RCV-ERR-B), in accordance with criteria for received signal status to be monitored and anomaly to be determined.

Next, in response to the SYN absence detecting circuit 35 (NO-SYN-DET-A/B) and IRP-NO-SYN interrupt signal, the MPU 24 operates by software control of the MPU 24 to change, from ON to OFF, the status of a repeat permitting switch SW-FW-A, or -B that corresponds to the communication port where SYN absence is detected, to provide an interport repeat-prohibiting blocked state, so as not to send any transmission frame from the other communication port through a repeat from the communication port where SYN absence is detected to the other communication port, while at the SYN-absent port A or port B, among other transmission frames received through each communication port, the above-noted INZ frame as well as a later-described RRR frame that corresponds to the configuration of transmission station in FIG. 3 is discriminated for detection and responded.

Further, as to reception and take-in of a transmission frame at the port where SYN absence is detected, a reception-prohibited state is established by changing status of the reception permitting switch 18 (SW-REC-A) or the reception permitting switch 19 (SW-REC-A)-B, whichever corresponds thereto, from on to off. At the communication port where reception anomaly is detected by REC-ERR-B), the repeat permitting switch 13 (SW-FW-A) or the repeat permitting switch 14 (SW-FW-B), whichever likewise corresponds thereto, is controlled to set a blocked state. Further, SW-REC-A, or -B is controlled to set a reception-prohibited state. Control signals from the MPU 24 to respective switches are output through the IOC.

By the above, through the way from detection of a failure occurrence to a recovery of network function by a recovery procedure, communication ports of transmission stations can be held unblocked, permitting the transmission stations to fulfill functions of terminal stations.

Figure 21:
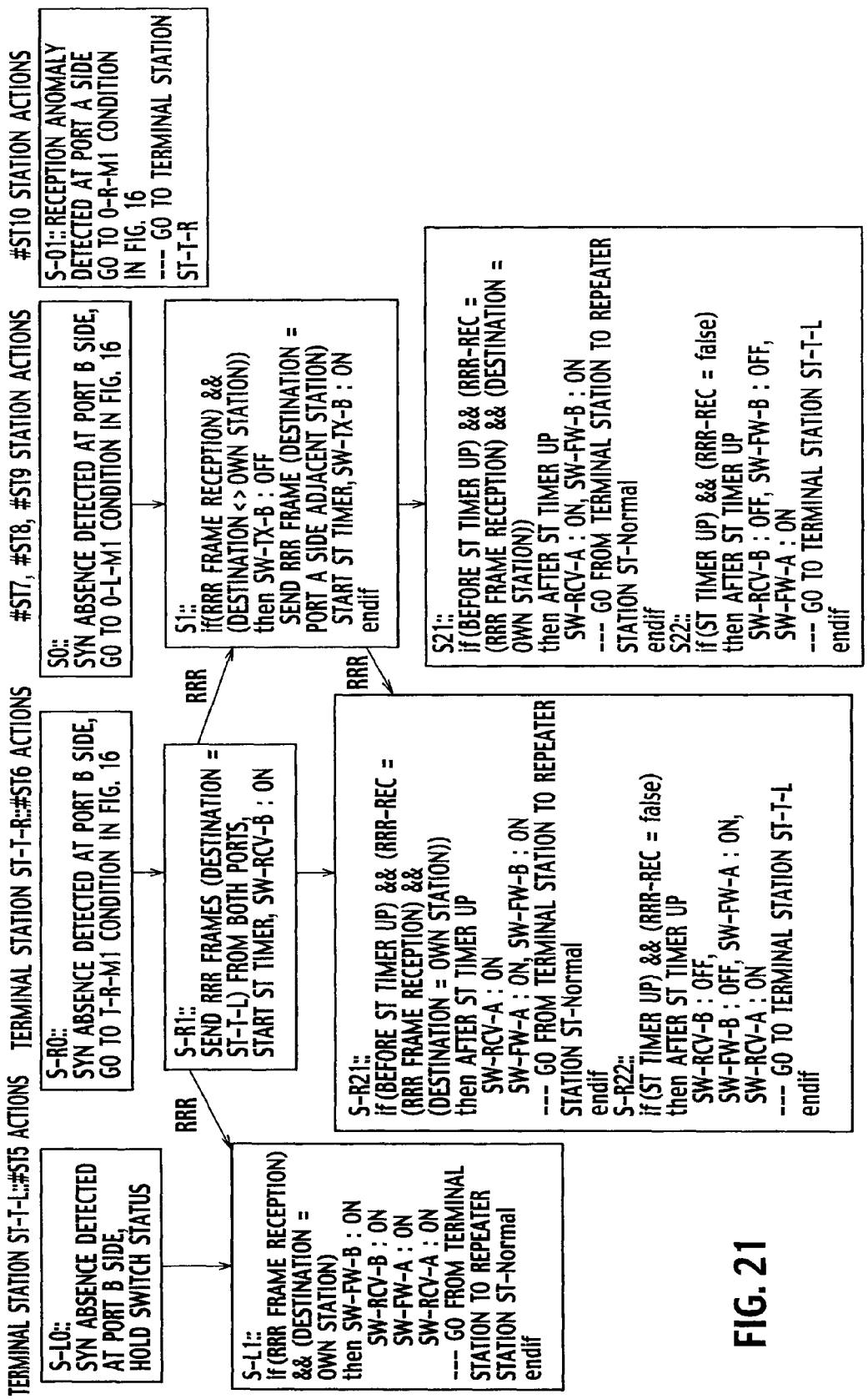
FIG. 21 is a sequence chart describing an example (the $1^{st}$) of reconfiguration from a one-point trouble of a double ring network system.

With respect to the embodiment 9 (claim 9), FIG. 3 is an example of configuration of transmission station. FIG. 21 shows a corresponding procedure for recovery from a detection of failure occurrence. FIG. 19 is a double ring network configured with #ST5 and #ST6 as opposing terminal stations. And, a transmission line between #ST5 and #ST6 is recovered, and #ST5 and #ST6 are normally working in normal modes, when a transmission anomaly has occurred in communication line interconnecting #ST10 and #ST9, of which the situation is illustrated. There are no restrictions to, among others, the number of transmission stations or location of occurrence, or relation with positions of terminal stations or synchronizing station. FIG. 20 illustrates status of switches at respective transmission stations after occurrence of transmission anomaly in communication line interconnecting #ST10 and #ST9. FIG. 21 is a flowchart describing actions of transmission stations in a double ring network system according to the embodiment 5.

This FIG. 21 is an example of reconfiguration from a one-point failure of the double ring network system.

For the configuration of transmission station in the example of FIG. 3, if any transmission anomaly occurs in communication line interconnecting #ST10 and #ST9, the reception via #ST9, #ST8, and #ST7 is made at the end of a communication port B of #ST6.

At #ST6, an arrival of RRR frame is discriminated for detection by the RRR-DET-A, or -B, and output as an IRP-RRR-A, or -B. Upon reception of an RRR frame, #ST6 has destination address information in the RRR frame held in the RRR-RCV-ADRS, so at the time status change interrupt of IRP-RRR-A, or -B, the MPU can read it via the C-bus, and determine to process, including which communication port has received.

Own station address information being information for identification of own station is set in advance in the PROM, or such as by a setting by switches, and address information of transmission stations adjacent at the port-A and -B sides is set to hold as adjacent station address information in the RAM in or before, among others, the initialization procedure according to the above-noted embodiment 6 (claim 6), or the procedure for recover from failure in the instant system. Further, the MPU is adapted to read them, compare destination address information in a received RRR frame with own station address information, and determine to process by software control of the MPU, a match or mismatch.

That is, it determines a match of address, and changes a reception port of the RRR frame (referred herein sometimes to an RRR reception port) to an unblocked state, or it determines a mismatch of address, and reads address information of an adjacent station (#ST7 or #ST5 in this embodiment) corresponding to the RRR reception port, generates an RRR frame addressing it as the destination, and at the timing of reception completion of RRR frame, promptly send it through the RRR reception port to #ST7 or #ST5.

Further, the MPU 24 of #ST6, having sent the RRR frame, starts an ST timer configured by the above-noted software control, followed such as by a process of monitoring to detect reception of an RRR frame addressing own station as the destination, within a prescribed period of time, which can be determined and processed by software control of the MPU. On the other hand, if #ST10 detects an anomaly of a reception signal received at the communication port A side by the RRR frame reception detecting circuit 37 (RRR-DET-A) or the like, then it control switches to a status of #ST10 O-R-M1 mode in FIG. 20. That is, #ST10 stands as a terminal station ST-T-R.

Further, if #ST5 detects a SYN absence detection from the side of communication port B (the port on the #ST6 side) and receives from the #ST6 side an RRR frame addressing own station, then it changes from a terminal station to a repeater station mode.

That is, its switch status is changed from a switch status (a) in FIG. 20, by turning on SW-FW-B and SW-RCV-B as well as SW-FW-A and SW-RCV-A.

Accordingly, if #ST1 is a synchronizing station, #ST5 and #ST6 stand as repeater stations, and #ST10 and #ST9 automatically stand as terminal stations, instead.

Therefore, workers can repair a transmission line between #ST10 and #ST9, without shutting down the double ring network system.

The double ring network system has thereon, in addition to SYN frames from a synchronizing station, among others, periodically sent transmission frames and sporadically sent transmission frames from respective transmission stations, as they are sent in accordance with a transmission line control system for avoiding collisions between transmission frames on a double ring network system as a higher layer of OSI that is not specifically needed to prescribe for the present invention, and under this condition, if transmission anomaly happens in communication line interconnecting #ST10 and #ST9 as illustrated in FIG. 19, then as described with respect to the embodiment 8 (claim 8), SYN absence will not be detected at #ST10, respective stations #ST2, #ST3, and #ST4 on a route from #ST1 being a synchronizing station to a terminal station #ST5, and #ST5, as they are still able to detect arrival and reception of periodic and consecutive SYN frames from the synchronizing station.

On the other hand, at #ST9, #ST8, #ST7, and #ST6 on a route between #ST9 and a terminal station #ST6, both inclusive, there is a detection of SYN absence, and a detection of reception anomaly as circumstances permit. Further, at #ST10, detecting periodical arrival and reception of SYN frame, there is a resultant detection of reception anomaly under the above-noted condition.

For the example of FIG. 19, in the situation that transmission anomaly has occurred in communication line interconnecting #ST10 and #ST9, respective stations have their switch status shown in FIG. 20. At #ST9, #ST8, and #ST7 (refer to FIG. 20(c)) as well as #ST6, thus SW-FW-B is turned off, and SW-REC-B is turned off, whereby #ST9, #ST8, and #ST7 as well as #ST6 are each blocked and reception-prohibited at the side of port B. At #ST10 (refer to FIG. 20 (d)), SW-FW-A and SW-REC-A are turned off, whereby it stands as a terminal station ST-T-R blocked and reception-prohibited at the side of port A.

As shown in FIG. 21, between the two terminal stations, the terminal station #ST6 that has a subsequent position in a route from the synchronizing station #ST1 to the location of anomaly goes to a step S-R0 in FIG. 21, where its switch status of ST-T-R: T-R-M0 mode illustrated in FIG. 7 is changed to a switch status of terminal station #ST6 (T-R-M1) illustrated in FIG. 20, where in addition to the side of port A that has been blocked since before and reception-prohibited, also the side of port B has the same state.

Further, #ST6, where by the SYN absence detecting circuit 35 (NO-SYN-DET-A/B) and IRP-SYN-A, -B it is determined that anomaly has occurred at the side of port B, i.e., on the route to the synchronizing station, goes as a SYN absence detecting terminal station to a step S-R1, where it promptly reads address information of #ST5 as an opposing terminal station ST-T-L from within a RAM where it is held, and sends RRR frames addressing it as the destination (ST5) in both directions through the port-A, -B, and the ST6 starts an ST timer having a prescribed timer period set thereto, and waits for an arrival and reception of an RRR frame as a responding acknowledgment from an adjacent station, #ST7 in this case, at the side of port B on the way to the synchronizing station.

At #ST5 being an opposing terminal station ST-T-L as the destination to which RRR transmission frames are addressed, if it receives an RRR frame sent from #ST6 addressing own station, then it goes to a step S-L1, where its condition is changed from that as a terminal station, where it has been blocked at the side of port B, to a repeater station normal mode, where SW-FW-B is turned on and SW-REC-B is turned on, so the side of port B is unblocked and reception-enabled.

On the way from SYN absence detecting terminal station #ST6 to location of anomaly occurrence, respective normally operating transmission stations #ST7, #ST8, and #ST9 have their repeat functions maintained in that direction, and at a step S1, receive RRR frames from SYN absence detecting terminal station #ST6 substantially at a time, with delays due to transmission line.

At the step S21 in FIG. 21, the transmission stations each respectively detect an arrival and reception of an RRR frame by RRR-DET-A, and if it is determined that the destination is not own station, read an address of an adjacent station on the way to SYN absence detecting terminal station from within a RAM where it is held, and generate an RRR frame addressing it as the destination. And, they each send it promptly after completion of RRR frame reception, through the port A as an RRR reception port, temporarily turning SW-TX-B off, under transmission reception control of MAC/DLC.

At a step S-R2, SYN absence detecting terminal station #ST6 that has sent RRR frames addressing ST-T-L terminal station as the destination, receives from adjacent station #ST7 on the way to the synchronizing station, and detects an RRR frame addressing own station, within a time interval till the ST timer times up.

Then, after a wait till the ST timer times up, it turns the port B at the side toward the synchronizing station that has been blocked ever since anomaly detection, and the port A opposing ST-T-L that has been blocked since before, unblocked, and both ports, reception-enabled, to change from its condition as a terminal station to a repeater station normal mode.

On the way from SYN absence detecting terminal station #ST6 to location of anomaly occurrence, normally operating transmission stations #ST7, #ST8, and #ST9 each respectively identify at a step S21, after having sent an RRR frame addressing an adjacent station on an RRR reception port side as the destination from the RRR reception port side at the step S1 in FIG. 21, but before an ST timer that has been started with this sending times up, reception of an RRR frame addressing own station from an adjacent station on the way to the synchronizing station. Then, after a wait till the ST timer times up, they each turn the port B that has been blocked since anomaly detection, unblocked, to return to a repeater station normal mode.

On the other hand, at a step S22, for #S9 as a transmission station adjacent the location of anomaly on the way to SYN absence detecting terminal station #ST6, it is failing to receive an RRR frame addressing own station from #ST10 even after the ST timer times up, then the port B is kept blocked.

Accordingly, it stands as a new terminal station ST-T-L. Likewise, for occurrence of anomaly at a location adjacent to a SYN absence detecting terminal station, if this is failing to receive an RRR frame addressing own station even after a ST timer times up with lapse of a prescribed time, then at a step S-R2, that block which has been blocked ever since anomaly detection is kept blocked.

Further, the other communication port that has been blocked as a terminal station since before is unblocked, so it changes from the terminal station St-T-R to an ST-T-L.

By the foregoing, for occurrence of a transmission anomaly condition due to one-point failure on a double ring network system, positions of terminal stations are changed to a combination of an adjacent station on the way from a location of anomaly occurrence to a synchronizing station and an adjacent station on the way from the location of anomaly occurrence to the opposite side, to thereby avoid a total shutdown of the network.

Further, terminal stations are re-locatable with a confirmed soundness of bi-directional communications with adjacent stations, allowing for a substantially simultaneous single-time completion between transmission stations on a route to transmission stations to be new terminal stations, permitting the recovery time from anomalous state to recovery to be very shortened. Still more, individual transmission stations are free from communications with an extra central station, and adjacent stations are decentrally cooperative to do with processes up to a recovery, permitting complicate communication procedures to be omitted.

Figure 22:
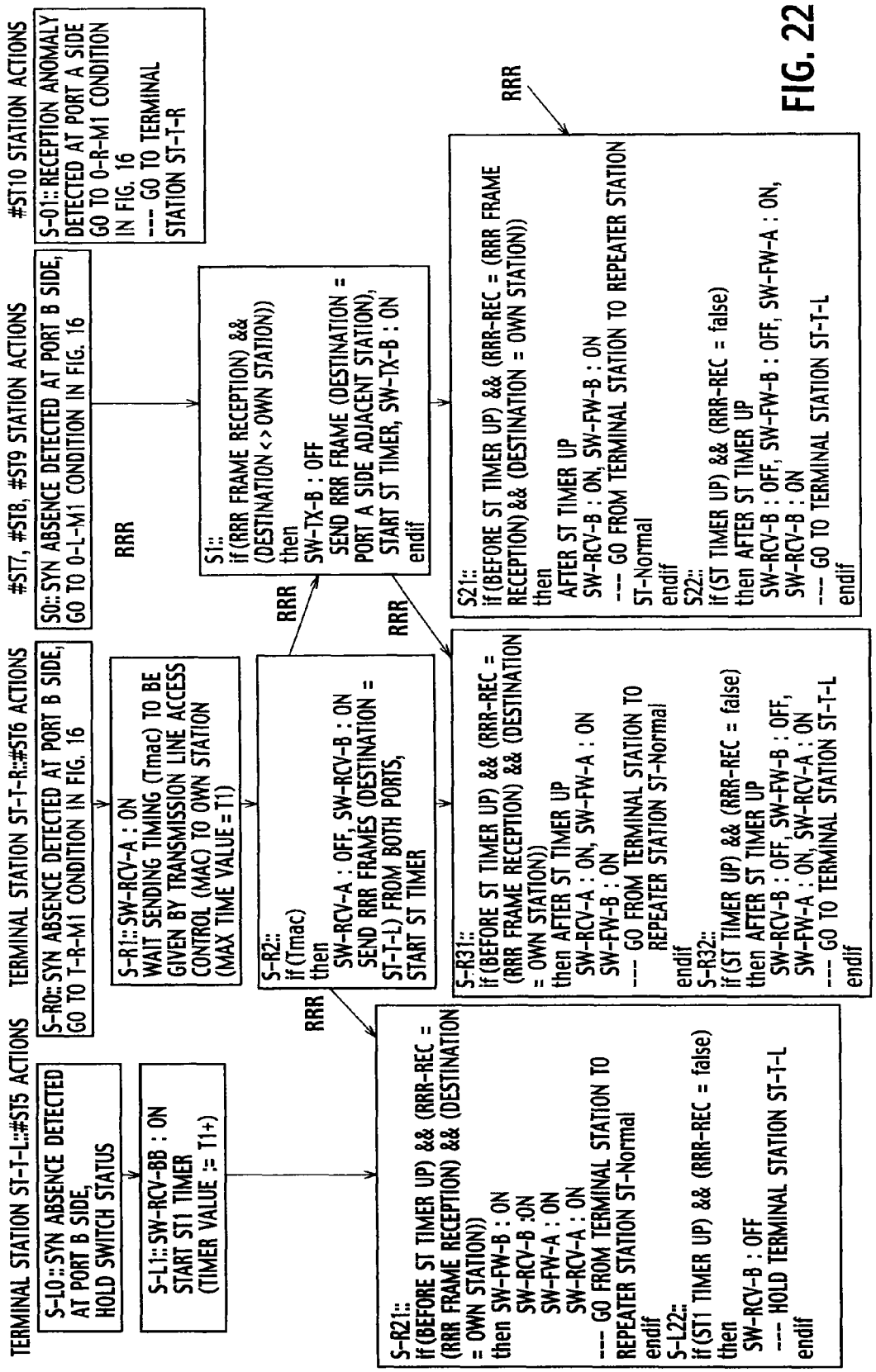
FIG. 22 is a sequence chart describing an example (the $2^{nd}$) of reconfiguration from a one-point trouble of a double ring network system.

With respect to the embodiment 10 (claim 10), FIG. 4 is an example of configuration of transmission station. FIG. 22 shows a flowchart of a corresponding procedure for recovery from a detection of failure occurrence. The flowchart in FIG. 22 is an example (the $2^{nd}$ 9) for reconfiguration from one-point failure of a double ring network system, as an example in which a failure occurs between #ST10 and #ST9, and a terminal station waits a timing assigned by a MAC to own station to enable sending RRR frames.

FIG. 19 illustrates a double ring network configured with #ST5 and #ST6 as opposing terminal stations, in a situation that, while it is working normally, a transmission anomaly has occurred in communication line interconnecting #ST10 and #ST9.

There are no restrictions to, among others, the number of transmission stations or location of occurrence, or relation with positions of terminal stations or synchronizing station. FIG. 20 illustrates status of switches at respective transmission stations after occurrence of transmission anomaly in communication line interconnecting #ST10 and #ST9.

The functions and actions of respective circuits constituting transmission stations are identical to functions and actions, such as setting and holding, among others, own station address information and adjacent station address information, excluding the RRR frame reception detecting circuit 37 (RRR-DET-A) and RRR frame reception detecting circuit 39 (RRR-DET-B), with their detection output signals IRP-RRR-A, -B inclusive, and RRR frame destination holding circuit 38, as described with respect to the above-noted embodiment 9 (claim 9).

Further, as described with respect to the above-noted embodiment 9 (claim 9), the double ring network system has thereon, in addition to SYN frames from a synchronizing station, among others, periodically sent transmission frames and sporadically sent transmission frames from respective transmission stations, as they are sent in accordance with a transmission line control system for avoiding collisions between transmission frames on a double ring network system as a higher layer of OSI that is not specifically needed to prescribe for the present invention, and under this condition, if transmission anomaly happens in communication line interconnecting #ST10 and #ST9 as illustrated in FIG. 19, then as described with respect to the embodiment 8 (claim 8), SYN absence will not be detected at #ST10, respective stations #ST2, #ST3, and #ST4 on a route from #ST1 being a synchronizing station to a terminal station #ST5, and #ST5, as they are still able to detect arrival and reception of periodic and consecutive SYN frames from the synchronizing station.

On the other hand, at #ST9, #ST8, #ST7, and #ST6 on a route between #ST9 and a terminal station #ST6, both inclusive, there is a detection of SYN absence, and a detection of reception anomaly as circumstances permit. Further, at #ST10, detecting periodical arrival and reception of SYN frame, there is a resultant detection of reception anomaly under the above-noted condition.

For the example of FIG. 19, in the situation that transmission anomaly has occurred in communication line interconnecting #ST10 and #ST9, respective stations have their switch status shown in FIG. 20. That is, at a step S0 in FIG. 22 for #ST9, #ST8, and #ST7, or at a step S-R0 for #ST6, SW-FW-B is turned off, and SW-REC-B is turned off, so they have the status O-L-M1 (refer to FIG. 20(c)) or the status T-R-M1 (refer to FIG. 20(b)) shown in FIG. 20, respectively.

Further, for #ST10, at a step S-01, SW-FW-A and SW-REC-A are turned off, so it stands as a new terminal station ST-T-R. On the other hand, for the terminal station #ST5, although it can detect periodical consecutive arrivals of SYN frames at the port A as a port on the synchronizing station side, it is unable to detect any arrival of SYN frame at the port B opposing the other terminal station #ST6, whereby it can detect an occurrence of transmission anomaly, substantially simultaneously with the terminal station #ST6, subject to a lag of signal on a transmission line.

At a step S-L1, at the port B on the opposite side to the synchronizing station side, the SW-REC-B is turned on to permit a reception to be taken in, and a program-controlled ST timer is started. ST timer value at the step S-L1 is set to a greater value than a maximal waiting time for #ST6 to be permitted to send a transmission frame in compliance with not specifically defined transmission line control system to avoid collisions between transmission frames on a double ring network.

Between the two terminal stations, the terminal station #ST6 in a subsequent position on the route from the synchronizing station #ST1 to the location of anomaly operates, at the step S-R1, to turn the SW-REC-A corresponding to the port A at the opposite side to the other terminal station, from OFF to ON, to permit a transmission frame to be received and taken in at the port A.

Under this condition, it receives and takes in a sequence of transmission frames from the other terminal station #ST5 by the MAC/DLC, and determining by the MPU's program control, waits for sending timings of transmission frames assigned to own station, in compliance with a transmission line control system for avoiding collisions between transmission frames on double ring networks. At the step S-R2, as the sending timing Tmac gets a true state, it turns the SW-REC-A from ON to OFF, changing the port A again to a reception-prohibited state, and the SW-REC-B from OFF to ON, changing the port B to a reception-enabled state, and sends RRR frames addressing #ST5 as a destination from both ports, while starting the ST timer, waiting for reception of an RRR frame addressing own station as a destination from an adjacent station #ST7 on the way to the synchronizing station.

The #ST5 being a SYN normal terminal station, after detection of transmission anomaly, enters a step S-L21, where it responds to reception of an RRR frame from the SYN absence detecting terminal station #ST6, by determining own station as being a destination of the received RRR frame, and switches an RRR reception port B that has been in a blocked state as a terminal station, to an unblocked state, changing from the terminal station status to a repeater station normal mode. On the other hand, unless reception occurs till the ST timer that has been started since before times up, then it returns the SW-REC-B to OFF, holding the terminal station ST-T-L.

Respective transmission stations #ST7, #ST8, and #ST9 functioning normally on a way from the SYN absence detecting terminal station #ST6 to the anomaly occurrence location each have a repeating function held in this direction, and enter a step S1, where if they receive RRR frames sent from #ST6 at a time, though with some transmission route delays, then as own station is not a destination, they each send an RRR frame having as the destination an address of an adjacent transmission station on the side of the port A being a reception port of RRR frame, from its reception port of RRR frame, as it has had the SW-TX-B temporarily turned off, immediately after a completion of reception of the RRR frame, while starting an ST timer.

The #ST6 enters a step S-R31, where if it receives and detects an RRR frame addressing own station from an adjacent station #ST7 on the port B side on the way to the synchronizing station before the ST timer times up, then after a wait till the ST timer times up, it changes the port B on the side on the way to the synchronizing station that has been in a blocked state since the time of anomaly detection, and the port A opposing the ST-T-L that has been in a blocked state since before, to unblocked states, rendering both ports reception-enabled, whereby it alters from the terminal station status to a repeater station normal mode.

At the transmission station #ST7, #ST8, or #ST9 functioning normally on the way from the SYN absence detecting terminal station #ST6 to the anomaly occurrence location, after the step S1 where it has sent an RRR frame addressing an adjacent transmission station on the RRR reception port side as the destination from the RRR reception port side, if it detects reception of an RRR frame addressing own station from an adjacent transmission station on the way to the synchronizing station at the step S21 before the ST timer that has been started at the time of sending times up, then after a wait till the ST timer times up, it changes the port B that has been in a blocked state since the time of anomaly detection, to an unblocked state, whereby it comes back to a repeater station normal mode.

On the other hand, at the transmission station #ST9 adjacent to the anomaly location on the way to the SYN absence detecting terminal station #ST6, as it is failing to receive an RRR frame addressing own station from #ST10 even if the ST timer times up, at a step S22, it holds the port B in a blocked sate, so it stands as a new terminal station ST-T-L. Likewise, also for occurrence of anomaly at a location adjacent to the SYN absence detecting terminal station, as this is followed by absence of reception of an RRR frame addressing own station over lapse of a preset time, at the step S-R2, it holds a port that has been in a blocked state since the time of anomaly detection, as it is blocked, and changes the other communication port that has been in a blocked state since before as a terminal station, to an unblocked state, whereby it alters from the terminal station St-T-R to an ST-T-L.

By the foregoing, as described with respect to the embodiment 9 (claim 9), for occurrence of a transmission anomaly condition due to one-point failure on a double ring network system, positions of terminal stations are changed to a combination of an adjacent station on the way from a location of anomaly occurrence to a synchronizing station and an adjacent station on the way from the location of anomaly occurrence to the opposite side, to thereby avoid a total shutdown of the network. Further, terminal stations are re-locatable with a confirmed soundness of bi-directional communications with adjacent stations, allowing for a substantially simultaneous single-time completion between transmission stations on a route to transmission stations to be new terminal stations, permitting the recovery time from anomalous state to recovery to be very shortened.

Still more, individual transmission stations are free from communications with an extra central station, and adjacent stations are decentrally cooperative to do with processes up to a recovery, permitting complicate communication procedures to be omitted.

Therefore, according to this embodiment, in a system for initialization, two terminal stations are kept from repeating transmission frames they receive, so as not to have transmission frames sent from transmission stations circulate in a network configured in a ring form, allowing for configuration of a logically bus type network.

Further, in view of a master station of which a position on a double ring network is not specifically restricted for initialization, positions of terminal stations are uniquely determined in accordance with configuration of the network, at the time of initialization of the network.

Further, for the control system, transmission frames to be used premise the Ethernet® standard, while the SYN frame, RRR frame, INZ frame, or INZ-COMP frame defined in this system are not restricted to any specific frame format, and may be any transmission frame providing that they are identifiable.

Further, according to this system, an initializing system permits a transmission line up to an adjacent station and an adjacent station communication function, as well as a communication function including a transmission line from the adjacent station to own station to be checked for anomaly in each of both directions, allowing for a double ring network to be initialized with transmission lines free of anomaly.

This is by a soundness of bi-directional communication lines possibly ensured between mutually adjacent stations working in unison in the process of incorporating transmission stations one by one from an MS station to a double ring network, where each transmission station necessarily receives a responding acknowledgment INZ frame from an adjacent station, subject to a soundness of a reception system on the MS port side, and no anomalies in a transmission line to a transmission station adjacent to a port on the opposite side to the MS port, the adjacent station's reception and transmission function, and a returning transmission line from the adjacent station to own station.

Further, the process of incorporation enables acquisition of address information of adjacent stations of own station, with an extensive application, allowing for a facilitated grasp of connected status of transmission stations constituting a network, at the time of initialization.

Upon occurrence of a transmission anomaly condition due to one-point failure on a double ring network system, positions of terminal stations can be changed to a combination of an adjacent station on the way from a location of anomaly occurrence to a synchronizing station and an adjacent station on the way from the location of anomaly occurrence to the opposite side, to thereby avoid a total shutdown of the network.

Further, terminal stations are re-locatable with a confirmed soundness of bi-directional communications with adjacent stations, allowing for a substantially simultaneous single-time completion between transmission stations on a route to transmission stations to be new terminal stations, permitting the recovery time from anomalous state to recovery to be very shortened.

Still more, individual transmission stations are free from communications with an extra central station, and adjacent stations are decentrally cooperative to do with processes up to a recovery, permitting complicate communication procedures to be omitted.

(Supplementary Description of Automatic Terminal Station Setting Function)

The foregoing configuration of double ring network system is to have processes implemented as follows.

Figure 24:
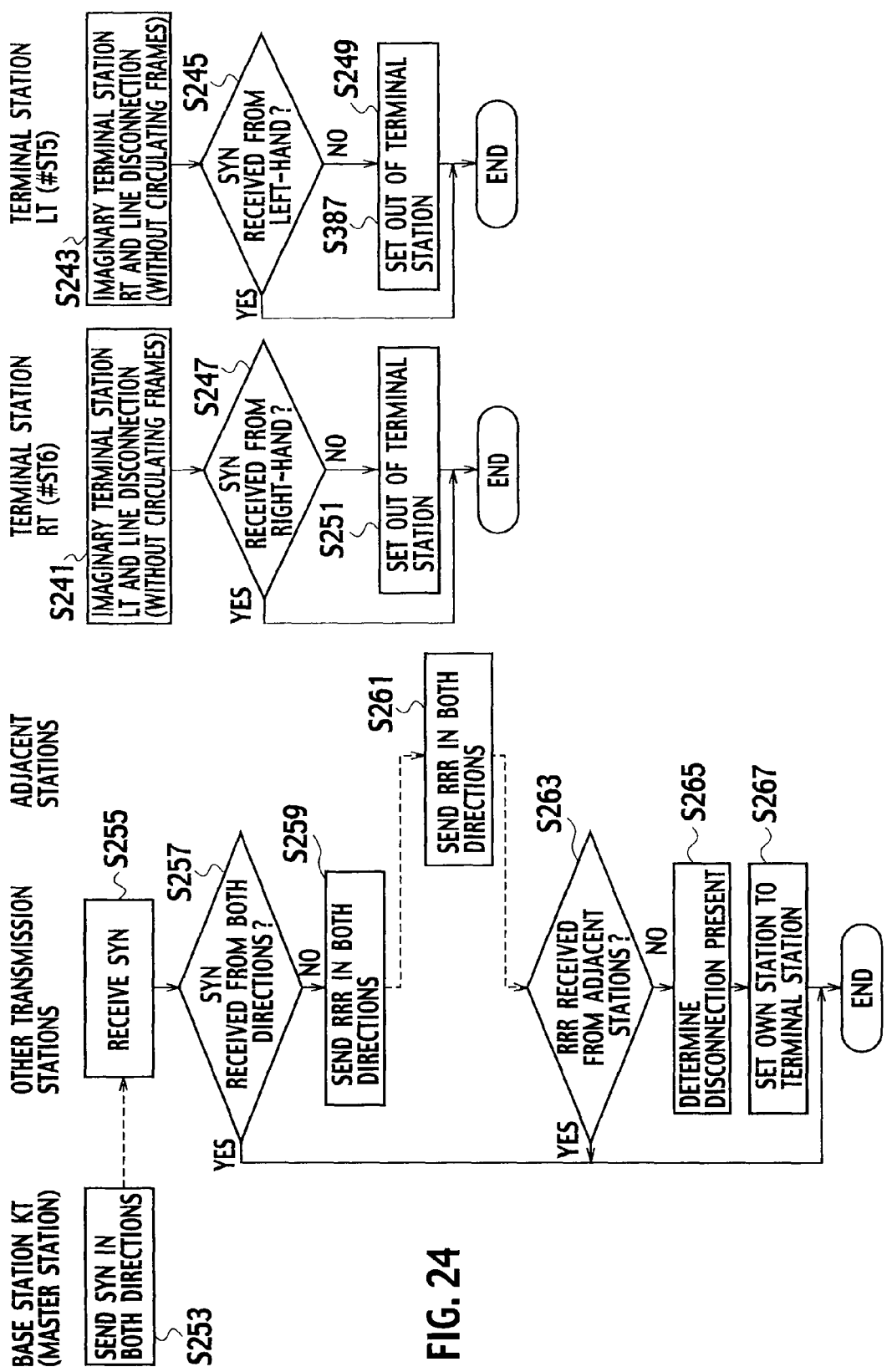
FIG. 24 is a flowchart describing an outline of an automatic terminal station setting function of a double ring network system according to this embodiment.

FIG. 24 is a flowchart generally describing an automatic terminal station setting function of a double ring network system according to this embodiment.

Figure 25:
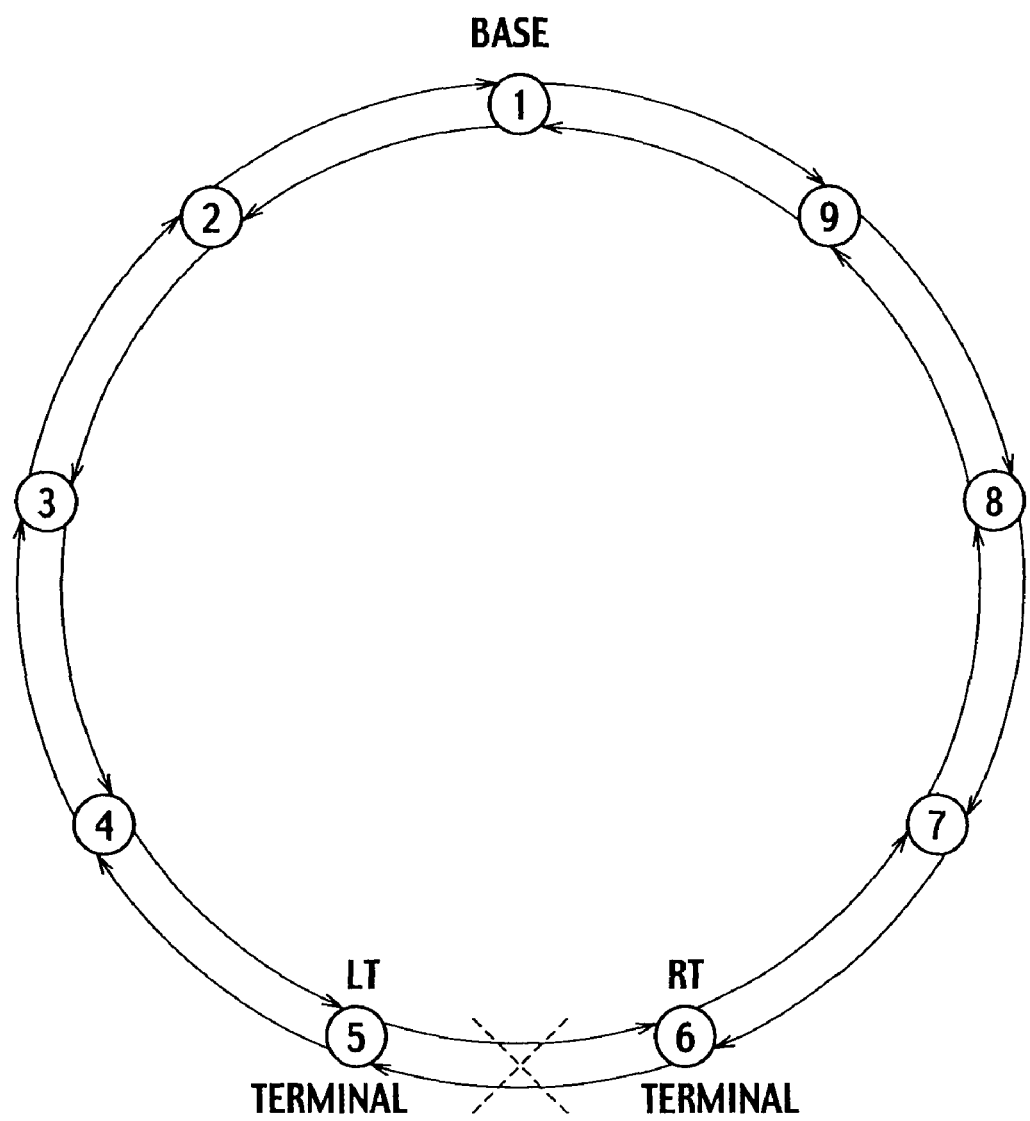
FIG. 25 is a diagram describing a terminal station setting in an initial phase.
Figure 26:
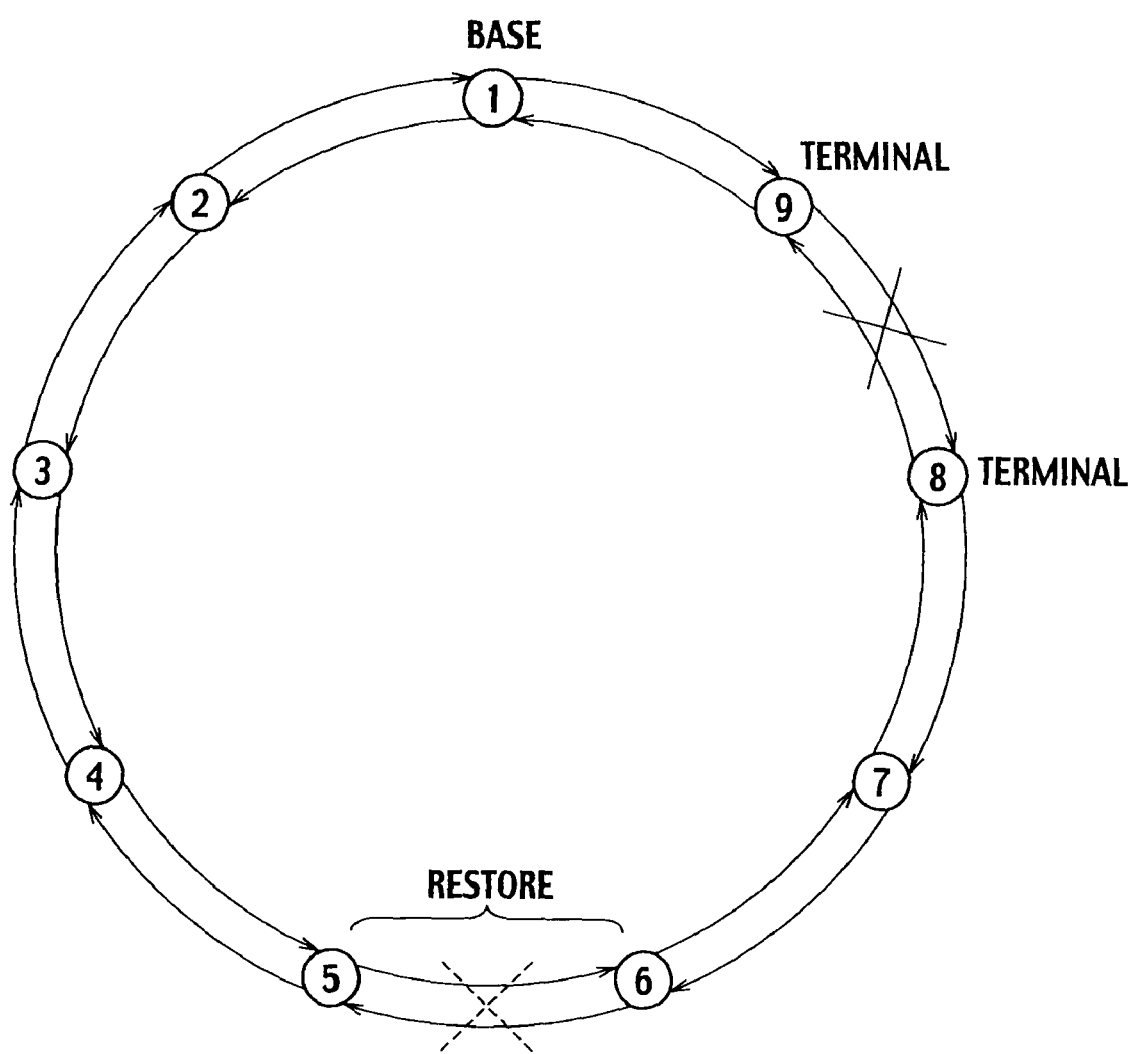
FIG. 26 is a diagram describing an exchange of terminal stations.

FIG. 25 is an explanatory diagram describing terminal stations set in an initialization. FIG. 26 is an explanatory diagram describing relocated terminal stations. In this embodiment, as illustrated in FIG. 25, a double ring network system is configured with nine transmission stations #ST1 . . . transmission stations #ST9, including #ST1 as a master station MS, having #ST5 and #ST6 as terminal stations initially set, using INZ frames, INZ-COMP frames, and the like, as described.

As shown in FIG. 24, the terminal station #ST5 (referred herein to a terminal station LT) and the terminal station #ST6 (referred herein to a terminal station RT) are now assumed to be under an imaginary condition with a circuit disconnection on the way to the terminal station RT (S241, S243). That is, the terminal station LT is able to receive a frame from a left-hand transmission station #ST4, but unable to transmit this to #ST6. Also, the terminal station RT is able to receive a frame from a right-hand transmission station #ST7, but unable to transmit this to #ST5.

And, the terminal station LT checks if it has received a SYN frame from the left-hand #ST4 (S245). Also, the terminal station RT checks if it has received a SYN frame from the right-hand #ST7 (S247).

Then, the terminal station LT as well as RT slips out of terminal station, unless it receives a SYN frame within a prescribed time (S249, S251). That is, #ST6 as well as #ST5 slips out of terminal station, so that if it be #ST6 this is enabled to transmit a frame to #ST5, and if it be #ST5 this is enabled to transmit a frame to #ST6.

On the other hand, the master station MS as a base (referred herein sometimes to a synchronizer) transmits SYN frames in both directions (right-handed, left-handed transmission) to respective transmission stations (S253). A respective transmission station receives such a SYN frame at a communication port A on one side, or a communication port on the other side (S255).

And, other transmission stations each check if SYN frames are received in both directions (S257).

For instance, as illustrated in FIG. 3, each transmission station is provided with a SYN frame detecting circuit 34 (SYN-DET-A) and a SYN frame detecting circuit 36 (SYN-DET-B), whereby reception of SYN frame is verified to detect, and output as an IRP-SYN-A signal representing a right-hand reception, or an IRP-SYN-B signal representing a left-hand reception.

Further, there is a SYN absence detecting circuit 35 (NO-SYN-DET-A/-B), which outputs an IPR-NO-SYN if it fails to input consecutive IRP-SYN-A/-B.

Accordingly, given consecutive IRP-SYN-A outputs, an MPU 24 is informed of consecutive SYN frames input through a communication port on one side. Further, given an IRP-NO-SYN output following an IRP-SYN-B output, it is informed of absence of periodical consecutive arrivals input through a communication port on the other side over a prescribed interval.

Further, the MPU 24 detects an anomaly in reception signal status of a transmission frame received through communication port A or -B from RCV-ERR-A or -B, depending on criteria to determine a monitoring reception signal status as being anomalous, as described.

That is, at the step S257, it determines having failed to receive SYN frames in both directions. In failure of reception of SYN frames in both directions, other transmission stations each send RRR frames in both directions (S259).

In this embodiment, it is assumed that #ST8 has failed to receive SYN frames from #ST9, and #ST9 has failed to receive SYN frames from #ST8.

ST8 transmits RRR frames to both #ST9 and #ST7, and #ST9 transmits RRR frames to both #ST8 and #ST1.

Transmission stations (#ST9, #ST7) adjacent to #ST8 as well as transmission stations (#ST8, #ST1) adjacent to #ST9 are each adapted upon reception of an RRR frame, to send RRR frames in both directions, and upon a failed reception of an RRR frame, not to send RRR frames (S261).

On the other hand, transmission station #ST8 as well as transmission station #ST9, as having sent RRR frames, checks if it receives an RRR frame from the adjacent transmission station (S263).

At the step S263, if #ST8 as well as #ST9 determines no RRR frame as having been received from the adjacent station having received an RRR frame, then it determines a way to the adjacent station #ST9 or #ST8 as being anomalous (S265). With this determination, #ST8 as well as #ST9 stands as a terminal station, as illustrated in FIG. 26 (S276).

That is, it has a function not to transmit a frame from the base to an adjacent transmission station failing to respond even though it has sent an RRR frame thereto.

Figure 27:
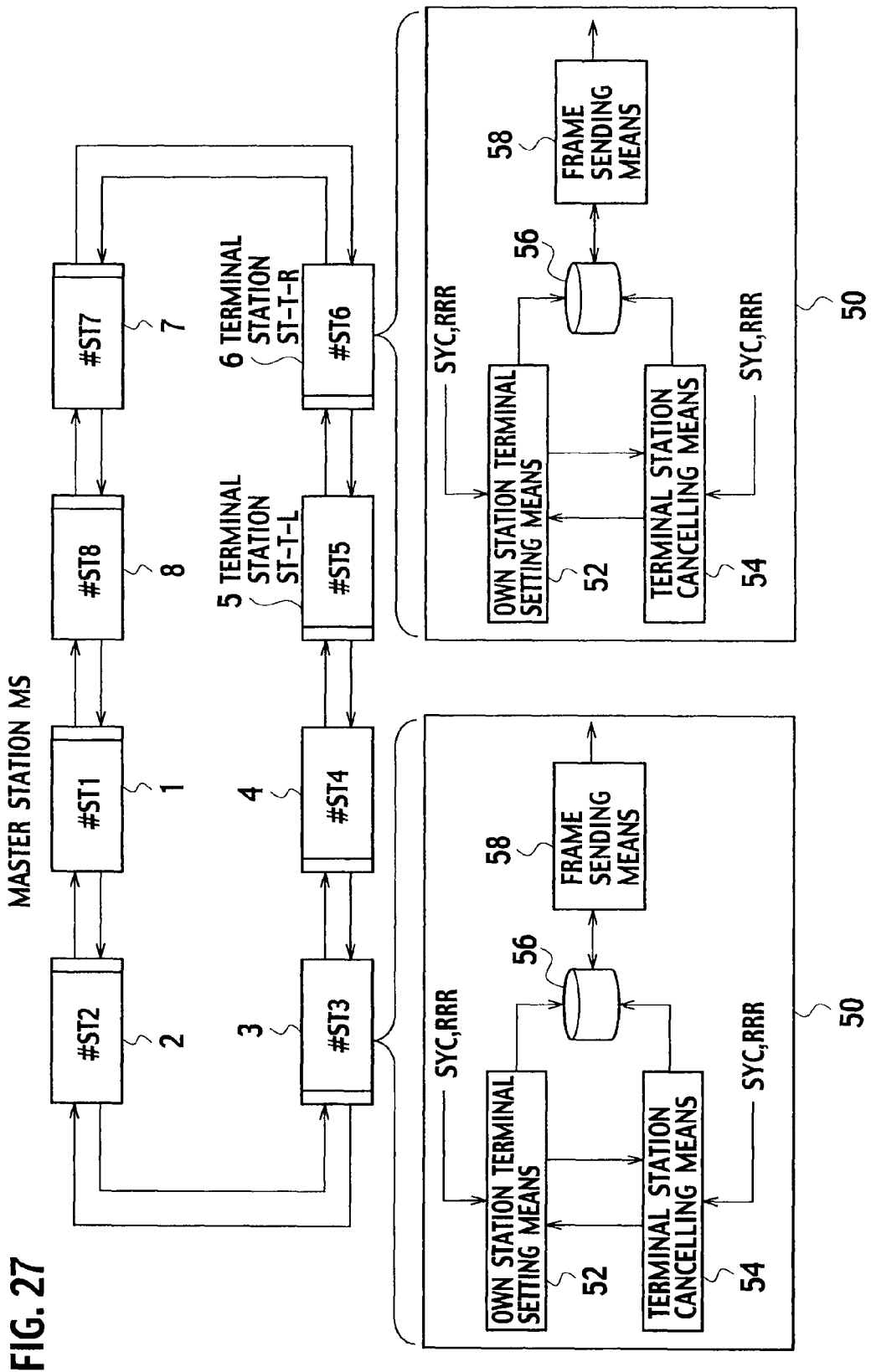
FIG. 27 is a diagram of schematic configuration of transmission stations.

It thus so follows that according to this embodiment each transmission station in the double ring network system has an automatic terminal station setting means 50 shown in FIG. 27. In this embodiment, it is depicted at representative #ST3 and #ST6.

The automatic terminal station setting means 50 includes an own station terminal setting means 52, a terminal station canceling means 54, a frame transmitting means 58, etc.

The own station terminal setting means 52 determines whether or not SYN frames are consecutively input from an adjacent station, and unless they are consecutively input, it sets up in a memory 56 a flag representing a way to the adjacent station as being anomalous. If the flag representing a way to the adjacent station as being anomalous is set up in the memory 56, the frame transmitting means 58 transmits RRR frames to both adjacent transmission stations, and informs the own station terminal setting means 52 of the transmission of RRR frames.

The own station terminal setting means 52 determines whether or not an RRR frame is received, and unless an RRR frame is received, it sets up in the memory 56 a flag representing own station as being set as a terminal station.

If own station is set as a terminal station, the frame transmitting means 58 is kept, even when receiving a SYN frame from the base, from sending this to a subsequent transmission station.

If SYN frames are consecutively input from both adjacent transmission stations, the terminal station canceling means 54 operates to have the frame transmitting means 58 transmit RRR frames to the adjacent transmission stations, and respond to an RRR frame as a return, by deleting from the memory 56 the flag representing own station as being set as a terminal station.

DETAILED DESCRIPTION

There will be described an embodiment of the present invention into details.

Description is now made of a transmission station according to the present embodiment, with reference to FIG. 3 as an example. In FIG. 3, the transmission station is made up by a section of communication port 10 (port A), a communication port 11 (port B), a transmission reception permitting switch section 9, a first-come reception control circuit 20 (RCV-SEL), a transmission reception control circuit 21 (MAC/DLC), a computer section 30, a frame detection determiner 31, and the like.

The communication port section 10 (port A) is configured with a receiver (RVR-A) and a transmitter (TVR-A) to implement bi-directional communications with an adjacent station (a left adjacent station, for instance).

The communication port section 11 (port B) is configured with a receiver (RVR-B) and a transmitter (TVR-B) to implement bi-directional communications with an adjacent station (a right adjacent station, for instance).

The transmission reception permitting switch section 9 includes a repeater 12 (FW-A: referred also to a repeater A), a repeat permitting switch 13 (SW-FW-A), a repeat permitting switch 14 (SW-FW-B), a repeater 15 (FW-B: referred also to a repeater B), a transmission permitting switch 16 (SW-TX-A), a transmission permitting switch 17 (SW-TX-B), a reception permitting switch 18 (SW-RCV-A), a reception permitting switch 19 (SW-RCV-B), and the like.

The computer section 30 is configured with an IOC 22, an IRP 23, an MPU 24, a PROM/RAM 25, a DP/RAM 26, a DPRC 27, a HOST-IF 28, and the like. The HOST-IF 28 is adapted for communications with a host device 29.

And, the frame detection determiner 31 has a plurality of later-described circuits to determine types and anomalies of frames.

It includes a reception anomaly detecting circuit 32 (RCV-ERR-A), a reception anomaly detecting circuit 33 (RCV-ERR-B), a SYN frame detecting circuit 34 (SYN-DET-A), a SYN absence detecting circuit 35 (NO-SYN-DET-A/B), a SYN frame detecting circuit 36 (SYN-DET-A), and an RRR frame reception detecting circuit 37 (RRR-DET-A).

Further, it is configured with an RRR frame destination address holding circuit 38 (RRR-RCV-ADRS), an RRR frame reception detecting circuit 39 (RRR-DET-B), an INZ frame reception detecting circuit 40 (INZ-DET-A), an INZ frame source address holding circuit 41 (INZ-TX-ADRS-A), an INZ frame reception detecting circuit 42 (INZ-DET-B), an INZ frame source address holding circuit 43 (INZ-TX-ADRS-B), and the like.

The above-noted RVR-A (receiver A: for reception at the left, with a base station on the left) of the communication port 10 is adapted to output a received signal as an SIG-RV-A reception signal.

And, the RVR-B (receiver B: for reception of signals from a clockwise direction) of the communication port 11 is adapted to output a received signal as an SIG-RV-B reception signal.

On the other hand, the TRV-A of the communication port 10 is adapted to send a reception signal from the repeat permitting switch 14 (SW-FW-B) (a reception signal as received at the RVR-B of the communication port 11 and relayed through the repeater B) or a signal from the transmission permitting switch 16 (SW-TX-A), as a transmission signal A to a transmission line.

And, the TRV-B of the communication port 11 is adapted to send a reception signal from the repeat permitting switch 13 (SW-FW-A) (a reception signal as received at the RVR-A of the communication port 10 and relayed through the repeater A) or a signal from the transmission permitting switch 17 (SW-TX-B), as a transmission signal B to a transmission line.

The repeater A is connected with the RVR-A of the communication port 10 and to the repeat permitting switch 13

(SW-FW-A), and adapted to send an SIG-RVR-A reception signal received at the RVA-A to the repeat permitting switch 13 (SW-FW-A).

The repeat permitting switch 13 (SW-FW-A) is connected to the TRV-B (transmitter B) of the communication port 11, and adapted, if set to an on state, to output a received SIG-RVR-A reception signal to the TRV-B of the communication port 11.

The repeat permitting switch 14 (SW-FW-B) is connected to the 1 RV-A (transmitter A) of the communication port 10, and adapted, if set to an on state, to output a received SIG-RVR-B reception signal to the TRV-A of the communication port 10.

As an output of the above-noted RVR-A, the SIG-RV-A signal from the port A is output, besides the repeater A (FW-A), as illustrated in FIG. 3, to the reception permitting switch 18 (SW-RVC-A), and the reception anomaly detecting circuit 32 (RCV-ERR-A), SYN frame detecting circuit 34 (SYN-DET-A), and RRR frame reception detecting circuit 37 (RRR-DET-A) in the frame detection determiner 31.

Further, it is sent to the RRR frame destination address holding circuit 38 (RRR-RCV-ADRS), the INZ frame reception detecting circuit 40 (INZ-DET-A), and the INZ frame source address holding circuit 41 (INZ-TX-ADRS-A).

Likewise, upon a reception at the port B being the other section of communication port 11, as an output of the RVR-B, the reception signal (SIG-RV-B) from the port B is output to the repeater B (FW-B), the reception permitting switch 19 (SW-RCV-B), the reception anomaly detecting circuit 33 (RCV-ERR-B), the SYN frame detecting circuit 36 (SYN-DET-B), and the RRR frame reception detecting circuit 39 (RRR-DET-B).

Further, it is sent to the RRR frame destination address holding circuit 38 (RRR-RCV-ADRS), the INZ frame reception detecting circuit 42 (INZ-DET-B), and the INZ frame source address holding circuit 43 (INZ-TX-ADRS-B).

(Description of Circuits)

The transmission permitting switch 16 (SW-TX-A) is adapted, when in a permitting state ON, to send a transmission output signal (transmission frame) of the transmission reception control circuit 21 (MAC/DLC) to the TVR-A of the port A being the one section of communication port 10. And, it is adapted, when in an OFF, for a switching to cut transmission output signals of the MAC/DLC, and as a result, no transmission frame is sent from the TVR-A of the communication port 10 corresponding thereto.

The transmission permitting switch 17 (SW-TX-B) is adapted, when in an ON, to send a transmission output signal (transmission frame) of the transmission reception control circuit 21 (MAC/DLC) to the TVR-B of the other section of communication port 11. And, it is adapted, when in an OFF, for a switching to cut transmission output signals of the transmission reception control circuit 21 (MAC/DLC), and as a result, no transmission frame is sent from the TVR-B of the communication port 11 corresponding thereto.

The reception permitting switch 18 (SW-RCV-A) is adapted to input an SIG-RV-A reception signal, and output a frame of this reception signal to the first-come reception selecting circuit 20 (RCV-SEL).

The reception permitting switch 19 (SW-RCV-B) is adapted to input an SIG-RV-B reception signal, and output a frame of this reception signal to the first-come reception selecting circuit 20 (RCV-SEL).

The first-come reception selecting circuit 20 (RCV-SEL) is adapted to determine a frame as from the reception permitting switch 18 (SW-RCV-A) and a frame as from the reception permitting switch 19 (SW-RCV-B), and if an overlap is found in between, to make a selection for a reception to be completed with a priority to a reception signal (transmission signal) received at the port side where either has first come.

An output of the RCV-SEL is lead to the transmission reception control circuit 21 (MAC/DLC), where it is processed for reception. According to the present embodiment, a double ring network system is configured in a ring form, nonetheless, to be equivalent to a bus type network, while working in a sound state, and the transmission reception control circuit 21 (MAC/DLC) is adapted, at transmission stations except for terminal stations, to have either port receive a transmission frame at a time, depending on positional relations between own station and transmission frame sending stations.

The transmission reception control circuit 21 (MAC/DLC) is adapted to control transmission and reception of signals (SIG-RV-A, SIG-RV-B) of transmission frames compliant with Ethernet® protocol, and send transmission outputs of the transmission reception control circuit 21 (MAC/DLC) to the transmission permitting switch 16 (SW-TX-A) and the transmission permitting switch 17 (SW-TX-B).

Further, it is adapted to output an IRP-DLC (a detection signal of completion of transmission or reception of MAC/DLC) to the IRP 23 in the computer section 301.

The computer section 30 has a function to control ON and OFF state switching of the above-noted reception permitting switches, transmission permitting switches, and repeat permitting switches.

The MPU 24 is configured as a core microprocessor, which follows procedures of programs stored in (a PROM among) program memories (employing the PROM, a working RAM memory, and a RAM), reading set values as necessary, and writing necessary data, temporarily holding or reading, to implement processes of, among others, Ethernet® transmission protocol and sequence procedures at transmission stations according to the present invention.

The IOC 22 is configured as an input output control circuit for receiving written data from the MPU 24 to output control signals to requiring circuits, or for receiving status inputs of respective circuits for the MPU 24 to read.

An interrupt signal detecting circuit 23 (the IRP) is configured as a circuit for detecting interrupt signals as signals interrupting to inform the MPU 24 of occurrences of events detected in circuitry of transmission station.

Enumerative as interrupt signals are those by detection of: occurrences of reception anomaly (IRP-RE-A, IRP-RE-B), absence of SYN (IRP-NO-SYN), reception of SYN frames (IRP-SYN-A, IRP-SYN-B), reception of RRR frames (IRP-RRR-A, IRP-RRR-B), reception of INZ frames (IRP-INZ-A, IRP-INZ-B), and completion of MAC/DLC transmission or reception (IRP-DLC).

Further, enumerative are such as those for requests for processing (IRP-STN) from the IOC 22 to the host device, and requests for processing (IRP-HOST) from the MPU to the host device.

The IRP 23 has an IRP-DLC signal input thereto from the transmission reception control circuit 21 (MAC/DLC), and as will be described later on, it has input from the frame detection determiner 31, an IRP-RE-A (reception anomaly occurrence signal A), an IRP-RE-B (reception anomaly occurrence signal B), an IRP-NO-SYN (SYN absence detecting signal), an IRP-SYN-A (SYN frame reception detecting signal A), an IRP-SYN-B (SYN frame reception detecting signal B), an IRP-RRR-A (RRR frame reception detecting signal A), an IRP-RRR-B (RRR frame reception detecting signal B), an IRP-INZ-A (INZ frame reception detecting signal A), and an IRP-INZ-B (INZ frame reception detecting signal B), and the IRP-DLC (MAC/DLC transmission reception completion detecting signal) and IRP-HOST' (processing request signals) to the host, alone or in combination of inputs, whereto it responds by outputting to the MPU 24 an interrupt informing what anomaly is detected.

The IRP-RE-A and the IRP-RE-B are collectively referred to as a reception anomaly occurrence detecting signal, and the IRP-SYN-A and the IRP-SYN-A-B are collectively referred to as a SYN frame reception detecting signal.

Further, the IRP-RRR-A and the IRP-RRR-B are collectively referred to as an RRR frame reception detecting signal, and the IRP-INZ-A and the IRP-INZ-B are collectively referred to as an INZ frame reception detecting signal.

A C-bus constitutes a common data bus connected to the MPU 24, and through the C-bus, the MPU 24 is adapted to read, among others, a detected status in particular of the SYN absence detecting circuit 35 (NO-SYN-DET-A/B), pieces of RRR frame destination address information held in the RRR frame destination address holding circuit 38 (RRR-RCV-ADRS), and pieces of INZ frame source address information held in the INZ frame source address holding circuit 41 (INZ-TX-ADRS-A) and the INZ frame source address holding circuit 43 (INZ-TX-ADRS-B).

The DP-RAM 26 is a dual-port memory circuit, which is configured for storage of data on transmission frames received or to be transmitted at the MAC/DLC, and as a host linking interface circuit 28 for an external host device 29 linked with the transmission station (as a memory circuit for exchange of condition status, and control commands, as well as for data to be transmitted or received through the HOST-IF).

The DP RAM 26 is accessed from the MPU 24, HOST-IF 28, and MAC-DLC 21, and a DPRAM controller has reading and writing timings controlled by the DPRC 27.

The before-mentioned programs operate in the double ring network system, which is configured in a ring form, nonetheless, to be equivalent to a bus type network, while working in a sound state, and for transmission stations else than terminal stations, they have processes executed to output a command to the repeat permitting switch 13 (SW-FW-A) or the repeat permitting switch 14 (SW-FW-B), to receive a transmission frame at either port at a time, depending on positional relations between own station and transmission stations sending transmission frames.

For terminal stations where connections remain in a ring form and transmission frames to be received appear at both ports, they have processes executed to send commands to render the reception permitting switch off at the port side normally in a blocked state, allowing a reception of input at the port side in an unblocked state.

The reception anomaly detecting circuit 32 (RCV-ERR-A) is a circuit for detecting a reception anomaly corresponding to the communication port 10 (port A). That is a circuit for detecting an error of an SIG-RV-A reception signal from the communication port 10 (port A), and upon anomaly detection, operates to output an IRP-RE-A signal (referred sometimes to a reception anomaly detecting signal A) to the computer section 30.

The reception anomaly detecting circuit 33 (RCV-ERR-B) is a circuit for detecting a reception anomaly corresponding to the communication port 11 (port B). Upon detection of reception anomaly, it sends an IRP-RE-A signal to the computer section 30. In other words, it is a circuit for detecting an error of an SIG-RV-B reception signal from the communication port 11 (port B), and upon anomaly detection, operates to output the IRP-RE-B signal (reception anomaly detecting signal B) to the computer section 30.

The reception anomaly may be reception of preamble patterns as reception clock synchronizing signals typical to Ethernet®, greater in number than specified, having dividable carrier signals of arrived frames.

To the contrary, there may be an occurrence of detection anomaly determined by detection of consecutive reception errors greater in number than specified, such as errors greater in number than specified as consecutively detected by checks to an error detection code (FCS) of transmission frame provided for Ethernet®transmission frames, or failures in detection of a required preamble pattern, while for detection circuits the range excludes FCS check means provided for the DLC/MAC and a static processing of results thereof by the MPU 24.

The SYN frame detecting circuit 34 (SYN-DET-A) is a circuit for detecting an arrival of SYN frame corresponding to the communication port 10 (port A).

That is, the SYN frame detecting circuit 34 (SYN-DET-A) is a circuit adapted, if an SIG-RV-A reception signal from the communication port 10 is a SYN frame, to detect this, and upon detection of a SYN frame, to output an IRP-SYN-A signal (referred sometimes to a SYN frame detecting signal A) to the computer section 30 and to the SYN absence detecting circuit 35 (NO-SYN-DET-A/B).

The SYN frame detecting circuit 36 (SYN-DET-B) is a circuit for detecting an arrival of SYN frame corresponding to the communication port 11 (port B). That is, the SYN frame detecting circuit 36 (SYN-DET-B) is a circuit adapted, if an SIG-RV-B reception signal from the communication port 11 is a SYN frame, to detect this, and upon detection of a SYN frame, to output an IRP-SYN-B (referred sometimes to a SYN frame detecting signal B) to the computer section 30 and to the SYN absence detecting circuit 35 (NO-SYN-DET-A/B).

On the other hand, the SYN absence detecting circuit 35 (NO-SYN-DET-A/B) is a circuit for detecting an occurrence of a long duration of a SYN-free silent state. That is, the SYN absence detecting circuit 35 (NO-SYN-DET-A/B) is adapted, unless an IRP-SYN-A signal (SYN frame reception detecting signal A) from the SYN frame detecting circuit 34 (SYN-DET-A) or an IRP-SYN-B signal (SYN frame reception detecting signal B) from the SYN frame detecting circuit 36 (SYN-DET-B) is output within a certain interval of time, to output an IRP-NO-SYN signal (SYN absence detecting signal) to the computer section 30.

The RRR frame reception detecting circuit 37 (RRR-DET-A) is a circuit for detecting a reception of an RRR frame corresponding to the communication port 10 (port A). In other words, it is adapted to detect an RRR frame (a signal informing a detection of a disconnection) in an SIG-RV-A reception signal from the RVR-A of the communication port 10 (port A), and upon detection, to output an IRP-RRR-A signal (RRR frame reception detecting signal A) to the computer section 30.

The RRR frame reception detecting circuit 39 (RRR-DET-B) is a circuit for signal detection to detect a reception of an RRR frame corresponding to the communication port 11 (port B). In other words, it is adapted to detect an RRR frame in an SIG-RV-B from the RVR-B of the communication port 11 (port B), and upon detection, to output an IRP-RRR-B signal (RRR frame reception detecting signal B) to the computer section 30.

The RRR frame destination address holding circuit 38 (RRR-RCV-ADRS) is a circuit for taking in, to hold, a field of destination address (DA) of an RRR frame in an SIG-RV-B signal received at the communication port 11 (port B), and is adapted to output a signal of H level, for instance, to the C-bus, when with the field. The RRR destination address holding circuit 38 (RRR-RCV-ADRS) has a circuit configuration adapted to take in reception signals at both sides, taking timings to take in destination address fields.

The INZ frame reception detecting circuit 40 (INZ-DET-A) is a circuit for detecting a reception of an INZ frame corresponding to the port A. That is, when having detected an INZ frame in an SIG-RV-A signal received at the communication port 10 (port A), it outputs an IRP-INZ-A (INZ frame reception detecting signal A) to the computer section 30.

The INZ frame reception detecting circuit 42 (INZ-DET-B) is a circuit for signal detection to detect a reception of an INZ frame corresponding to the communication port 11 (port B). That is, when having detected an INZ frame in an SIG-RV-B signal received at the communication port 11 (port B), it outputs an IRP-INZ-B (INZ frame reception detecting signal B) to the computer section 30.

The INZ frame source address holding circuit 41 (INZ-TX-ADRS-A) is a circuit corresponding to the port A, and adapted to hold a field of source address (SA) of an INZ frame in an SIG-RV-A signal received at the port A.

The INZ frame source address holding circuit 43 (INZ-TX-ADRS-B) is a circuit corresponding to the port B, and adapted to hold a field of source address (SA) of an INZ frame in an SIG-RV-B signal received at the port B.

Stations are configured as described above, and incorporated in a double ring network, as illustrated in FIG. 1.

For stations configured as above, an initializing process will be described.

Figure 28:
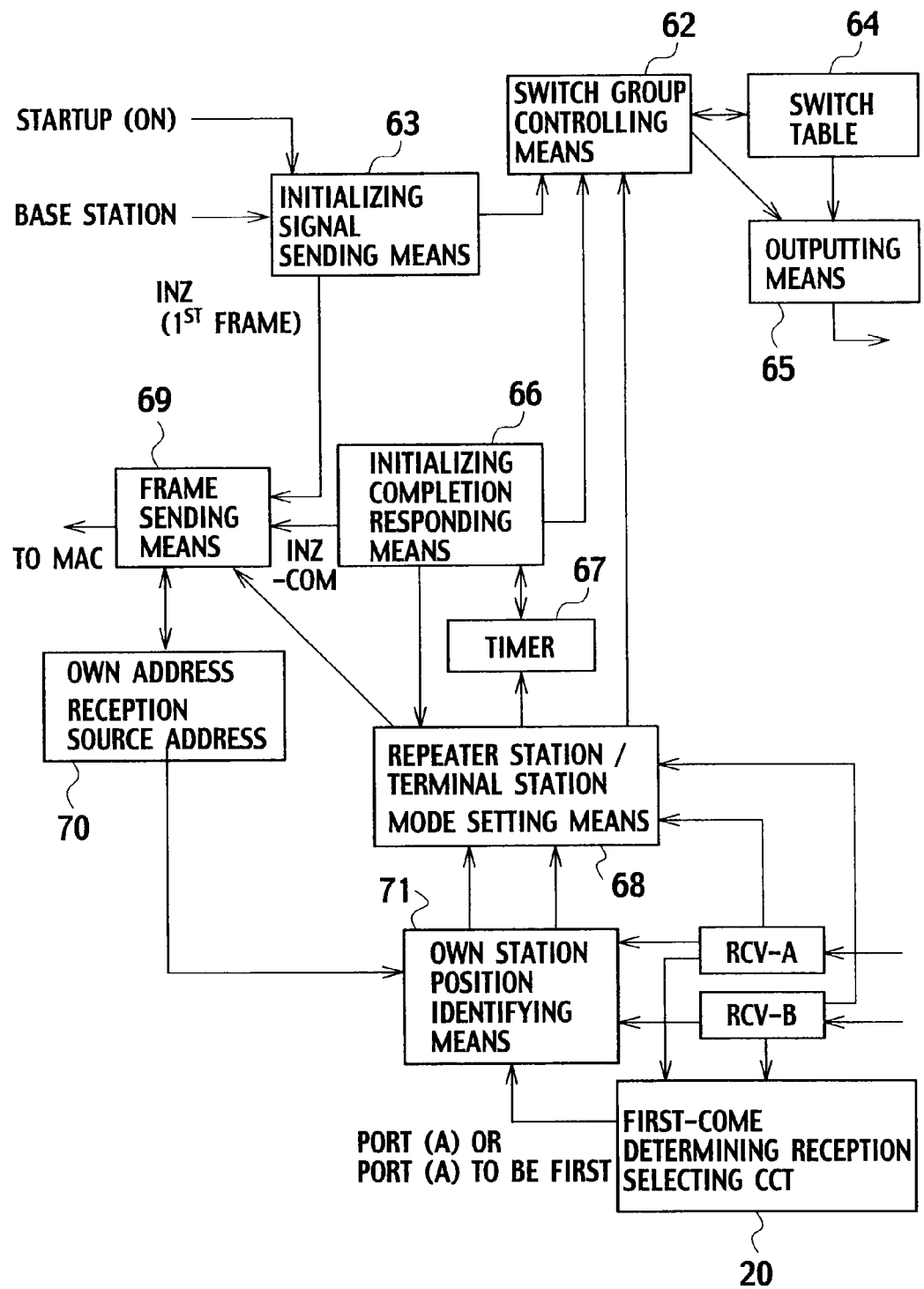
FIG. 28 is a diagram of schematic configuration describing an initializing process according to this embodiment.

For the initialization, as illustrated in FIG. 28, in a double ring network system including a plurality of transmission stations having any one thereof as a base station, and each respectively connected by a dual transmission line composed of a first communication line and a second communication line, the respective transmission station being provided with a first communication port for receiving at one end side (right-hand end) thereof left-handed information from the base station and outputting right-handed input information from the base station or information generated at this station in a right-handed direction from the one end side (right-hand end), and a second communication port for receiving at another end side (left-hand end) thereof right-handed input information from the base station and outputting the left-handed information or information generated at this station in a left-handed direction from the other end side (left-hand end), to perform bi-directional communications in between, the base station has, for an initial phase of startup, an INZ frame transmitting means (initializing signal sending means 63) for transmitting right-handed and left-handed initializing first frames containing information having a source as the base station and a destination of transmission station designated, simultaneously from the first communication port and the second communication port. Preferably, the other stations should also have this initializing signal sending means 63.

The other stations have, for the initial phase of startup, an INZ frame reception permitting means (implemented in FIG. 28 with an initializing completion responding means 61, a switch group controlling means 62, and a switch controlling means 62) for permitting reception of information from the first communication port and the second communication port, a first-come determining means (configured in FIG. 28 with a first-come reception selecting circuit 20) for determining, when the first frames are received at the first communication port and the second communication port, the communication port having first-received said first frame, an own station position identifying means (71 in FIG. 28) for determining, when the right-handed and left-handed first frames having this station as a destination are received the right-handed at the first station and the left-handed at the second station, respectively, the station being positioned at a left-handed end or a right-handed end, whichever is in accordance with line lengths from the base station to this station and identification information of respective stations the right-handed and left-handed routed through as contained in the first frames, and outputting a terminal station setting signal to have set if it stands as a terminal station on either hand, a first terminal station deciding means for operating with the terminal station setting signal output, for a result of the first-come determination that the first communication port has first received the right-handed first frame, to set the own station in a terminal station mode at a left-hand end from the base station, transmit the left-handed first frame the second communication port has received temporarily to a left-hand adjacent station, and thereafter, stop sending information from the second communication port, and a second terminal station deciding means for operating with the terminal station setting signal output, for a result of the first-come determination that the second communication port has first received the first frame, and the first communication port has received the left-handed first frame from a right-hand adjacent station, to set the own station to be a terminal station mode at a right-hand end from the base station, and stop sending information from the first communication port. The first and second terminal station deciding means are implemented in FIG. 28 with a repeat station/terminal station mode setting means 68.

In FIG. 28, along with the startup, the initializing signal sending means 63 has a frame sending means 69 send an INZ frame. The frame sending means 69 reads an address of own station and an address of a source of reception from a memory 70, and incorporates them in the frame to be sent out.

On the other hand, along with the initializing signal sending means 63 sending an INZ frame, the switch group controlling means 62 reads a set of switch setting data at the time of initialization from the switch table 64, having an outputting means 65 output the same. There are sets of switch setting data shown in FIG. 6, FIG. 7, and FIG. 20. Respective switches are controlled to turn on or off in accordance with the set of switching data.

And, the own station position identifying means 71 reads frames received at SW-RCV-A and SW-RCV-B, and identifies a position of own station from the own station address in the memory 70 and source addresses of transmitted frames. Based on the position thus identified, the repeater station/terminal station mode setting means 68 operates for a setting to be a repeater station or terminal station, having a timer 67 to start.

Then, the initializing completion responding means 66 operates, for the repeater station or terminal station set at the time of initialization, to have the frame sending means 69 send an initializing completion frame.

Figure 29:
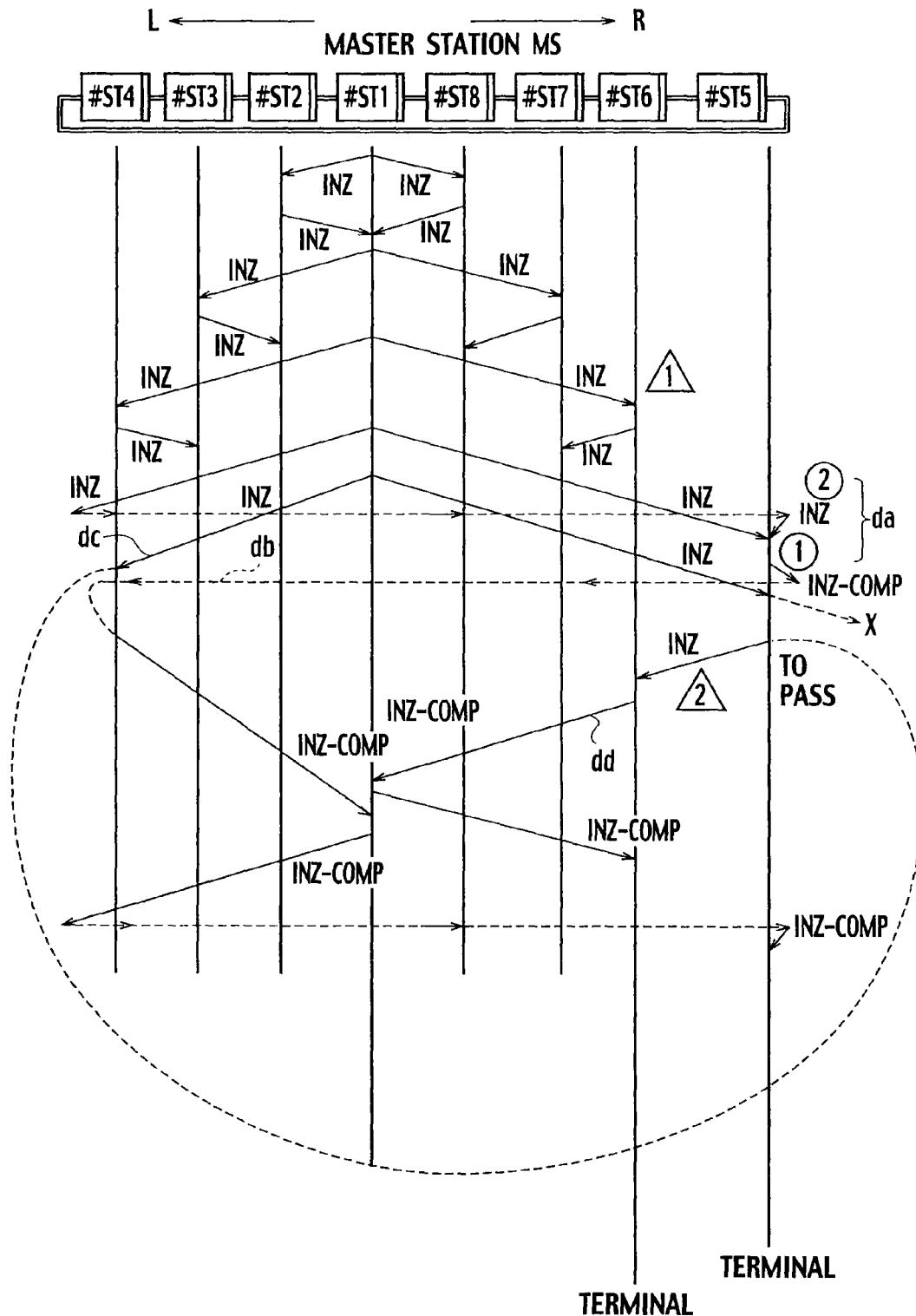
FIG. 29 is a chart of sequences in an initializing process according to this embodiment.

FIG. 29 is a complementary sequence chart to FIG. 9 showing sequences of INZ frames between transmission stations communicating with each at the time of initialization.

In the sequence chart of FIG. 29, a master station MS (transmission station #ST1) transmits INZ frames for initialization in a left-hand direction (transmission station #ST2, . . . , transmission station #ST4), and in a right-hand direction (transmission station #ST8, . . . , transmission station #ST5).

In other words, the MPU 24 operates as an INZ frame transmitting means for an initializing process for setting the transmission permitting switch 16 (SW-TX-A) in an on state and setting the transmission permitting switch 17 (SW-TX-B) in an on state, to bi-directionally transmit INZ frames from the transmission reception controller 21 (MAC/DLC).

Then, at a respective transmission station, the MPU 24 is operating as a frame reception detecting means adapted for setting the reception permitting permission switch 18 (SW-RCV-A) and the reception permitting switch 19 in on states, to have incoming INZ frames from both communication ports taken into the first-come reception selecting circuit 20 (RCV-SEL), and a result thereof input to the transmission reception controller 21 (MAC/DLC).

This determination of first-come may involve a case of frames simultaneously input to the communication port A and the communication port B, depending such as on numbers of stations and line lengths of routed lines. In such the case, a predetermined side may preferably be determined as first-come.

Further, for initializing frames to be detected, the detection is performed by the INZ frame reception detecting circuit 40 (INZ-DET-A) and the INZ frame reception detecting circuit 42 (INZ-DET-B). The frame reception detecting means includes the INZ frame reception detecting circuit 40 (INZ-DET-A) and the INZ frame reception detecting circuit 42 (INZ-DET-B).

In FIG. 29, #ST5 receives R-handed from (the communication port A) an INZ frame (destined for #ST5) from the master station through #ST8, #ST7, and #ST6 (encircled "1" in FIG. 29), and an INZ frame (destined for #ST5) from the master station (MS) L-handed arrives at the #ST5 through #ST2, #ST3, and #ST4 (encircled "2" in FIG. 29). That is, it receives (da) a pair of INZ frames.

And, for the INZ frames having arrived R-handed and L-handed at #ST5, as the INZ frames contain respective routed stations' addresses, it can count their numbers, to thereby get where is own station in right-handed and left-handed orders.

Further, in response to the INZ frames, it sends responding acknowledgment frames, counting their times, and from points of time when the frames are looped around, it can get (R-handed and L-handed) line lengths from own station to the master station. This process is implemented by the own station position identifying means (refer to FIG. 10 and FIG. 11).

Next, after the identification of its position, it transmits (db) an INZ-COMP frame R-handed to the master (MS station), informing of its being set as a terminal station in the initial setting. That is, initially for an INZ frame it has received first at the communication port A (R-handed) before reception at the communication port B (L-handed), it operates as an R-handed terminal to transmit the INZ-COMP R-handed to the master MS.

This determination of whether the communication port A has first received or the communication port B has first received is implemented by the first-come reception selecting circuit 20 (RCV-SEL).

Further, the #ST5 is set after it has sent the INZ-COMP R-handed to the master (MS), so as not to repeat any INZ frame, if this INZ frame is sent R-handed from the master station (MS station) (not to output from the communication port B: terminal station deciding means). For instance, the repeat permitting switch 13 (SW-FW-A) is set to an off state.

On the other hand, for #ST6, at the time of initialization, an INZ frame is transmitted R-handed from the master station (MS) to #ST6, as indicated at triangular mark "1" in FIG. 29. From the master station (MS), an INZ frame is transmitted L-handed to the #ST6 (dc).

This L-handed INZ frame arrives at #ST4, #ST5, and #ST6 due to interconnection between #ST4 and #ST5. Here, the INZ frame of current time is let to pass through #ST5.

In other words, at the #ST6, reception of INZ frame is to occur twice being R-handed and L-handed (triangular mark "2" in FIG. 29). By that, it operates as a terminal station (R-handed) to transmit (dd) an INZ-COMP frame to the master station (MS). Accordingly, there appear an R-handed terminal station set to be #ST5 and an L-handed terminal station set to be #ST6.

For the decision of R-handed terminal station and L-handed terminal station, each transmission station is adapted to grasp addresses of respective transmission stations on the network. For instance, at the communication port A as a first-come, this frame may have been transmitted with the number or addresses of routed stations till this station added, and at the communication port B, a received frame may have been transmitted with the number or (forward ordered) addresses of routed stations till this station added, allowing own position to be identified in an entirety of network. In this situation, the decision of an R-hand and an L-hand may preferably be reached in consideration of an entire line length of network and lengths from this station to the master station.

In the case of a frame containing addresses of routed stations, there may also be a determination of whether an adjacent station has a younger number or an older number than own.

For the initializing process of transmission stations, supplemental detailed description will be made with reference to FIG. 10 and FIG. 11.

FIG. 10 includes a step S101, which is a process for a transmission station to bi-directionally transmit (R-handed and L-handed) INZ frames (S01 and S02 in FIG. 10).

Description is now made of a step S0 shown in FIG. 10. More specifically, at the step S01, it is determined if INZ frame reception is detected, reception port A (communication port A) is a blocked state, and MS port=B is false, and terminal station=false.

First Condition.

That is, the computer section 30 is operating to determine if the condition of S01 is met as shown in FIG. 6, with the repeat permitting switch 13 (SW-FW-A) set to be off, the repeat permitting switch 14 (SW-FW-B), to be off, the transmission permitting switch 16 (SW-TX-A), to be on, the transmission permitting switch 17 (SW-TX-B), to be on, the reception permitting switch 18 (SW-RCV-A), to be off, and the reception permitting switch 19 (SW-RCV-B), to be off.

By the setting shown in FIG. 6, transmission output signals from the transmission reception control circuit 21 (MAC/DLC) are transmitted through the transmission permitting switch 16 (SW-TX-A), from the TVR-A of communication port A to a transmission line, and through the transmission permitting switch 17 (SW-TX-B), from the TRV-B of communication port B to a transmission line. For the base station (at MS station, the setting is performed by workers), transmission output signals from the transmission reception control circuit 21 (MAC/DLC) have respective transmission stations' addresses contained therein. By doing so, sequences shown in FIG. 9 and FIG. 29 are implemented.

The MPU 24 operates for turning the SW-FW-A or B on to thereby set an unblocked state, simultaneously turning the SW-RCV-A or B on to permit thereafter transmission frames to be taken in from the reception port.

Moreover, it temporarily turns on simply the SW-TX-A or B corresponding to the reception port, to send a responding acknowledgment frame at the reception port side, and set the station mode to a not terminal.

Further, it receives an INZ frame from a port to be blocked in a situation with an MS port established, to thereby decide terminal stations ST-T-L and ST-T-R in accordance with the reception port.

For the condition of step S01 in FIG. 10, the MPU 24 in the computer section 30 (referred herein simply to a computer section 30) sets an address of the MS station to a source address, and holds the reception port A (communication port A) as it is (adapted to take in a signal through the communication port A).

The computer section 30 turns on the repeat permitting switch 13 (SW-FW-A) and the reception permitting switch (SW-RCV-A). That is, a reception signal from the communication port A is repeated through the repeat permitting switch 13 (SW-FW-A) to the communication port 11, and a reception signal (SIG-RV-A) from the communication port 10 is input by the reception permitting switch (SW-RCV-A) to the first-come reception selecting circuit 20 (RVC-SEL), to determine whether it is a first-come or not, of which a result is output to the transmission reception control circuit 21 (MAC/DLC).

Further, the computer section 30 turns the transmission permitting switch 17 (SW-TX-B) off, and the transmission reception control circuit 21 (MAC/DLC) sends an INZ frame (destination is MS station) from the MS port=A (communication port A).

Further, in accordance with an instruction from the computer section 30, the transmission reception control circuit 21 (MAC/DLC) turns the transmission permitting switch 17 (SW-TX-B) on, rendering a reception signal from the port B reception-enabled, to output this to the first-come reception selecting circuit 20 (RVC-SEL), to determine if it is a first-come. The CPU in the computer section 30 then sets the station mode for terminal station to not (negation).

On the other hand, an SIG-RV-A reception signal received at the port A undergoes a determination for detection by the frame detection determiner 31. The determination for detection by the frame detection determiner 31 outputs an IRP-RE-A signal (referred sometimes to a reception signal A anomaly detecting signal) to the computer section 30, if the reception anomaly detecting circuit 32 (RCV-ERR-A) detects an anomaly of SIG-RV-A reception.

If the SIG-RV-A reception signal from the communication port 10 is a SYN frame, the SYN frame detecting circuit 34 (SYN-DET-A) outputs an IRP-SYN-A signal (referred sometimes to a SYN frame detecting signal A) to the computer section 30, and the SYN absence detecting circuit 35 (NO-SYN-DET-A/B).

The RRR frame reception detecting circuit 37 (RRR-DET-A) responds to detection of an RRR frame in an SIG-RV-A from the RVR-A of the communication port 10 (port A), by outputting an IPR-RRR-A signal (RRR frame reception detecting signal A) to the computer section 30.

If the INZ frame reception detecting circuit 40 (INZ-DET-A) detects an INZ frame in an SIG-RV-A signal received at the communication port 10 (communication port A), it outputs an IRP-INZ-A (INZ frame reception detecting signal A) to the computer section 30.

The INZ frame source address holding circuit 41 (INZ-TX-ADRS-A) holds a field of source address (SA) of an INZ frame in an SIG-RV-A signal received at the port A.

Further, if the reception anomaly detecting circuit 33 (RCV-ERR-B) detects an anomaly of an SIG-RV-B reception signal from the communication port 11 (port B), it outputs an IRP-RE-B (reception anomaly occurrence detecting signal) to the computer section 30.

If the SIG-RV-B reception signal from the communication port 11 is a SYN frame, the SYN frame detecting circuit 36 (SYN-DET-B) outputs an IRP-SYN-B signal (referred sometimes to a SYN frame detecting signal B) to the computer section 30, and the SYN absence detecting circuit 35 (NO-SYN-DET-A/B).

On the other hand, the SYN absence detecting circuit 35 (NO-SYN-DET-A/B) outputs an IRP-NO-SYN signal (SYN absence detecting signal) to the computer section 30, if neither IRP-SYN-A signal (SYN-frame reception detecting signal A) from the SYN frame detecting circuit 34 (SYN-DET-A) nor IRP-SYN-B signal (SYN-frame reception detecting signal B) from the SYN frame detecting circuit 36 (SYN-DET-B) is output within a preset time.

The RRR frame reception detecting circuit 39 (RRR-DET-B) detects an RRR frame in an SIG-RV-B from the RVR-B of the communication port 11 (port B), and responds to the detection by outputting an IPR-RRR-B signal (RRR frame reception detecting signal B) to the computer section 30.

The RRR frame destination address holding circuit 38 (RRR-RCV-ADRS) takes in and holds a field of destination address (DA) of an RRR frame in an SIG-RV-B signal received at the communication port 11 (port B).

The RRR destination address holding circuit 38 (RRR-RCV-ADRS) takes in receptions signals at both sides, and takes in fields of destination address in time.

The INZ frame source address holding circuit 43 (INZ-TX-ADRS-B) holds a field of source address (SA) of an INZ frame in an SIG-RV-B signal received at the port B.

Further, for a step S02 in FIG. 10, the condition is checked if an INZ frame reception is detected, reception port B (communication port 11) is blocked, MS port=A is false, and terminal station=not.

At the step S02 in FIG. 10, if the condition is met, the computer section 30 sets the MS station address to a source address, and holds the reception port B (communication port B) as it is (adapted to take in a signal through the communication port B).

The computer section 30 turns on the repeat permitting switch 14 (SW-FW-B) and the reception permitting switch (SW-RCV-B). That is, a reception signal from the communication port B is repeated through the repeat permitting switch 14 (SW-FW-B) to the communication port 10, and a reception signal (SIG-RV-B) from the communication port 11 is input by the reception permitting switch (SW-RCV-B) to the first-come reception selecting circuit 20 (RVC-SEL), to determine whether it is a first-come or not, of which a result is output to the transmission reception control circuit 21 (MAC/DLC).

Further, the computer section 30 turns the transmission permitting switch 16 (SW-TX-A) off, and the transmission reception control circuit 21 (MAC/DLC) sends an INZ frame (destination is MS station) from the MS port=B (communication port B).

Further, in accordance with an instruction from the computer section 30, the transmission reception control circuit 21 (MAC/DLC) turns the transmission permitting switch 16 (SW-TX-A) on, rendering a reception signal from the port B reception-enabled, to output this to the first-come reception selecting circuit 20 (RVC-SEL), to determine if it is a first-come. The CPU in the computer section 30 then sets the station mode for terminal station to not (negation).

At a step S03 in FIG. 10, if the condition is met, the computer section 30 sets the station mode to terminal station STL-T-L, and INZ-COMP=time . . . normal terminal, and goes to sending INZ-COMP frame.

Then, it sets the MS station address to a source address, and holds the reception port B (communication port B) as it is (adapted to take in a signal through the communication port B).

For a step S04 in FIG. 10, the condition is checked if an INZ frame reception is detected, reception port A (communication port A) is blocked, MS port=B, and terminal station=not.

If this condition is met, it sets the station mode to terminal station ST-T-R, and INZ-COMP=true . . . normal terminal, and goes to sending INZ-COMP frame.

Next, after the process of step S0, it starts a timer at a step S1 in FIG. 10.

In FIG. 10, the step S102 is a timer starting process.

At the step S102 in FIG. 10, the step S1 is for responding to a detection of subsequent INZ frame reception from the master station, by starting the timer to wait for an event of S2.

For the condition: detection of INZ frame reception, station mode being not terminal station, INZ-COMP=false, and reception port=A/B, the timer is started.

Thus, it sends initialization-instructing INZ frames in both directions (communication port A, and B), and waits for arrival of a responding acknowledgment frame (INZ-COMP) from adjacent station.

At this time, the computer section 30 employs the transmission reception control circuit 21 (MAC/DLC) to render, as illustrated in FIG. 6, blocked state, and reception-prohibited state (SW-TX-A and SW-TX-B to be on) for transmission in both directions.

Then, SW-RCV-A and SW-RCV-B are turned on, for the frame detection determiner 31's INZ-DET-A to detect arrival of an INZ frame in SIG-RV-A reception signal from the communication port A, and INZ-DET-B to detect arrival of an INZ frame in SIG-RV-B reception signal from the communication port B Further, the first-come reception selecting circuit 20 (RCV-SEL) monitors SW-TCV-A and SW-RCV-B, to determine which port has received, of which a result is informed to the transmission reception control circuit 21 (MAC/DLC). The reception port that has first received is set as an MS port.

In FIG. 11, the step S103 is a process of setting a transmission station to a repeater station (an opposing station) or terminal station mode.

After S0 having sent INZ frames, under a condition at S1 detecting for arrival of a subsequent INZ frame, it responds to reception of a responding acknowledgment INZ frame sent from an adjacent station on an opposite side to the MS port side, by changing a blocked state of this reception port to the other communication port to an unblocked state, permitting reception of incoming transmission frames to be taken in.

By that, this transmission station has a normal station mode as a repeater station permitting reception of transmission frames received at communication ports on bi-directional sides to be taken in, and repeated to the other sides.

At S21, if the condition: before timer times up, INZ frame reception detected, reception port=B, and station mode=not terminal station, then, it resets timer, setting SW-FW-B on, station mode=normal, and MS port=A.

At S22, if the condition: timer up, INZ frame reception detected, (reception port=B)=false, MS port A, and station mode=not terminal station, then, it sets station mode=terminal ST-T-L, MS port=A, INZ-COMP=true . . . anomalous terminal or S04: opposing station.

At S23, if the condition: before timer times up, INZ frame reception detected, (reception port=A), MS port B, and station mode=not terminal station, then, it resets timer, setting SW-FW-A on, station mode=normal, and MS port=B.

At S24, if the condition: timer up, INZ frame reception detected, (reception port=A)=false), MS port B, and station mode=not terminal station, then, it sets station mode=terminal ST-T-R, MS port=B, INZ-COMP=true . . . anomalous terminal or S03: opposing station.

In FIG. 11, the step S104 is a process of determining an R-handed terminal station or an L-handed terminal station. At step S3 in FIG. 11, that is, it permits an ensured reception of INZ-COMP frame at an MS station by a sequence of responding acknowledgments with the MS station. This is an embodiment example in which resending processes are continued up to reception of a responding acknowledgment INZ-COMP frame addressing own station as a destination from the MS station, having different wailing times for the resending being ST1 and ST2 depending on station modes ST-T-L and ST-T-R, to avoid consecutive overlaps of INZ-COMP frames at the MS station.

In FIG. 11, at the step S3, a completion of initialization is detected at the MS station side, so it can stop periodically sending INZ frames.

At S31, if the condition: INZ-COMP, and ST-T-L then, it sets SW-TX-B=OFF, sending INZ-COMP frame (destination=MS station), station mode=ST-T-L, and SW-TX-B=ON, starting ST timer (timer value=ST1), INZ-COMP-SENT=true.

At S32, if the condition: INZ-COMP, and ST-T-R then, it sets SW-TX-A=OFF, sending INZ-COMP frame (destination=MS station), station mode=ST-T-R, and SW-TX-A=ON, starting ST timer (timer value=ST2), INZ-COMP-SENT=true.

In FIG. 11, at the step S105 is a process of resetting timer for determination of both terminal stations, and a process of resending INZ-COMP after a failed transmission.

At S41, if the condition: before ST timer times up, INZ-COMP-REC (INZ-COMP-SENT), INZ-COMP frame reception, destination (own station), and source=MS station, then, it resets ST timer, as INZ-COMP=false, INZ-COMP-sent=true . . . terminal station fixed, and initializing process ends.

At S42, if the condition: timer up, INZ-COMP-REC=false, then, INZ-COM frame resending process.

Therefore, at a startup such as when powered on, even in a network of a plurality of connections, a transmission station automatically stands as an R-handed terminal station, L-handed terminal station, or repeater station.

The invention claimed is:

1. A communication control method for double ring networks including a set of two or more transmission stations each respectively configured with a pair of communication ports for communications to be implemented bi-directionally, and mutually connected by said pairs of communication ports thereof in a ring form through a transmission line to implement intercommunications between transmission stations, wherein for a respective transmission station, the method comprising:

a step of simultaneously sending transmission frames containing information at a time from paired communication ports of said transmission station;

a step of detecting a transmission frame sent from another said transmission station received at one of said paired communication ports; and a step of sending above-noted said transmission frame as repeatable to another communication port being the other with respect to the one communication port, from said other communication port, and for a respective one of adjacent paired said transmission stations out of said set of two or more transmission stations mutually connected in the ring form, the method comprising:

a step of having the transmission frame sent from one of said transmission station's communication ports; and a step of performing, for a transmission frame received at a second one of said transmission station's communication ports as it is connected through the transmission line, a detection at this station, and in that said transmission frame to be responded to in accordance with information contained in said transmission frame is kept from being sent, through a repeating from said receiving communication port to the other communication port, from said other communication port, whereby said received transmission frame is kept from arriving at ring-form connected and subsequent transmission stations in a repeating direction thereof, and above-noted transmission frames sent from said transmission station are kept from circulating in a network configured in the ring form.

2. The communication control method for double-ring networks according to claim 1, wherein for the set of transmission stations, the method further comprising:

having, at a respective one of adjacent paired said transmission stations out of said set of two or more transmission stations mutually connected in the ring form in positions determined relative to one said transmission station as a base in accordance with a total number of said transmission stations constituting the network of the ring form and a total length of the transmission line connecting said transmission stations with each other, the transmission frame sent from the one of said transmission station's communication ports.

3. The communication control method for double-ring networks according to claim 1, wherein as for a format of said transmission frame to be sent and received through said communication ports, and a transmission line interface of said communication ports, it complies with the ISO/IEC8802-3 standard.

4. A double ring network system including transmission stations provided with a first communication port and a second communication port each adapted for bi-directional communications and connected in a ring form through a transmission line, having among the transmission stations a base station transmitting frame signals via a right-handed route and a left-handed route, and a terminal station of the right-handed route and a terminal station of the left-handed route returning frame signals from the base station, respectively, wherein the transmission stations, the terminal stations, and the base station each respectively comprising:

means for determining whether or not frame signals are received at a first communication port adapted for communications by the right-handed route, and a second communication port adapted for communications by the left-handed route;

means for transmitting route identifying frame signals for identification of routes from the first and second communication ports to adjacent transmission stations, when having failed in reception; and means for setting own station as a terminal station, when having received no responses to the route identifying frame signals from the adjacent transmission stations.

5. The double ring network system according to claim 4, characterized by further comprising:

means for own station as having been set as the terminal station for canceling the setting as the terminal station, when no frame signals are input via the right-handed route or the left-handed route.

6. A communication control method for network systems including transmission stations provided with a first communication port and a second communication port each adapted for bi-directional communications and connected in a ring form through a transmission line, having among the transmission stations a base station transmitting frame signals via a right-handed route and a left-handed route, and a terminal station of the right-handed route and a terminal station of the left-handed route returning frame signals from the base station, respectively, and responding to occurrence of an anomaly on any transmission line by setting new terminal stations, wherein for a respective one of the transmission stations, the terminal stations, and the base station, the method comprising:

a process of determining whether or not frame signals are received at a first communication port adapted for communications by the right-handed route, and a second communication port adapted for communications by the left-handed route;

a process of transmitting route identifying frame signals for identification of routes from the first and second communication ports to adjacent transmission stations, when having failed in reception;

a process of setting own station as a terminal station, when having received no responses to the route identifying frame signals from the adjacent transmission stations, and a process of keeping a right-handed frame signal from the base station from being transmitted to a subsequent adjacent right-handed transmission station, as own station is set as a terminal station on the right-handed route, or from being transmitted to a subsequent adjacent left-handed transmission station, as own station is set as a terminal station on the left-handed route.

7. The communication control method for network systems according to claim 6, further comprising:

a process of canceling, as own station is set as the terminal station, the setting as the terminal station as the frame signals are kept from being input via the right-handed route or the left-handed route.

8. A transmission station interposed between transmission lines of a double ring network system and provided with a first communication port right-handed communicative and a second communication port left-handed communicative, comprising:

means for determining whether or not frame signals are received at the first communication port communicative via a right-handed route and the second communication port communicative via a left-handed route;

means for transmitting route identifying frame signals for identification of routes from the first and second communication ports to adjacent transmission stations, when having failed in reception;

means for setting own station as a terminal station, when having received no responses to the route identifying frame signals from the adjacent transmission stations, and means for keeping a right-handed frame signal from a base station from being transmitted to a subsequent adjacent right-handed transmission station, as own station is set as a terminal station on the right-handed route, or from being transmitted to a subsequent adjacent left-handed transmission station, as own station is set as a terminal station on the left-handed route.

9. The transmission station according to claim 8, wherein the transmission station has an own station position identifying means comprising:

means adapted, as the first communication port has received right-handed first frames and the second communication port has received left-handed first frames addressing this station as a destination, respectively, for having addresses of repeater stations those right handed and left handed first frames have routed and addresses of the base station and this own station based on to determine own station as being a repeater station; and means adapted, as own station is determined as being a repeater station, for changing the first communication port and the second communication port of this station each respectively to a reception-enabled and transmission-enabled state and a repeat-enabled state.

10. A non-transitory computer readable medium storing a program for control of communications for double ring network systems including a first communication port right-handed communicative and a second communication port left-handed communicative interposed between transmission lines of double ring network systems, for having a computer implement functions as:

means for determining whether or not frame signals are received at the first communication port communicative via a right-handed route and the second communication port communicative via a left-handed route;

means for transmitting route identifying frame signals for identification of routes from the first and second communication ports to adjacent transmission stations, when having failed in reception;

means for setting own station as a terminal station, when having received no responses to the route identifying frame signals from the adjacent transmission stations, and means for keeping a right-handed frame signal from the base station from being transmitted to a subsequent adjacent right-handed transmission station, as own station is set as a terminal station on the right-handed route, or from being transmitted to a subsequent adjacent left-handed transmission station, as own station is set as a terminal station on the left-handed route.

11. The non-transitory computer readable medium storing a program for control of communications for double ring network systems according to claim 10, for having the computer implement functions as means for own station as having been set as the terminal station for canceling the setting as the terminal station, when no frame signals are input via the right-handed route or the left-handed route.

\* \* \* \* \*